US008063360B2

(12) United States Patent
Willis et al.

(10) Patent No.: US 8,063,360 B2
(45) Date of Patent: Nov. 22, 2011

(54) DATA ACQUISITION SYSTEM FOR A SPECTROMETER USING VARIOUS FILTERS

(75) Inventors: Peter M. Willis, Benton Harbor, MI (US); Michael C. Mason, St. Joseph, MI (US); Mark R. Wheeler, St. Joseph, MI (US); Viatcheslav B. Artaev, St. Joseph, MI (US); Julie R. Pitz, Buchanan, MI (US)

(73) Assignee: Leco Corporation, St. Joseph, MI (US)

( * ) Notice: Subject to any disclaimer, the term of this patent is extended or adjusted under 35 U.S.C. 154(b) by 134 days.

(21) Appl. No.: 12/323,628

(22) Filed: Nov. 26, 2008

(65) Prior Publication Data

US 2009/0072134 A1 Mar. 19, 2009

Related U.S. Application Data

(62) Division of application No. 11/776,106, filed on Jul. 11, 2007, now Pat. No. 7,501,621.

(60) Provisional application No. 60/832,239, filed on Jul. 12, 2006.

(51) Int. Cl.
*B01D 59/44* (2006.01)

(52) U.S. Cl. ......................... 250/282; 250/281; 250/287

(58) Field of Classification Search .................. 250/281, 250/282, 287; 702/22, 23, 26–28, 189, 190
See application file for complete search history.

(56) References Cited

U.S. PATENT DOCUMENTS 3,634,683 A 1/1972 Bakker
3,832,642 A 8/1974 Helgeland
3,870,881 A * 3/1975 Halliday et al. .............. 250/283
3,916,187 A 10/1975 Fletcher et al.
3,920,987 A 11/1975 Anbar et al.

(Continued)

FOREIGN PATENT DOCUMENTS

GB 2274197 7/1994

(Continued)

OTHER PUBLICATIONS

Coles, et al., "Orthogonal Acceleration Time-of-Flight Mass Spectrometry: Improved Sensitivity and Resolution with Gaseous Ion Sources," The 40th ASMS Conf. on Mass Spectrometry and Allied Topics, pp. 10-11, May 31-Jun. 2, 1992.

(Continued)

*Primary Examiner* — Michael Maskell
(74) *Attorney, Agent, or Firm* — Price Heneveld LLP

(57) ABSTRACT

A data acquisition system and method are described that may be used with various spectrometers. The data acquisition system may include an ion detector, an initial processing module, and a spectra processing module. The initial processing module is provided for processing the ion detection signals and for supplying processed signals to the spectra processing module. The spectra processing module generates spectra from the processed signals and supplies the generated spectra to an external processor for post-processing. The spectra processing module may include one or more of: a cross-spectra filter for filtering data in each spectra as a function of data in at least one prior spectra; a shaping filter for removing skew and shoulders from the processed signals; a sharpening filter for sharpening the peaks of the processed signals to effectively deconvolve and separate overlapping peaks; an ion statistics filter; and a peak histogram filtering circuit.

9 Claims, 29 Drawing Sheets

U.S. PATENT DOCUMENTS

| | | | | |
|---|---|---|---|---|
| 4,209,784 | A | 6/1980 | Sumner et al. | |
| 4,458,149 | A | 7/1984 | Muga | |
| 4,472,631 | A | 9/1984 | Enke et al. | |
| 4,490,806 | A | 12/1984 | Enke et al. | |
| 4,686,365 | A | 8/1987 | Meek et al. | |
| 4,970,390 | A | 11/1990 | Szymczak | |
| 5,032,722 | A | 7/1991 | Boesl et al. | |
| 5,073,713 | A | 12/1991 | Smith et al. | |
| 5,078,135 | A | 1/1992 | Caprioli | |
| 5,144,127 | A | 9/1992 | Williams et al. | |
| 5,175,430 | A | 12/1992 | Enke et al. | |
| 5,194,731 | A | 3/1993 | Turner | |
| 5,196,708 | A | 3/1993 | Mullock | |
| 5,367,162 | A | 11/1994 | Holland et al. | |
| 5,396,065 | A | 3/1995 | Myerholtz et al. | |
| 5,463,219 | A | 10/1995 | Buckley et al. | |
| 5,712,480 | A | 1/1998 | Mason | |
| 5,770,857 | A * | 6/1998 | Fuerstenau et al. | 250/281 |
| 5,880,973 | A * | 3/1999 | Gray et al. | 702/190 |
| 6,487,523 | B2 * | 11/2002 | Jarman et al. | 702/189 |
| 6,680,476 | B1 * | 1/2004 | Hidalgo et al. | 250/286 |
| 6,765,199 | B2 * | 7/2004 | Youngquist et al. | 250/287 |
| 6,983,213 | B2 * | 1/2006 | Wang | 702/85 |
| 7,196,324 | B2 | 3/2007 | Verentchikov | |
| 7,326,925 | B2 | 2/2008 | Verentchikov | |
| 7,493,225 | B2 * | 2/2009 | Wang et al. | 702/85 |
| 2006/0122814 | A1 * | 6/2006 | Beens et al. | 702/189 |
| 2007/0029473 | A1 | 2/2007 | Verentchikov | |
| 2007/0063139 | A1 | 3/2007 | Hall et al. | |
| 2007/0158542 | A1 * | 7/2007 | Bauer et al. | 250/282 |
| 2007/0158545 | A1 | 7/2007 | Verentchikov | |
| 2007/0176090 | A1 | 8/2007 | Verentchikov | |
| 2007/0231207 | A1 | 10/2007 | Mason | |
| 2008/0001079 | A1 * | 1/2008 | Wang et al. | 250/282 |
| 2009/0294645 | A1 * | 12/2009 | Gorenstein et al. | 250/282 |
| 2010/0187414 | A1 * | 7/2010 | Gorenstein et al. | 250/282 |

FOREIGN PATENT DOCUMENTS

| | | |
|---|---|---|
| WO | WO 91/03071 | 3/1991 |

OTHER PUBLICATIONS

Dodonov, et al., "Electrospray Ionization on a Reflecting Time-of-Flight Mass Spectrometer," Institute of Energy Problems of Chemical Physics, Russian Academy of Sciences, Time-of-Flight Mass Spectrometery, ACS Symposium Series 549, pp. 108-123, 1994.

Pinkston et al., "New time-of-flight mass spectrometer for improved mass resolution, versatility, and mass spectrometry/mass spectrometry studies," Rev. Sci. Instrum, vol. 57 (No. 4), pp. 583-592 (Apr. 1986).

Bakker, J.M.B., "A beam-modulated time-of-flight mass spectrometer Part 1: theoretical considerations," Journal of Physics E: Scientific Instruments, vol. 6 ( No. 8), p. 785-789, (Aug. 1, 1973).

Bakker, J.M.B., et al., "A beam-modulated time-of-flight mass spectrometer Part II: experimental work," Journal of Physics E: Scientific Instruments, vol. 7 ( No. 5), p. 321-412, (May 1, 1974).

Bakker, J.M.B., "The time-focusing principle: a double-focusing desing for time-of-flight mass spectrometers," Int. J. Mass Spectrom. Ion Phys., Elsevier Publishing Co. (Amsterdam, the Netherlands), vol. 7 ( No. 3/4), p. 291-295, (Feb. 16, 1971).

Benninghoven, A., et al., "Secondary Ion Mass Spectrometry: A New Analytical Technique for Biologically Important Compounds," Organic Mass Spectrometry, vol. 12 ( No. 9), p. 595-597, (May 1, 1977).

Bergmann, T., et al., "High-resolution time-of-flight mass spectrometer," Rev. Sci. Instrum. , vol. 60 ( No. 4), p. 792-793, (Apr. 1, 1989).

Boesl, U., et al., "A High-Resolution Time-of-Flight Mass Spectrometer with Laser Desorption and a Laser Ionization Source," Analytical Instrumentation, vol. 16 ( No. 1), p. 151-171, (Jan. 1, 1987).

Boyle, J. G., et al., "Time-of-Flight Mass Spectrometry with an Electrospray Ion Beam," Anal. Chem., p. 2084-2089, (Sep. 15, 1992).

Cameron, A.E., et al., "An Ion 'Velocitron'," The Review of Scientific Instruments, vol. 19 ( No. 9), p. 605-607, (Sep. 1, 1948).

Coles, J., et al., "Orthogonal acceleration Time-of-Flight Mass Spectrometry: Improved Sensitivity and Resolution with Gaseous Ion Sources," The 40th ASMS Conf. on Mass Specctrometry and Topics, p. 10-11.

Dawson, J.H.J, et al., "Orthogonal-acceleration Time-of-flight Mass Spectrometer," Rapid Communication in Mass Spectrometry, vol. 3 ( No. 5), p. 155-159, (Jan. 1, 1989).

De Heer, W.A., et al., "Large ion volume time-of-flight mass spectrometer with position- and velocity-sensitive detection capabilities for cluster beams," Rev. Sci. Instrum., vol. 62 ( No. 3), p. 670-677, (Mar. 1, 1991).

Di Valentin, M.A., et al., "Satellite mass Peaks in Time-of-Flight Mass Spectrometry of Ions continuously Sampled From an External Source," Int. Journal of Mass Spec. And Ion Physics, p. 359-366, (Jan. 1, 1973).

Dodonov, A.F., et al. (Ed. Robert J. Cotter), "Electrospray Ionization on a Reflecting Time-of-Flight Mass Spectrometer," Institute of Energy Problems of Chemical Physics, Russian Academy of Sciences, Time-of-Flight Mass Spectrometry, ACS Symposium Series 549, p. 108-123.

Fowler, T.K, et al., "A Theory on Obtaining Short Bursts of Ions from a Beam of Ions," Nuclear Instruments and Methods, p. 245-244, (Feb. 7, 1960).

Futrell, J.H., et al., "Modifications of a Time-of-Flight Mass Spectrometer for Investigation of Ion-Molecule Reactions at Elevated Pressures," The Review of Scientific Instruments, vol. 39 ( No. 3), p. 340-345, (Mar. 1, 1968).

Gohl, W., et al., "Time-of-Flight Mass Spectrometry for ions of Large Energy Spread," International Journal of Mass Spectropmetry and Ion Physics, p. 411-414, (Jan. 1, 1983).

L.W. Green, et al., "Fast-Pulse Detection for Isotopic Abundance Determination by Resonance Ionization, Time-of-Flight Mass Spectrometry," Analytical Instrumentation, vol. 17 ( No. 1&2), p. 195-214, (Jan. 1, 1988).

R. Grix, et al., "A Time-of-flight Mass Analyzer with High Resolving Power," Physikalisches Institut der Justus-Liebig-Universitat, p. 1-3, (Mar. 18, 1988).

J.F. Holland, et al., "Design, construction, and evaluation of an integrating transient recorder for data acquisition in capillary gas chromatography / time-of-flight mass spectrometry," Rev. Sci. Instrum. , vol. 62 ( No. 1), p. 69-76, (Jan. 1, 1991).

R.S. Houk, et al., "Mass Spectrometry of Inductively Coupled Plasmas," Analytical Chemistry, vol. 58 ( No. 1), p. 97-105, (Jan. 1, 1986).

R.S. Houk, et al., "Inductively Coupled Argon Plasma as an Ion Source for Mass Spectrometric Determination of Trace Elements," Analytical Chemistry, vol. 52 ( No. 14), p. 2283-2289, (Dec. 1, 1980).

A.M. Hudor, "Fast electronics for time-of-flight measurements," Rev. Sci. Instrum. , vol. 52 ( No. 6), p. 819-824, (Jun. 1, 1981).

M. Karas, et al., "UV Laser Matrix Desportion / Ionization Mass Spectrometry of Proteins in the 100 000 Dalton Range," International Journal of Mass Spectrometry and Ion Processes, p. 231-242, (Jan. 1, 1989).

V.I. Karataev, et al., "New Method for Focusing Ion Bunches in Time-of-Flight Mass Spectrometers," Soviet Physics—Technical Physics, vol. 16 ( No. 7), p. 1177-1179, (Jan. 1, 1972).

E. Kawatoh, et al., "Analysis of Sputtered Neutrals by Nonresonant Multiphoton Ionization," Japanese Journal of Applied Physics, vol. 30 ( No. 3), p. 608-611, (Mar. 1, 1991).

Gary R. Kinsel, et al., "Post source Pulse Focusing: A Simple Method to Achieve Improved Resolution in a Time-of-Flight Mass Spectrometer," International Journal of Mass Spectrometery and Ion Processes, p. 157-176, (May 8, 1989).

Michael J. Kristo, et al., "System for simultaneous count / current measurement with a dual-mode photon/particle detector," vol. 59 ( No. 3), p. 438-442, (Mar. 8, 1988).

R. Kutscher, et al., "A Transversally and Longitudinally Focusing Time-of-Flight Mass Spectrometer," International Journal of Mass Spectrometry and Ion Processes, p. 117-128, (Jan. 1, 1991).

Ce Ma, et al., "The design of an atmospheric pressure ionization/ time-of-flight mass spectrometer using a beam deflection method," Rev. Sci. Instrum. , vol. 63 ( No. 1), p. 139-148, (Jan. 1, 1992).

B.A. Mamyrin, et al., "The Linear Mass Reflectron," Soy. Phys. JETP , vol. 49 ( No. 5), p. 762-764, (May 1, 1979).

B.A. Mamyrin, et al., “The mass-reflectron, a new nonmagnetic time-of-flight mass spectrometer with high resolution,” Sov. Phys. JETP, vol. 37 ( No. 1), p. 45-48, (Jan. 1, 1973).
C.D. Miller, et al., “Improvement of Spectral Baseline Stability for a Time-of-Flight Mass Spectrometer Operated at Elevated Pressures,” Rev. Sc. Instrum. , p. 503-504, (Jan. 1, 1969).
D.P. Meyers, et al., “Preliminary Design Considerations and Characteristics of an Inductively Coupled Plasma--Time-of-Flight Mass Spectrometer,” Microchemical Journal, p. 259-277, (Jan. 1, 1993).
G.J. O’Halloran, et al., “Determination of Chemical Species Prevalent in a Plasma Jet,” Technical Documentary Report No. ASD-TDR-62-644, Parts 1 and 2, p. 1-143, (Apr. 1, 1964).
J. K. Olthoff, et al., “Liquid Secondary Ion Time-of-Flight Mass Spectormetry,” Analytical Chemistry, vol. 59 ( No. 7), p. 1-5, (Apr. 1, 1987).
J.D. Pinkson, et al., “New time-of-flight mass spectrometer for improved mass resolution, versatility, and mass spectrometry / mass spectrometry studies,” Rev. Sci. Instrum. , vol. 57 ( No. 4), p. 583-592.
W.P. Poschenrieder, “Multiple-Focusing Time-of-Flight Mass Spectrometers Part II. TOFMS with Equal Energy Acceleration,” Int. J. Mass Spectrom. Ion Phys., vol. 9 ( No. 4), p. 357-373, (Feb. 18, 1972).
G. Sanzone, “Energy Resolution of the Conventional Time-of-Flight Mass Spectrometer,” The Review of Scientific Intruments, vol. 41 ( No. 5), p. 741-742, (May 1, 1970).
C.H. Sin, et al., “Atmospheric Pressure Ionization Time-of-Flight Mass Spectrometry with a Supersonic Ion Beam, ” Anal. Chem, vol. 63 (No. 24), p. 2897-2900, (Dec. 15, 19991).
P. Steffens, et al., “A time-of-flight mass spectrometer for static SIMS applications,” J. Vac. Sci. Technol. A, vol. 3 ( No. 3), p. 1322-1325, (Jan. 1, 1985).
M. H. Studier, “Continuous Ion Source for a Time-of-Flight Mass Spectrometer,” The Review of Scientific Instruments, vol. 34 ( No. 12), p. 1367-1370, (Jan. 1, 1963).
R.B. Van Breemen, et al., “Time-Resolved Laser Desorption Mass Spectrometry. I. Desorption of Preformed Ions.,” International Journal of Mass Spectrometry and Ion Physics, vol. 49 ( No. 1), p. 35-50, (Mar. 1, 1983).
W.C. Wiley, et al., “Time-of-Flight Mass Spectrometer with Improved Resolution,” The Review of Scientific Instruments, vol. 26 ( No. 12), p. 1150-1157, (Dec. 1, 1955).
G.E. Yefchak, et al., “Beam Deflection for Temporal Encoding in Time-of-Flight Mass Spectrometry,” Journal of American Society for Mass Spectrometry, vol. 1 ( No. 6), p. 440-447, (Jan. 1, 1990).
Potographs of a paper presented by Agilent at ASMS, Jun. 2007.

* cited by examiner

FIG. 4A
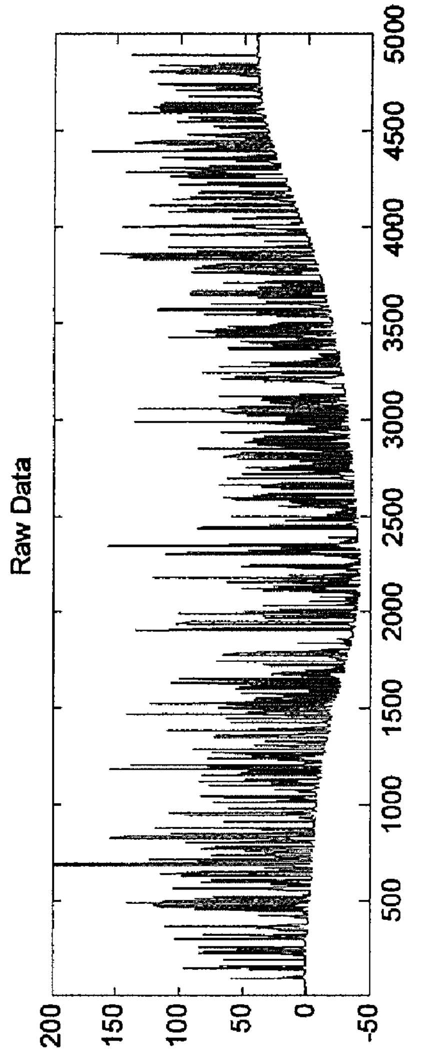
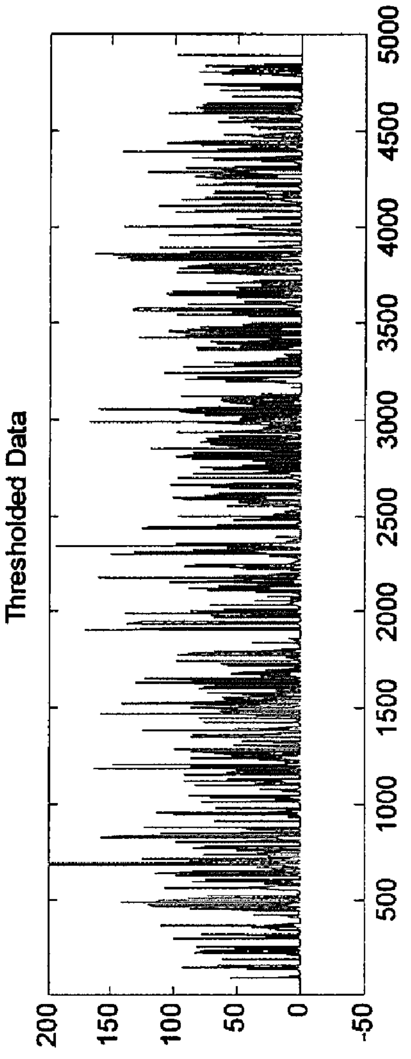
FIG. 4B

DATA ACQUISITION SYSTEM FOR A SPECTROMETER USING VARIOUS FILTERS

CROSS-REFERENCE TO RELATED APPLICATION

This application is a divisional application of U.S. patent application Ser. No. 11/776,106, filed on Jul. 11, 2007, now U.S. Pat. No. 7,501,621, which claims the priority benefit of U.S. Provisional Application No. 60/832,239, filed on Jul. 12, 2006, the entire disclosure of each of these applications is incorporated herein by reference.

BACKGROUND OF THE INVENTION

This invention relates generally to the detection of ions in spectrometry, and more particularly to a data acquisition system including methods of operation and apparatus for acquiring and processing data from a time-of-flight mass spectrometer.

The science of mass spectrometry has been proven to be a valuable tool in analytical chemistry. Mass spectrometry is premised on the fact that electrically neutral molecules of a sample can be charged or ionized and their motion controlled by electric and magnetic fields. The response of a charged molecule to magnetic and electric fields is influenced by the mass-to-charge ratio of the ion so that ions of a specific mass-to-charge ratio can be selectively detected.

Mass spectrometers differ from each other primarily in the way in which ions of different mass-to-charge ratios are distinguished from each other. Magnetic sector mass spectrometers separate ions of equal energy by the ions' momentum as they are reflected or dispersed in a magnetic field. Quadrupole mass spectrometers separate ions based upon their rate of acceleration in response to a high frequency radio frequency field in the presence of a direct current field. Ion cyclotrons and ion trap mass spectrometers discriminate ions on the frequency or dimensions of their resonant oscillations in alternating current fields. Time-of-flight mass spectrometers discriminate ions according to their velocity over a fixed distance.

Although relatively straightforward in design, time-of-flight (hereinafter "TOF") mass spectrometers produce data at a very high rate. Because ions having different mass-to-charge ratios may be present in a single sample, they will strike the ion detector at different times according to their velocity or kinetic energy. The detector output signal comprises a sequence of ion arrival responses which are compressed within a very short time interval, generally less than one-tenth of a microsecond. Within a few milliseconds, all of the ions, including the heaviest, have traveled the length of the typical TOF mass spectrometer and arrived at the detector to produce a spectrum of this sample molecule. Up to as many as one million spectra may be produced for a given sample analyzed. Additionally, these spectra may need to be separated into chronologically ordered sets. The time scale would be on the order of one millisecond.

Scientists often wish to collect data over the entire spectra (i.e., the full mass range) that may be produced by the sample. Past systems have generally operated slowly. Although it is desirable to speed up the data acquisition systems to match the capabilities of a TOF spectrometer, a problem arises in the need to store the data as it is produced. In some circumstances, only a small segment containing certain ionic compounds of all of the data produced by the analysis of a given sample may be of interest. Thus, to reduce the amount of data produced, and to focus in on the ionic compound of interest, it has been proposed to turn the detection circuit on just prior to the predicted arrival time or window of a selected compound. Details of such a system are disclosed in U.S. Pat. No. 5,367,162, owned by the assignee of this invention. This patent also provides a thorough discussion of the prior art, and its disclosure is incorporated herein by reference.

The data acquisition systems disclosed in commonly owned U.S. Pat. Nos. 5,712,480 and 5,981,946 increased the speed of collection and processing data and improved resolution by collecting larger segments of data over a shorter time interval than previously available. These data acquisition systems digitize and temporarily store all of the particular data of interest.

Some systems have been developed that sample the ion detector output signal at a very high rate (i.e., up to 1.0 GHz). However, for such systems to sample at such a high rate, other sacrifices were made, such as the rate at which spectra is generated and reported, the mass range over which the spectra is generated, and/or the mass precision of its measurements. Thus, the prior systems have been subject to various trade-offs when attempting to increase the sampling rate. In addition, in these systems, most of the processing of the spectra occurred in an external PC rather than on the data acquisition board of the mass spectrometer. Typically, the data from the data acquisition board was dumped into a memory for later processing by the external PC. Further, the lack of sufficient memory and the lack of sufficient write speeds of the memory limited the ability to speed up the sampling rate of the ion detection signal.

Because of trade-offs between the spectra generating/reporting rates and the mass range over which the spectra is generated, prior systems have often limited the selected mass range as a function of the selected spectra reporting rate or vice versa. For example, a system that may allow for a spectra reporting rate of 30 spectra/second would allow selection of analysis over a full mass range, but may not allow analysis over a full mass range if one selected a higher spectra reporting rate. Likewise, for a limited mass range, a spectra reporting rate of 45 spectra/second may be selected, but if one wished to select a full mass range, the spectra reporting rates that may be selected would decrease.

Another issue with present data acquisition systems is that they either use an ion detection configuration that is sensitive enough to detect a single ion appearing in only one of many consecutive transients (merely counting the number of voltage spikes that are above a fixed threshold) or they use an ion detection configuration that is capable of detecting and quantifying the number of ions simultaneously striking the ion detector (using an analog-to-digital converter). However, such systems have not had sufficient dynamic range and sensitivity to do both.

SUMMARY OF THE INVENTION

According to one embodiment of the present invention, a data acquisition system is provided for detecting ions of interest in a spectrometer and for supplying spectra to an external processor for post-processing. The data acquisition system comprises an ion detector and a processing circuit. The ion detector detects ions and generates ion detection signals indicative of detected ions striking the ion detector. The processing circuit receives and processes the ion detection signals, generates spectra from the processed signals, and supplies the spectra to the external processor. The processing of the ion detection signals comprises removing noise from the ion detection signals using a threshold, and at least one of the following additional procedures: combining a fractional number of adjacent samples of the ion detection signals into bins; cross-spectra filtering to increase ion concentration for each peak in the spectra; removing asymmetry and shoulders in each peak; peak sharpening to increase spectral resolution; adjusting spectral resolution for each peak as a function of the number of ions at the peak; creating a cumulative histogram of peak heights and saving peaks meeting peak height criteria established by the histogram; and reducing spectral information supplied to the external processor by supplying the intensity, spectral resolution, and spectral location of each peak without supplying data not pertaining to a peak.

According to another embodiment of the present invention, a data acquisition method is provided for detecting ions of interest in a spectrometer, the method comprises receiving ion detection signals from an ion detector; removing noise from the ion detection signals using a threshold; and at least one of the additional steps. The additional steps include: combining a fractional number of adjacent samples of the ion detection signals into bins; cross-spectra filtering to increase ion concentration for each peak in the spectra; removing asymmetry and shoulders in each peak; peak sharpening to increase spectral resolution; adjusting spectral resolution for each peak as a function of the number of ions at the peak; creating a cumulative histogram of peak heights and saving peaks meeting peak height criteria established by the histogram; and reducing spectral information supplied to the external processor by supplying the intensity, spectral resolution, and spectral location of each peak without supplying data not pertaining to a peak.

According to another embodiment of the present invention, a data acquisition system is provided for detecting ions of interest in a spectrometer. The data acquisition system comprises: an ion detector, an initial processing module, and a spectra processing module. The ion detector detects ions and generates ion detection signals indicative of detected ions striking the ion detector. The initial processing module receives and processes the ion detection signals and supplies processed signals. The spectra processing module receives the processed signals to detect peaks, and generates stick spectra. The stick spectra comprise peak intensity, resolution, and a location in the spectra for each detected peak. The stick spectra are supplied to an external processor for post-processing.

According to another embodiment of the present invention, a data acquisition system is provided for detecting ions of interest in a spectrometer. The data acquisition system comprises: an ion detector, an initial processing module, and a spectra processing module. The ion detector detects ions and generates ion detection signals indicative of detected ions striking the ion detector. The initial processing module contiguously samples the ion detection signals at a rate matched to the capabilities of the ion detector over a full spectral range, processes the sampled ion detection signals, and supplies processed signals. The spectra processing module receives the processed signals and generates spectra from the processed signals at a rate matched to the time response of the separation techniques.

According to another embodiment of the present invention, a data acquisition system is provided for detecting ions of interest in a time-of-flight mass spectrometer. The data acquisition system comprises: an ion detector, a transient processing module, and a spectra processing module. The ion detector detects ions and generates ion detection signals indicative of detected ions striking the ion detector. The transient processing module samples the ion detection signals at a rate of at least 1.5 GHz, processes the sampled ion detection signals, and supplies processed signals corresponding to contiguous transients. The spectra processing module receives the processed signals and generates spectra from the transients at a rate of at least 50 spectra per second.

According to another embodiment of the present invention, a data acquisition system is provided for detecting ions of interest in a spectrometer. The data acquisition system comprises: an ion detector, an initial processing module, a spectra processing module, and an instrument control module. The ion detector detects ions and generates ion detection signals indicative of detected ions striking the ion detector. The initial processing module samples the ion detection signals over a selected spectral range, processes the sampled ion detection signals, and supplies processed signals. The spectra processing module receives the processed signals and generates spectra at a selected reporting rate. The reporting rate and the spectral range are selectable independent of one another.

According to another embodiment of the present invention, a data acquisition system is provided for detecting ions of interest in a spectrometer. The data acquisition system comprises: a single ion detector, an initial processing module, and a spectra processing module. The single ion detector detects ions and generates ion detection signals indicative of detected ions striking the ion detector. The initial processing module samples the ion detection signals from the single ion detector, processes the sampled ion detection signals, and supplies processed signals corresponding to transients. The initial processing module is configured to have a sensitivity that is sufficient to detect a single ion received within one of over at least 100 transients and to detect and quantify a number of ions simultaneously striking the ion detector up to at least 10 simultaneously striking ions. The spectra processing module receives the processed signals and generates spectra from the transients.

According to another embodiment of the present invention, a data acquisition system is provided for detecting ions of interest in a spectrometer. The data acquisition system comprises: an ion detector, an initial processing module, a spectra processing module, and an instrument control module. The ion detector detects ions and generates ion detection signals indicative of detected ions striking the ion detector. The initial processing module receives and processes the ion detection signals and supplies processed signals corresponding to transients. The initial processing module comprises a preamplifier for amplifying the received ion detection signals. The preamplifier has at least two output channels. The spectra processing module receives the processed signals and generates spectra. The instrument control module controls the spectrometer and causes the preamplifier to inject an electrical pulse simulating an ion strike. One or more of the phase, offset, or gain of the preamplifier output channels are adjusted in response to the preamplifier output signals generated in response to the electrical pulse. The instrument control module causes the preamplifier to inject the electrical pulse at the beginning of each transient.

According to another embodiment of the present invention, a data acquisition system is provided for detecting ions of interest in a spectrometer. The data acquisition system comprises: an ion detector, an initial processing module, and a spectra processing module. The ion detector detects ions and generates ion detection signals indicative of detected ions striking the ion detector. The initial processing module receives and processes the ion detection signals and supplies processed signals. The initial processing module comprises an adaptive threshold circuit for selectively adjusting the ion detection signals. The adaptive threshold is calculated as a function of values of the ion detection signals. The spectra processing module receives the processed signals and generates spectra.

According to another embodiment of the present invention, a data acquisition system is provided for detecting ions of interest in a spectrometer. The data acquisition system comprises: an ion detector, an initial processing module, and a spectra processing module. The ion detector detects ions and generates ion detection signals indicative of detected ions striking the ion detector. The initial processing module receives and processes the ion detection signals and supplies processed signals. The spectra processing module receives the processed signals, generates spectra, and supplies the generated spectra to an external processor for post-processing. The spectra processing module comprises a cross-spectra filter for filtering data in each spectra as a function of data in at least one prior spectra.

According to another embodiment of the present invention, a data acquisition system is provided for detecting ions of interest in a spectrometer. The data acquisition system comprises: an ion detector, an initial processing module, a spectra processing module, and a shaping filter. The ion detector detects ions and generates ion detection signals indicative of detected ions striking the ion detector. The initial processing module receives and processes the ion detection signals and supplies processed signals. The spectra processing module receives the processed signals and generates spectra. The shaping filter removes skew and shoulders from the processed signals.

According to another embodiment of the present invention, a data acquisition system is provided for detecting ions of interest in a spectrometer. The data acquisition system comprises: an ion detector, an initial processing module, a spectra processing module, and a sharpening filter. The ion detector detects ions and generates ion detection signals indicative of detected ions striking the ion detector. The initial processing module receives and processes the ion detection signals and supplies processed signals. The spectra processing module receives the processed signals and generates spectra. The sharpening filter sharpens the peaks of the processed signals to effectively deconvolve and separate overlapping peaks.

According to another embodiment of the present invention, a data acquisition system is provided for detecting ions of interest in a spectrometer. The data acquisition system comprises: an ion detector, an initial processing module, a spectra processing module, and an ion statistics filter. The ion detector detects ions and generates ion detection signals indicative of detected ions striking the ion detector. The initial processing module receives and processes the ion detection signals and supplies processed signals. The spectra processing module receives the processed signals and generates spectra. The ion statistics filter filters the processed signals on a per sample basis using coefficients that vary as a function of the intensity of the sample of the processed signal.

According to another embodiment of the present invention, a data acquisition system is provided for detecting ions of interest in a spectrometer. The data acquisition system comprises: an ion detector, an initial processing module, and a spectra processing module. The ion detector detects ions and generates ion detection signals indicative of detected ions striking the ion detector. The initial processing module receives and processes the ion detection signals and supplies processed signals. The spectra processing module receives the processed signals, generates spectra, and supplies the generated spectra to an external processor for post-processing. The spectra processing module comprises a peak histogram filtering circuit. The peak histogram filtering circuit establishes a threshold peak intensity level based upon a peak histogram, a selected spectra reporting rate, and a transmission capacity of a transmission line through which spectra are supplied to the external processor. The peak histogram filtering circuit also supplies to the external processor only spectra peaks that meet the threshold peak intensity level.

According to another embodiment of the present invention, a data acquisition system is provided for detecting ions of interest in a spectrometer. The data acquisition system comprises: an ion detector, an initial processing module, and a spectra processing module. The ion detector detects ions and generates ion detection signals indicative of detected ions striking the ion detector. The initial processing module receives, samples, and processes the ion detection signals and supplies processed signals. The initial processing module comprises a horizontal accumulation circuit that combines a fractional number of adjacent samples of the ion detection signals into bins. The spectra processing module receives the processed signals and generates spectra.

BRIEF DESCRIPTION OF THE DRAWINGS

In the drawings:

FIG. 4A is a graph representing a plot of an example of a raw data transient as would be applied to an input of an adaptive threshold circuit constructed in accordance with the present invention;

FIG. 4B is a graph representing a plot of an example of the transient of FIG. 4A as would appear at an output of the adaptive threshold circuit;

DETAILED DESCRIPTION OF THE PREFERRED EMBODIMENTS

Figure 1:
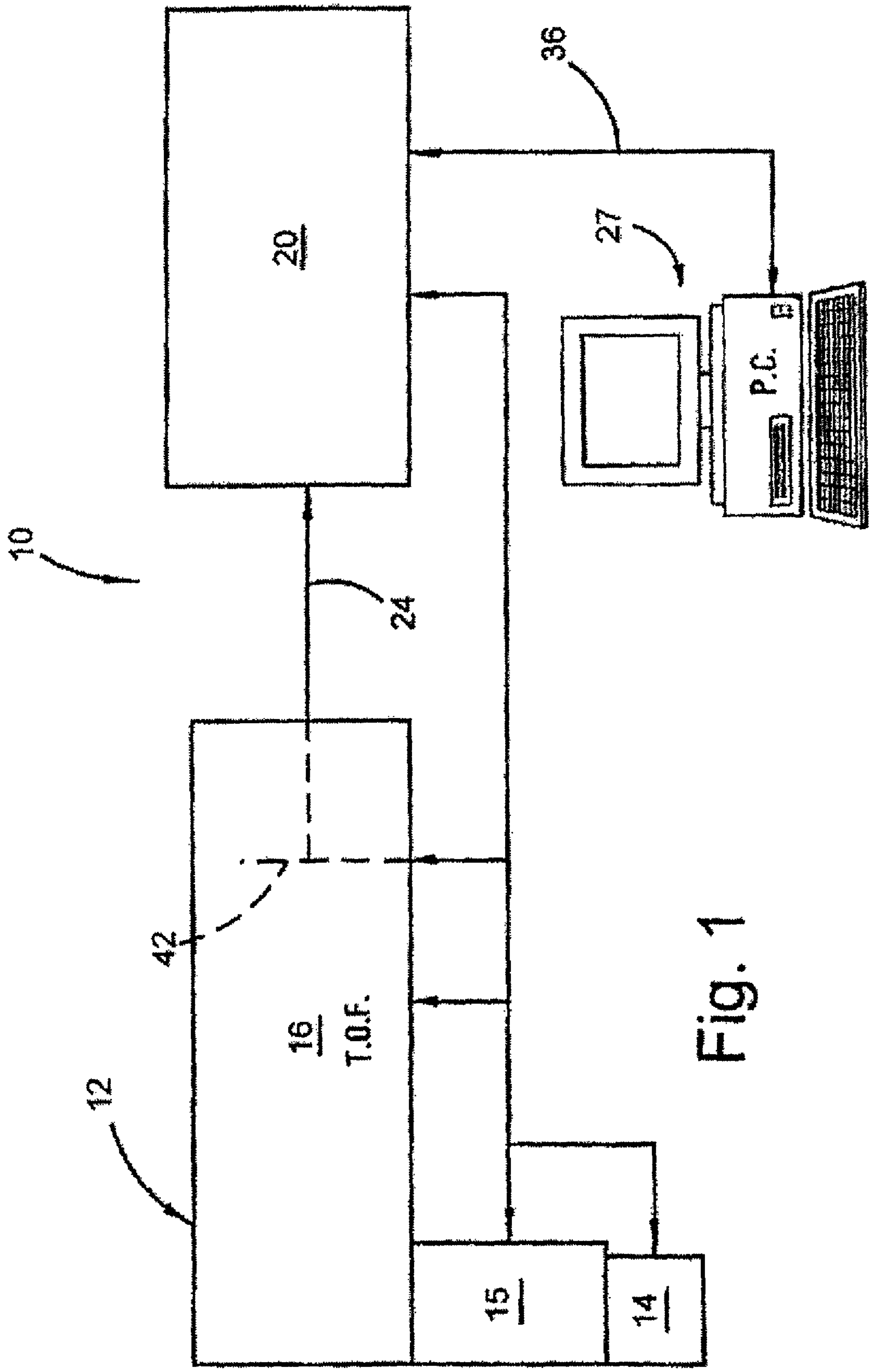
FIG. 1 is an electrical diagram in block form of a spectrometer system including a data acquisition system of the present invention.

Throughout the following description, reference will be made to several different drawing figures wherein similar or like components are identified by the same label or reference numeral.

Although the specific examples described herein are directed to a data acquisition for a TOF mass spectrometer, the data acquisition system has applicability in many respects to all other forms of mass spectrometers, and to other systems for analyzing components by detecting ions, which includes, but is not limited to ion mobility detectors.

In particular, and in reference to the drawing figures, FIG. 1 generally shows in block diagram form a spectrometer system 10 embodying the instant invention. The spectrometer system 10 may include a TOF mass spectrometer 12, including, but not limited to, an orthogonal or on-axis flight tube configuration using any one of a number of sources 14, such as a liquid chromatograph, a gas chromatograph, a glow discharge source, an inductively coupled plasma source, or the like. For the purposes of example only, source 14 is disposed at one end of a sample chamber 15, coupled with a flight tube 16. Disposed at one end of flight tube 16 is an ion detector or transducer 42, described in greater detail below.

Spectrometer 12 may generally have any configuration known in the art. Preferably, spectrometer 12 is a multi-reflecting TOF mass spectrometer. Examples of multi-reflecting TOF mass spectrometers for which the present invention may be used are described in the following commonly-assigned patents: U.S. Pat. No. 7,385,187; U.S. Pat. No. 7,326,925; and U.S. Pat. No. 7,772,547. The entire disclosures of each of these patents are incorporated herein by reference.

Ions emitted from ion source 14 are accelerated into the spectrometer's multi-reflecting drift region in flight tube 16 by a push pulse. The ions are separated in the drift region based upon their mass to charge ratios. The "mass to charge ratio" is shortened to mass, M/Z or M in this document for convenience. The ions finally reach ion detector 42, which produces an output current in response to ion hits and the current is converted to a voltage using a resistor. The ions with the lowest mass arrive at the detector first, and the ions with the largest mass arrive last. In the more detailed example described below, a single ion hit on detector 42 produces a Gaussian peak with typical amplitude of 2 mV and a typical full-width-half-height (FWHH) of 2 ns. Ions of similar mass group together hitting the detector at approximately the same time produce proportionally larger responses. The area under the ion peak is proportional to the ion concentration. For the particular example described herein, the maximum output of the detector is 0.5 VDC. A transient represents the period of time between push pulses. It is assumed that all of the ions of interest produced by the push pulse reach the detector by the end of the transient. The flight time (TOF) of an ion indicates the relative mass to charge of the ion according to the following equation.

$$TOF=k*\sqrt{M}+c,$$

where k and c are constants determined by the mass range and TOF range of the TOF mass spectrometer.

Ions having the same M/Z arrive at detector 42 with a statistical dispersion due to a number of factors: initial energy dispersion, stability of the ion focusing power supplies, non-uniformity of the focusing fields, etc. The spectrometer's resolution, R, is one expression of the focusing power of the ion optics. The spectrometer's resolution defined by:

$$R=\frac{TOF}{2*FWHH}$$

FWHH is the full-width-half-height of the ion peak arriving at time TOF. Resolution is characterized over the spectrometer's mass (or spectral) range and typically increases with increasing mass (or time of arrival).

Ion detector 42 detects ions and generates ion detection signals indicative of detected ions striking ion detector 42 and provides this analog output over line 24 to a data acquisition system 20 to process data produced by ion detector 42. Furthermore, data acquisition system 20 provides one or more outputs along one or more lines, generally indicated as 23, to control operation of the mass spectrometer 12. Data acquisition system 20 is operably connected to an external processor such as a personal computer or other interface 27 through data lines or buses 36. Across buses or lines 36, the user may control substantially all of the operating parameters of spectrometer 12 as well as the data collection and processing procedures followed by data acquisition system 20.

Figure 2:
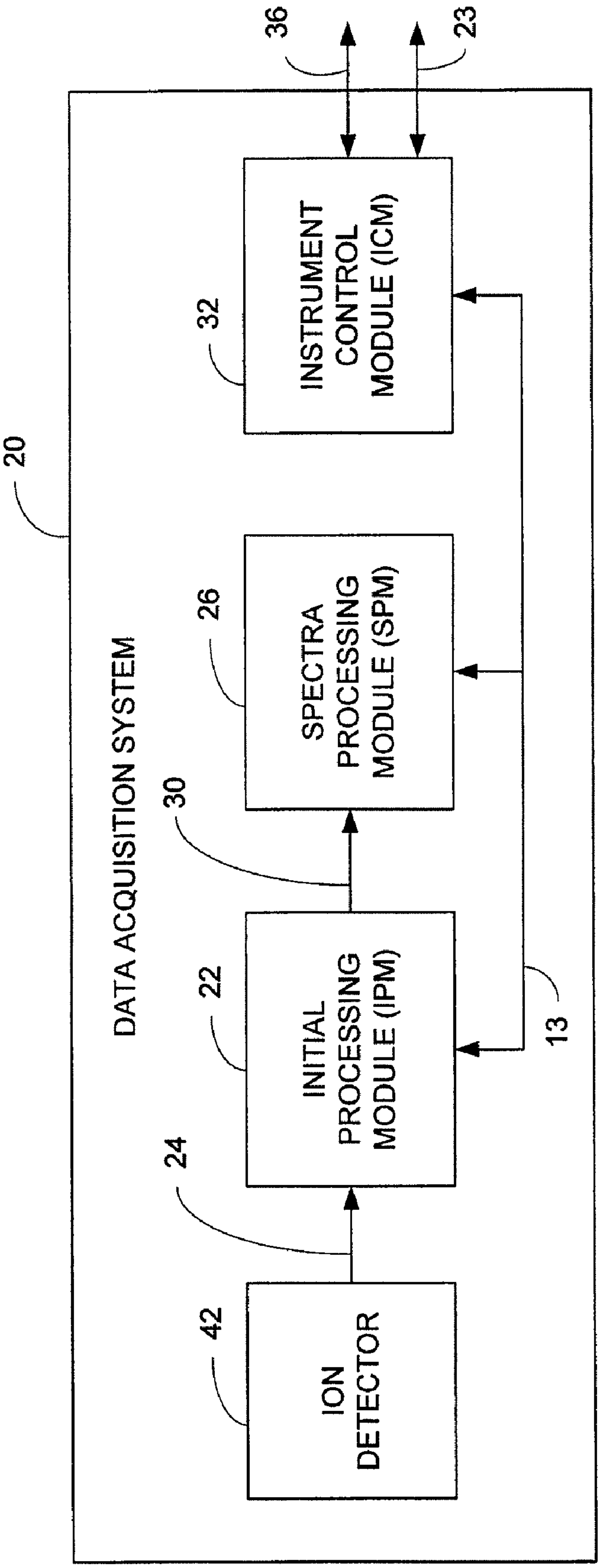
FIG. 2 is an electrical diagram in block form of a general embodiment of a data acquisition system according to the present invention.

Referring to FIG. 2, there is shown, for example, one embodiment of data acquisition system 20 for use with a spectrometer. Generally, system 20 may be comprised of two functional modules, including an initial processing module (IPM) 22 (also referred to as a transient processing module) operatively connected to receive an analog input signal at 38 from an ion detector 42 and a spectra processing module (SPM) 26 operably coupled to receive a digital input signal from IPM 22 over a data line 30. Optionally, system 20 may include an instrument control module (ICM) 32 configured to receive a digital output from SPM 26 over a data line 13. ICM 32 is preferably interconnected with the other modules, such as 22 and 26, through line 13, specific modules of system 10 over lines 23, and a personal computer (PC) or other external processor 27 through data bus or line 36, as will be described in greater detail below.

Figure 3:
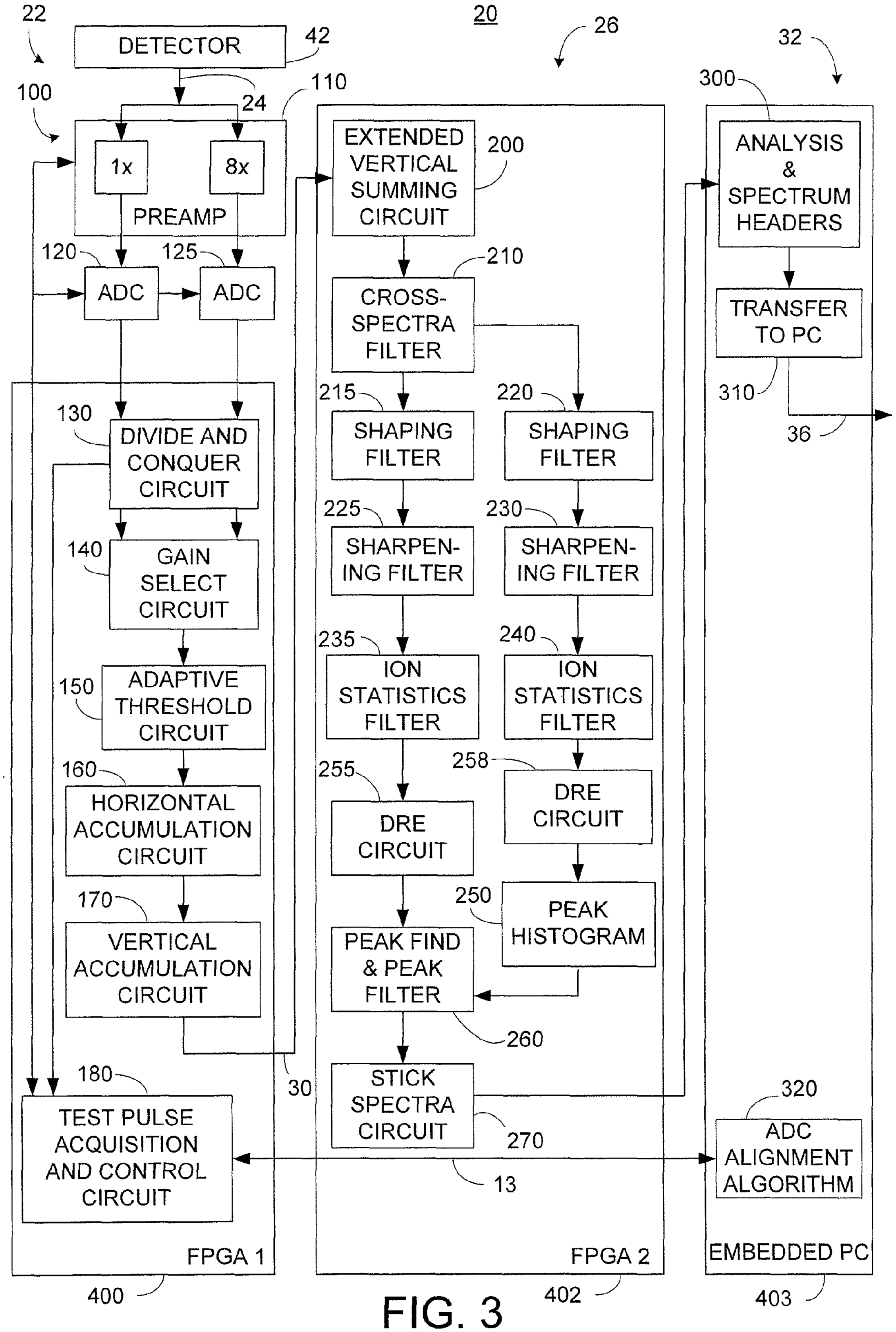
FIG. 3 is an electrical diagram in block form of a more specific embodiment of a data acquisition system according to the present invention.

IPM 22 and SPM 26 are described herein as separate modules for convenience particularly pertaining to the example where the spectrometer is a TOF mass spectrometer. In the implementation with a TOF mass spectrometer, IPM 22 receives the detector signals to process transients, whereas SPM 26 processes spectra, which are sums of the transients. The functional modules as described herein may be implemented in the same circuit components or separately. In the example that follows, a portion of IPM 22 is implemented with a first field programmable gate array (FPGA) 400 while a portion of SPM 26 is implemented with a second FPGA 402. Conceivably, IPM 22 and SPM 26 may be implemented in a common FPGA or in more than the two disclosed FPGAs. ICM 32 may be implemented using an embedded computer 403 or other processing circuitry. It is envisioned that data acquisition system 20 as shown in FIGS. 2 and 3 may be implemented entirely within the circuitry of the spectrometer instrument. Nevertheless, unless otherwise specified in the claims, the present invention is not limited to such a construction and various components may be implemented external to the instrument.

Ion detector 42 (FIGS. 1-3) detects ions within the spectrometer 12 and provides ion detection signals to input 24. In particular, ion detector 42 may be a conventional ion detector 42 having an output 24 connected to a preamplifier circuit 110 of IPM 22. Ion detector 42 may be any one of a number of detectors currently available, including microchannel plate detectors and secondary electron multiplier detectors. As used herein, an "ion detector" may include a single ion detecting element or a plurality of ion detecting elements. The configuration of the detector will depend upon the spectrometer and ion source with which it is used.

FIG. 3 shows a more detailed example of data acquisition system 20. As shown, IPM 22 may include any one or more of a pre-processing circuit 100 coupled to the output of ion detector 42, a divide and conquer circuit 130 coupled to two outputs of pre-processing circuit 100, a gain select circuit 140 coupled to the outputs of divide and conquer circuit 130, an adaptive threshold circuit 150 coupled to the output of gain select circuit 140, a horizontal accumulation circuit 160 coupled to the output of adaptive threshold circuit 150, a vertical accumulation circuit 170 coupled to the output of horizontal accumulation circuit 160, and a test pulse acquisition and control circuit 180 coupled to an output of divide and conquer circuit 130 and coupled to pre-processing circuit 100. In general, IPM 22 samples the ion detection signals received from ion detector 42, processes the sampled ion detection signals, and supplies processed signals corresponding to transients to SPM 26. According to some embodiments discussed further below, IPM 22 is preferably capable of sampling the ion detection signals at a rate of at least 1.5 GHz over a full mass range. Nevertheless, for some other embodiments, IPM 22 may be configured to sample at a lower rate and/or over a lesser mass range. In fact, the mass range may be selected by the operator and may range from a relatively small range focused on particular masses of interest or may include a full mass range. Moreover, IPM 22 need not be capable of sampling the ion detection signals at a rate of at least 1.5 GHz over a full mass range for all embodiments described herein. It is also preferable, but not required for all embodiments, that IPM 22 continuously samples the ion detection signals over the selected mass range.

As used herein, the phrase "full spectral range" shall mean approximately two orders of magnitude in the ratio of largest M/Z to smallest M/Z. For a mass spectrometer, the spectral range is the mass range. The full spectral/mass range may be different for different sources. For example, the full mass range for a liquid chromatograph may be 50 to 2500 M/Z, whereas the full mass range for a gas chromatograph may be 10 to 1500 M/Z.

As also described in more detail below, for some embodiments, IPM 22 may be configured to have a sensitivity that is sufficient to detect a single ion received within one of over at least 100 transients, more preferably over 1000 transients, and to detect and quantify a number of ions simultaneously striking said ion detector up to at least 10 simultaneously striking ions, more preferably up to at least 25 simultaneously striking ions, and even more preferably up to 256 ions.

As shown in FIG. 3, pre-processing circuit 100 may comprise a preamplifier 110 for amplifying the received ion detection signals. As described further below, preamplifier 110 may have a first output channel and a second output channel having a lower gain than the first output channel. Pre-processing circuit 100 may further comprise a first analog-to-digital converter (ADC) 120 coupled to the first output channel and a second ADC 125 coupled to the second output channel. The ADCs may both be 8-bit converters and may have a combined 11-bit output. Pre-processing circuit 100 may have a dynamic range for sampling ion detection signals having voltages between about 0.24 mV to about 0.5 V.

As shown, SPM 26 may include any one or more of an extended vertical summing circuit 200 coupled to the output of IPM 22, a cross-spectra filter 210 coupled to the output of extended vertical summing circuit 200, a first shaping filter 215 coupled to a first output of cross-spectra filter 210, a second shaping filter 220 coupled to a second output of cross-spectra filter 210, a first sharpening filter 225 coupled to an output of first shaping filter 215, a second sharpening filter 230 coupled to an output of second shaping filter 220, a first ion statistics filter 235 coupled to the output of first sharpening filter 225, a second ion statistics filter 240 coupled to the output of second sharpening filter 230, a first dynamic range encoded (DRE) circuit 255 coupled to the output of first ion statistics filter 235, a second DRE circuit 258 coupled to the output of second ion statistics filter 240, a peak histogram circuit 250 coupled to the output of second DRE circuit 258, a peak find and peak filter circuit 260 coupled to the output of peak histogram circuit 250 and to the output of DRE circuit 255, and a stick spectra generating circuit 270 coupled to the output of peak find and peak filter circuit 260.

SPM 26 receives the processed signals from IPM 22 and generates spectra at a rate matched to the time response of the separation techniques employed by the spectrometer. For the specific example described below the spectra reporting rate is preferably at rates up to at least 25 spectra per second, more preferably up to at least 35 spectra per second, more preferably, up to at least 50 spectra per second, more preferably, up to at least 100 spectra per second, and most preferably, up to at least 200 spectra per second. Unlike prior spectrometer systems, the spectra reporting rate and the spectral range may both be selected by the operator independent of one another. Because of the capabilities of the system, an operator may select to analyze a full spectral range while also selecting a reporting rate of up to 250 spectra/second. Accordingly, the operator may select narrower spectral ranges and slower reporting rates without one affecting the other. Also, because the data acquisition system 20 may dynamically change the reporting rate as a sample is processed, it supplies the reporting rate used for each spectra with each spectra to the external processor 27. The spectra reporting rate may be changed at predetermined intervals.

As will be discussed further below, the spectra generated by the data acquisition system 20 may have a precision (i.e., a mass precision in a mass spectrometer system) of 1 ppm or better. For a system used with a mass spectrometer, the mass precision, ∂M/M, represents the degree of mutual agreement among a series of individual tests measuring the position of the vertical centerline of a mass peak. Mass accuracy is the degree of conformity of a measured or calculated quantity of mass to its actual (true) value. Once TOF mass spectrometer 12 has been calibrated, its ability to remain accurate depends primarily upon the components of drift and aging. Referring to the equation relating M to TOF, ∂T/TOF is calculated as:

$$\frac{\partial T}{TOF} = \frac{k*\partial M}{2*\sqrt{M}*(k*\sqrt{M}+c)} = \frac{k*\partial M}{2*k*M+2*\sqrt{M}*c}$$

On the mass spectrometer 12, $k*M>>c*M^{1/2}$, producing $$\frac{\partial M}{M} = \frac{2\partial T}{TOF}$$

As also described further below, SPM 26 may generate stick spectra, which comprises a peak height, peak width, and a location in the spectrum for each detected peak, and supplies the stick spectra via ICM 32 to external processor 27 for post-processing. This is unlike any prior data acquisition systems, which do not generate and supply stick spectra. Instead, in prior systems, the spectra that were produced required much analysis to provide sufficient confidence in the spectral data. Some of this analysis was performed manually and some off-line by an external PC. In accordance with the present invention, data acquisition system 20 may generate the stick spectra in real time. The peak height may be reported as the ion concentration or data from which the ion concentration may be computed such as the number of ions counted for a particular peak. The supplied stick spectra may also include the peak width (i.e., the resolution) for each detected peak. With the capabilities of the present system, the detected peaks may have ion concentrations of as few as one ion, or of as many as 128 million ions.

ICM 32 may include any one or more of an analysis and spectrum headers circuit 300 coupled to the output of SPM 26, an interface 310 to an external processor/PC 27 that is coupled to the output of analysis and spectrum headers circuit 300, and an ADC alignment algorithm 320 that is coupled to test pulse acquisition and control circuit 180 of IPM 22.

As described in more detail below, ICM 32 may be configured to control the spectrometer by causing it to inject a test pulse at the beginning of each transient that is detected by the data acquisition system 20. From the test pulse, data acquisition system 20 may adjust one or more of the phase, offset, or gain of the output channels of the preamplifier 110 in response to the detection signals generated in response to the test pulse.

Having generally described IPM 22, SPM 26, and ICM 32, a more detailed description is provided below of each of the various components of IPM 22, SPM 26, and ICM 32. It should be appreciated that although specific constructions are provided in the detailed example to follow, the present invention is not limited to these specific constructions unless otherwise stated in the claims.

In the specific example to follow, an ion detector is utilized that has 2 mV nominal response to a single ion strike, which produces a Gaussian peak with a typical FWHH of 2 ns. For the particular example described herein, the maximum linear output of the detector is 0.5 VDC.

The output of detector 42 is supplied to preamplifier 110 of pre-processing circuit 100. As mentioned above, preamplifier 110 may have two output channels with the first output channel having a gain of, for example, eight times that of the second output channel, which may be a gain of unity. The signals of the first and second output channels may be filtered to dissipate out of band energy that may be reflected and to provide DC restoration to compensate for AC coupled detector 42. The filtering may be performed with a DC-400 MHz flat pass band. First ADC 120 receives the first output channel of preamplifier 110 while second ADC 125 receives the second output channel. Both ADCs may be 8-bit ADCs that sample the received signals at, for example, 1.5 GHz. The ADCs may allow for onboard offset and gain adjustment and a programmable delay for phase adjustment. The data from the ADCs may thus be aligned and weighted as shown in the following table. Note that the peak of a 2 mV ion strike will be approximately 8 counts.

| High Gain data bits | Low Gain data bits | Corresponding Signal Voltage at detector |
|---|---|---|
| | 7 | 250 mV |
| | 6 | 125 mV |
| | 5 | 62.5 mV |
| 7 | 4 | 31.25 mV |
| 6 | 3 | 16.63 mV |
| 5 | 2 | 7.81 mV |
| 4 | 1 | 3.91 mV |
| 3 | 0 | 1.95 mV |
| 2 | | 0.98 mV |
| 1 | | 0.49 mV |
| 0 | | 0.24 mV |

The outputs of the ADCs are then processed to reduce the clock rate but increase the data width. Each ADC may have a 16-bit output data bus that updates at 750 MHz. ADCs may thus preset data two bytes at a time to first FPGA 400 at 750 MHz. Each bus may be converted to a 32-bit 375 MHz bus which is fed into first FPGA 400 on which the remaining components of first processing module 22 may be provided. The data may be further divided inside first FPGA 400 by divide and conquer circuit 130 such that each channel has eight 8-bit busses each running at 187.5 MHz. This data division provides 5.33 ns per data point for initial processing. Each of the eight busses from the high gain channel is paired with a bus from the low gain channel for high/low gain selection.

As apparent from the table shown above, when combined, the two output channels provide 11-bit dynamic range at 8-bit resolution. When the high gain channel is not saturated, gain selection circuit 140 selects the high gain output to supply to adaptive threshold circuit 150 for subsequent processing, otherwise the low gain channel (8×) is selected and supplied. The high gain channel is considered saturated if the high gain ADC overflow bit is set. Once the high gain ADC overflow bit is cleared, the high gain channel may wait up to 23 ns to recover depending upon the saturation depth and duration. The high gain channel may thus be considered non-saturated once one of two conditions is true: 23 ns have passed since the last overflow event, or the difference between the two channels is less than a maximum deviation. The maximum deviation between channels is variable and presently set at 8 counts of the high gain channel. Often the saturation recovers after only a few samples and this provision improves the precision in the vicinity of large peaks.

The signals from the two channels may require phase, gain and offset matching so that the transition from one channel to the other is transparent. The manner by which such alignment may be performed is described towards the end of the specification. Combining the low gain and high gain channels at the transient level versus after the spectra are summed, maximizes signal integrity and minimizes storage. No action is taken on an overflow of the low gain channel.

After gain selection, an adaptive threshold is applied to remove offset, drift, acquisition noise, and the low frequency components remaining from the DC restoration so as to pass all ions and only ions. To apply the adaptive threshold, the mass range of each transient may be divided into a plurality of windows. The data may be processed as octets (8 points per octet) and the window width may be variable with the number of octets ranging from 3 to 63 and defaults to 30 octets (240 points, 160 ns (10 times the widest mass peak)).

The start threshold and end threshold values indicate the sampled points where thresholding starts and stops. The start threshold occurs before the start of collection and the end threshold occurs after the end of collection (see the description below relating to horizontal accumulation circuit 160). The start threshold begins on an octet boundary, and the end threshold is equal to the start threshold plus an integer number of window widths. For example, assume the start of collection is 213,248 226/256, and the end of collection is 1,502,934 6/256 corresponding to a M/Z range of 50.5 to 2509.8 for a high resolution liquid chromatography TOF mass spectrometer (LCHRT). If the window size is 30 octets, the start and end threshold points will be 213,240 and 1,503,000, respectively.

Adaptive threshold circuit 150 processes the data in each window to find the minimum value in the window. Next, a threshold for that window is calculated as a function of values of the received signals. More specifically the adaptive threshold is calculated by adding a predetermined offset to the window minimum. The offset is a conservative estimate of the peak to peak acquisition noise plus a small amount to account for both the drift and the low frequency DC restoration component; default is 4 counts. This offset is programmable and may thus be changed when depending, for example, on which source is used or the TOF mass spectrometer characteristics or expected sample characteristics. Once the adaptive threshold is determined for the window, adaptive threshold circuit 150 selectively adjusts the values of the received signal. More specifically, the offset is subtracted from all the data in the window that exceeds the adaptive threshold and all other data are replaced with zeros. FIGS. 4A and 4B illustrate the performance of the adaptive threshold. Specifically, FIG. 4A shows an example of raw data and FIG. 4B shows how that raw data would appear after application of the adaptive threshold.

Although the window size is variable, care should be taken as a window sized too small or too large will compromise performance. In addition, the offset added to account for noise and drift should be carefully selected: if the value is too large, ions will be missed, if the value is too low, noise will be passed. The start threshold, end threshold, window size, and offset may be changed during the course of a run. The change could take place after the current and next summed spectra are completed. The window size may change dynamically over the course of a transient as a function of TOF, much like the bin width changes as a function of TOF. Alternatively, the window size may be a constant window width.

Horizontal accumulation reduces the length of the spectrum data by combining adjacent samples into bins. A maximum of $2^{19}$=524,288 bins can be stored per spectrum based upon the depth of the first-in-first-out registers (FIFOs) used in the hardware used for this example. The bins are sized such that the ratio of the expected FWHH of a mass peak to the bin width (BinWidth), F2B, is 3.0:1. This causes all of the mass peaks to have the same width as measured in bins. The value of F2B may be selected to minimize the sensitivity of the mass precision to noise and spectral interferences.

$$F2B = \frac{FWHH_{meas}}{BinWidth} = 3.0$$

The following discussion illustrates how the number of bins for a given spectrum can be estimated for a given TOF range. Beginning with the definition of mass resolution:

$$R = \frac{TOF}{2*FWHH_{ana}}$$

The equation is re-written to solve for the expected analytical full-width-half-height of a mass peak in nanoseconds, $FWHH_{ana}$ $$FWHH_{ana} = \frac{TOF}{2*R}$$

The measured peak width, $FWHH_{meas}$, is a combination of $FWHH_{ana}$ and the ion detector's typical 2.0 ns full-width-half-height response to a single ion hit, $FWHH_{det}$.

$$FWHH_{meas} = \sqrt{FWHH_{ana}^2 + FWHH_{det}^2} = \sqrt{\left[\frac{TOF}{2*R}\right]^2 + 2.0^2}$$

The bin width at a given TOF can then be calculated as $$BinWidth = \frac{FWHH_{meas}}{F2B} = \frac{\sqrt{\left[\frac{TOF}{2*R}\right]^2 + 2.0^2}}{F2B}$$

The number of bins for a narrow TOF range can be approximated by $$\text{Bins} = \frac{\Delta TOF}{BinWidth}$$

For an extended TOF range, the following integral can be evaluated to determine the number of bins that will be produced.

$$\begin{aligned}
\text{Bins} &= \int_{TOF1}^{TOF2} \frac{\partial TOF}{BinWidth} \\
&= F2B * \int_{TOF1}^{TOF2} \frac{\partial TOF}{\sqrt{\left[\frac{TOF}{2*R}\right]^2 + 2.0^2}} \\
&= 2*R*F2B*\ln\left[\frac{TOF}{2*R} + \sqrt{\left[\frac{TOF}{2*R}\right]^2 + 2.0^2}\right]_{TOF1}^{TOF2}
\end{aligned}$$

$$\text{Bins} = 2*R*F2B*\left[\ln\left[\frac{TOF_2}{2*R} + \sqrt{\left[\frac{TOF_2}{2*R}\right]^2 + 2.0^2}\right] - \ln\left[\frac{TOF_1}{2*R} + \sqrt{\left[\frac{TOF_1}{2*R}\right]^2 + 2.0^2}\right]\right]$$

The above equation should be regarded as an approximation because the bin width does not change continuously, but rather granularly across the spectrum. However, the equation is still useful as the error is typically less than 0.05%.

A horizontal accumulation table may be used that divides the spectrum into as many as 511 segments with each segment having its own break point and bin width. Both the break points and bin widths are expressed to the nearest 1/256 of a sample point. The push pulse is designated as "time zero" and the break points are measured relative this time. The break points must be separated by an integer multiple of the bin width used between the break points. Due to FPGA constraints, the first break point is a minimum of 48 samples after time zero, and difference between two adjacent break points should be a minimum of 48 sampled points.

The $FWHH_{meas}$ increases as a function of TOF and a new table entry is calculated each time the $FWHH_{meas}$ increases by 0.5%. The value of 0.5% was selected so that if a particular mass peak happens to straddle the boundary where the bin width changes, the error in calculating the mass centroid will be less than 0.03 ppm.

The following discussion illustrates the calculations required to create the horizontal accumulation table.

To calculate the first bin width, one begins with the $FWHH_{meas}$ at TOF=0, which is simply equal to the detector's full-width-half-height of 2.0 ns.

$$\begin{aligned}
FWHH_{meas}(TOF=0) &= \sqrt{FWHH_{ana}^2 + FWHH_{det}^2} \\
&= \sqrt{\left[\frac{TOF}{2*R}\right]^2 + 2.0^2} \\
&= 2.0
\end{aligned}$$

The bin width at the beginning of the first segment is calculated by multiplying the $FWHH_{meas}$ by the sampling rate in GHz (1.5) to express it in units of samples and dividing by the ratio of full-width-half-height to bin width, F2B (3.0).

$$BinWidth_{begin}(1) = \frac{1.5 * FWHH_{meas}}{F2B} = 1.0$$

However, one may desire to calculate the bin width at the middle of the segment and use that to bin the data in the entire segment to minimize the error in binning. The bin width at the middle of a segment is (1+0.5%/2) times the bin width at the beginning of the segment rounded to the nearest 1/256.

$$BinWidth_{middle}(1) = \frac{\text{round}\lfloor 256 * 1.0025 * BinWidth_{begin}(1)\rfloor}{256} = 1\frac{1}{256}$$

The theoretical bin widths at the beginning of each segment are intermediate calculations and later used to determine the break point for the segment. The bin widths at the middle of the segment are the ones used to do the actual binning. Subsequent $BinWidth_{begin}(i)$ are calculated as an increase of 0.5% over the previous beginning bin widths and not rounded.

$$BinWidth_{begin}(i)=1.005*BinWidth_{begin}(i-1)$$

The $BinWidth_{middle}$ values are then calculated as a 0.25% increase over the $BinWidth_{begin}$ rounded to the nearest 1/256.

$$BinWidth_{middle}(i) = \frac{\text{round}\lfloor 256 * 1.0025 * BinWidth_{begin}(i)\rfloor}{256}$$

Once a $BinWidth_{begin}$ is calculated, reverse logic is used to calculate the break points. The equation for $FWHH_{meas}$ in ns at the beginning of a new segment is $$FWHH_{meas}(i) = \frac{F2B * BinWidth_{begin}(i)}{1.5}$$

The analytical $FWHH_{ana}$ necessary to produce this measured peak width using a 2.0 ns detector is $$FWHH_{ana}(i)=\sqrt{FWHH_{meas}(i)^2-2.0^2}$$

The TOF that would have produced this $FWHH_{ana}$ is calculated as $$TOF(i)=2*R*FWHH_{ana}(i)=2*R*\sqrt{FWHH_{meas}(i)^2-2.0^2}$$

The number of samples since the push pulse is then 1.5 times the TOF.

$$Samples(i)=1.5*TOF(i)$$

The break points should be separated by an integer number of bins at a given bin width, so the number of bins sampled at the previous bin width is $$\text{Bins}(i-1) = \text{round}\left[\frac{\text{Samples}(i) - Samples(i-1)}{BinWidth_{table}(i-1)}\right]$$

The BreakPoint(i) is then equal to $$BreakPoint(i)=BreakPoint(i-1)+Bins(i-1)*BinWidth_{middle}(i-1)$$

These steps for calculating bin widths and break points continue to the end of the extended mass spectrum ($M/Z_{max}$=10,000; $TOF_{max}$=2.0 ms) to produce the horizontal accumulation table. The actual bin widths and break points are multiplied by 256 and represented as 13-bit and 30-bit binary integers before being sent to horizontal accumulation circuit 160 in first FPGA 400. Horizontal accumulation circuit 160 understands that there is an implied binary point between the 8 least significant bits and the rest of the bits.

A different horizontal accumulation may be calculated for each of the spectrometer modes: Normal Mode, Zoom Mode, and Diamond Mode.

Once the horizontal accumulation table is calculated and downloaded to horizontal accumulation circuit 160 for a given mode (Normal Mode, Zoom Mode, or Diamond Mode), the table remains intact until the spectrometer mode is changed. Note that the horizontal accumulation table is defined for the entire extended mass range (M/Z=0 to 10,000) and need not be changed to collect different sections of the mass spectrum. The data collection period is defined by the start collection and end collection points and both points occur at break points in the horizontal accumulation table. To begin the binning, horizontal accumulation circuit 160 will scan through the horizontal accumulation table until the break point equals the start collection point. Binning will then begin with the corresponding bin width in the table.

The following example illustrates the binning process. Assume the start collection is $213,248\frac{226}{256}$ corresponding to the breakpoint at M/Z=50.5 for an LCHRT. The bin width for this segment is $1\frac{59}{256}$. Since the first bin begins at $213,248\frac{226}{256}$, the fraction ($\frac{226}{256}-\frac{226}{256}=\frac{30}{256}$) of sample 213,248 will be used as a part of the first bin. The value of sample 213,249 is then added in its entirety to the bin. To this point $1\frac{30}{256}$ of the $1\frac{59}{256}$ bin width has been used, so $1\frac{59}{256}-1\frac{30}{256}=\frac{29}{256}$ of sample 213,250 is added to complete the bin. The calculation is shown below.

$$Bin_1 = \frac{30*Sample_{213,248} + 256*Sample_{213,249} + 29*Sample_{213,250}}{256}$$

This process of calculating bins continues until the end collection point is reached. Care should be taken so that the total number of bins required to bin the spectrum from the start collection and end collection points is less than 524,288 bins. The start collection and end collection points may be changed during the course of a run. The change will take place after the current and next summed spectra are completed.

Figure 5:
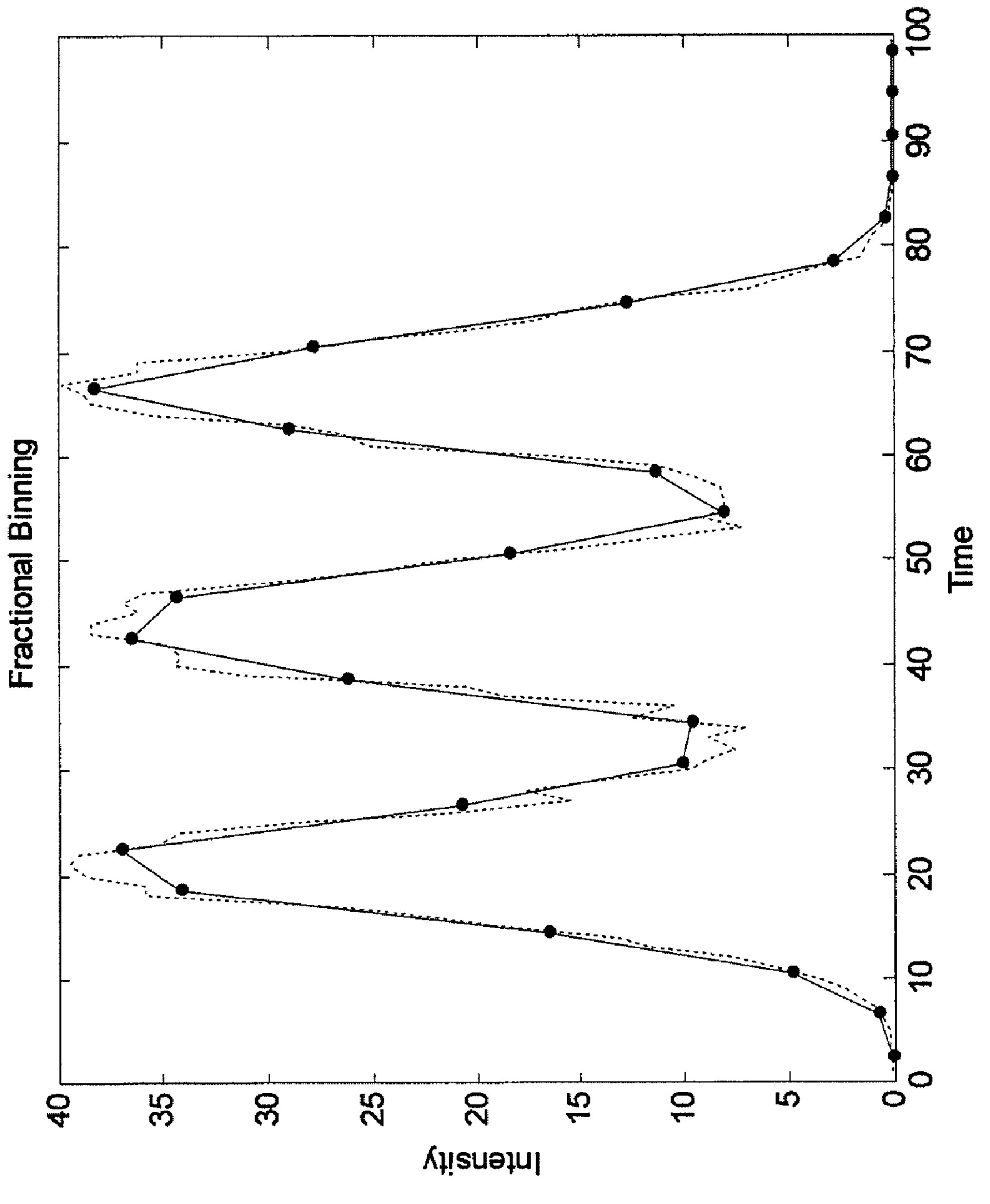
FIG. 5 is a graph representing two plots with the first plot showing a portion of a transient prior to horizontal accumulation and the second plot showing the portion of the transient after horizontal accumulation.

For the particular example discussed above, binning reduces the data from 1.5 million samples to 0.5 million bins, which fits the FIFO depth and provides more time per bin for later processing steps. An example of the effects of binning is shown in FIG. 5 in which the original signal is shown in dashed lines and the binning is shown as points connected by solid lines.

Spectra summing is performed by vertical accumulation circuit 170 and extended vertical summing circuit 180. Vertical accumulation circuit 170 sums one to 128 of the transients of binned data received from horizontal accumulation circuit 160. The output of vertical accumulation circuit 170 is 18 bits wide and written four words at a time into two 36-bit transfer FIFOs for retrieval by extended vertical summing circuit 200. The maximum number of vertical sums is dependent upon the maximum bin width for the spectrum. For example, if the maximum bin width is $5\frac{25}{256}$ samples wide for $M/Z_{max}$=2500, the bin width will use $\log_2(5\frac{25}{256})$=2.35 bits of the 18 available bits. Eleven bits are used to cover the dynamic range of the detector. Therefore, a total of 13.35 bits are consumed through horizontal accumulation. The balance of the bits (18−13.35=4.65) bits can be used for the first stage of vertical accumulation. Because $2^{465}$=25.11, vertical accumulation circuit 170 can sum a total of 25 transients without overflowing the 18-bit limit.

The minimum number of vertical sums is set by the requirement that the next stage in the signal processing chain, extended vertical summing circuit 200, is capable of retrieving data from the transfer FIFOs at a maximum rate of 8.0 ns per bin. For example, an LCHRT spectrum defined from M/Z=50 to 2500 should have 495,874 bins and the transient time for this spectrum is 1,000,000 ns. The time per bin for a single transient is then 1,000,000/495,874=2.02 ns/bin. To observe the 8.0 ns minimum time, a minimum of roundup (8.0/2.02)=4 transients should be summed. Note that this requirement also sets the maximum spectra reporting rate for this LC analysis at $1/4.0$ ms=250 summed spectra per second. Vertical accumulation circuit 170 is supplied with the number of vertical sums and care must be taken to insure that the number of sums does not violate either the minimum or maximum sums for a particular analysis. The number of vertical sums may be changed during the course of a run. The change will take place after the current and next summed spectra are completed.

The second stage of vertical summing is extended summing and is performed by extended vertical summing circuit 200. The output of extended vertical summing circuit 200 is a maximum of 31 bits wide holding values between 0 and $2^{31}-1$. The number of extended sums is dependent upon the maximum bin width and the number of vertical sums. For example, if the maximum bin width is $5\frac{25}{256}$ samples wide for an LC analysis with a maximum M/Z of 2500, the bin width will have $\log_2(5\frac{25}{256})$=2.35 bits of the 31 available bits. The dynamic range of the output of the gain select is 11 bits for a total of 13.35 bits. If 25 vertical sums are taken using $\log_2(25)$=4.65 bits, the total comes to 18 bits of the available 31 bits. Therefore, a maximum of 13 extended summing bits are available or $2^{14}$=8192 extended sums. The transient time for an LC analysis is 1.0 ms, so the longest spectra summing time is 25*8192*1.0 ms=204.8 seconds (204,800 sums).

The FPGA will be supplied with the number of extended sums and care must be taken to insure that the number of sums does not cause the output of the extended summing to violate the 31 bit maximum. The number of extended sums may be changed during the course of a run. The change will take place after the current and next summed spectra are completed.

The 31-bit extended summing output is converted to an 18-bit floating point number to conserve FIFO memory space while retaining enough precision to preserve the analytical quality of the data: the round-off error will result in a maximum mass error of less than 0.03 ppm. The floating point conversion has a binary radix, 13-bit precision, and no sign bit.

$$b \Rightarrow c*2^d$$

where b is the 31-bit input data, c is the 13-bit binary mantissa or significant; and d is the 5-bit integer binary exponent. To perform the compression, the most significant non-zero bit (msnzb) is identified. If the msnzb is in bit location 0 to 12, c is simply the 13 least significant bits of b, and d is zero. If msnzb is in bit location 13 to 31, c is the 13 most significant bits of b beginning with msnzb, and d is the binary coded number of msnzb-12. For example, consider the case of $b=0000000000000100101001001010100_b$ with the 13 most significant non-zero bits highlighted in red. The msnzb is in location 17, so $c=10010100_b$, and $d=17-12=5_d=101_b$. The converted number is formatted and stored with mantissa first followed by the exponent: $100101001001000101_b$. To convert back to the 31-bit format, the 13-bits of c are simply shifted left 5 places.

For the next processing step which is performed by cross-spectra filter 210, each bin is vertically filtered meaning that it is filtered with the other bins in the same bin location in neighboring summed spectra. The calculation of the retention filter uses two feedback taps and one input tap including: the input is the last extended summing output at that bin location; and two of the inputs are the last two outputs of cross-spectra filter 210 at that bin location. Two FIFOs are available with 36 bits each for a total of 72 bits wide by 524,288 locations (bins) deep. The first 5 most significant bits of the first FIFO are reserved for future use. The next 31 most significant bits of the first FIFO are reserved for the 31-bit extended summing. The second FIFO is divided into two 18-bit fields holding the floating point conversion of the last two outputs of cross-spectra filter 210. The following table illustrates the storage format of the two 36-bit FIFOs.

| | Bits | | | |
|---|---|---|---|---|
| | 35-31 | 30-0 | 35-18 | 17-0 |
| Description | RSV'd | Extended Sum | RF (n − 1) | RF (n − 2) |

The floating point format may be hard-coded and therefore not open to modification.

Filtering across spectra improves the precision of the mass peak calculation by averaging more ions at a particular mass. The spectra reporting rate of an analysis may be set such that a chromatographic peak has 10 or more, preferably 20, summed spectra across its FWHH for the sake of subsequent chromatographic deconvolution. Cross-spectra filter 210 is a $2^{nd}$ order low-pass IIR filter with its bandwidth set to allow the chromatographic peaks with FWHH as narrow as 20 summed spectra to be filtered with little distortion. Cross-spectra filter 210 has two real and equal poles so that the filter's response will be critically damped and never produce a negative output. The natural frequency of the poles is equal to $$w_n = \frac{2\pi}{1.2 * FWHH_{chrom}} = \frac{2\pi}{24} = 0.2618$$

Each first order section has the following structure $$z(n)=\alpha*z(n-1)+(1-\alpha)*x(n)$$

$$y(n)=\alpha*y(n-1)+(1-\alpha)*z(n)$$

Where $$\alpha=e^{-w_n}=0.7697$$

Cascading the two first order sections together produces $$y(n)=2*\alpha*y(n-1)-\alpha^2*y(n-2)+(1-\alpha)^2*x(n)$$

Next, because the output of cross-spectra filter 210 is truncated to be an integer, the gain of the filter is increased to 32 to prevent the contribution from small x(n) signals from being ignored.

$$y(n)=2*\alpha*y(1-1)-\alpha^2*y(n-2)+\text{Gain}*(1-\alpha)^2*x(n)$$

Cross-spectra filter 210 is rewritten with 'a' and 'b' coefficients as $$y(n)=a1*y(n-1)+a2*y(n-2)+b1*x(n)$$

The filter coefficients are rounded to the nearest 1/256 producing the final equations and default filter coefficients. The value of $FWHH_{chrom}$ can be adjusted as needed for various chromatograms.

$$FWHH_{chrom} = 20,$$

$$w_n = \frac{2\pi}{1.2 * FWHH_{chrom}} = \frac{2\pi}{24} = 0.2618,$$

$$\alpha = e^{-w_n} = 0.7697,$$

$$\text{Gain} = 32$$

$$a1 = \frac{\text{round}(256 * 2 * \alpha)}{256} = 1\frac{138}{256}$$

$$a2 = \frac{\text{round}(256 * -\alpha^2)}{256} = -\frac{152}{256}$$

$$b1 = \frac{\text{round}[256 * \text{Gain} * (1-\alpha)^2]}{256} = 1\frac{192}{256}$$

Figure 6:
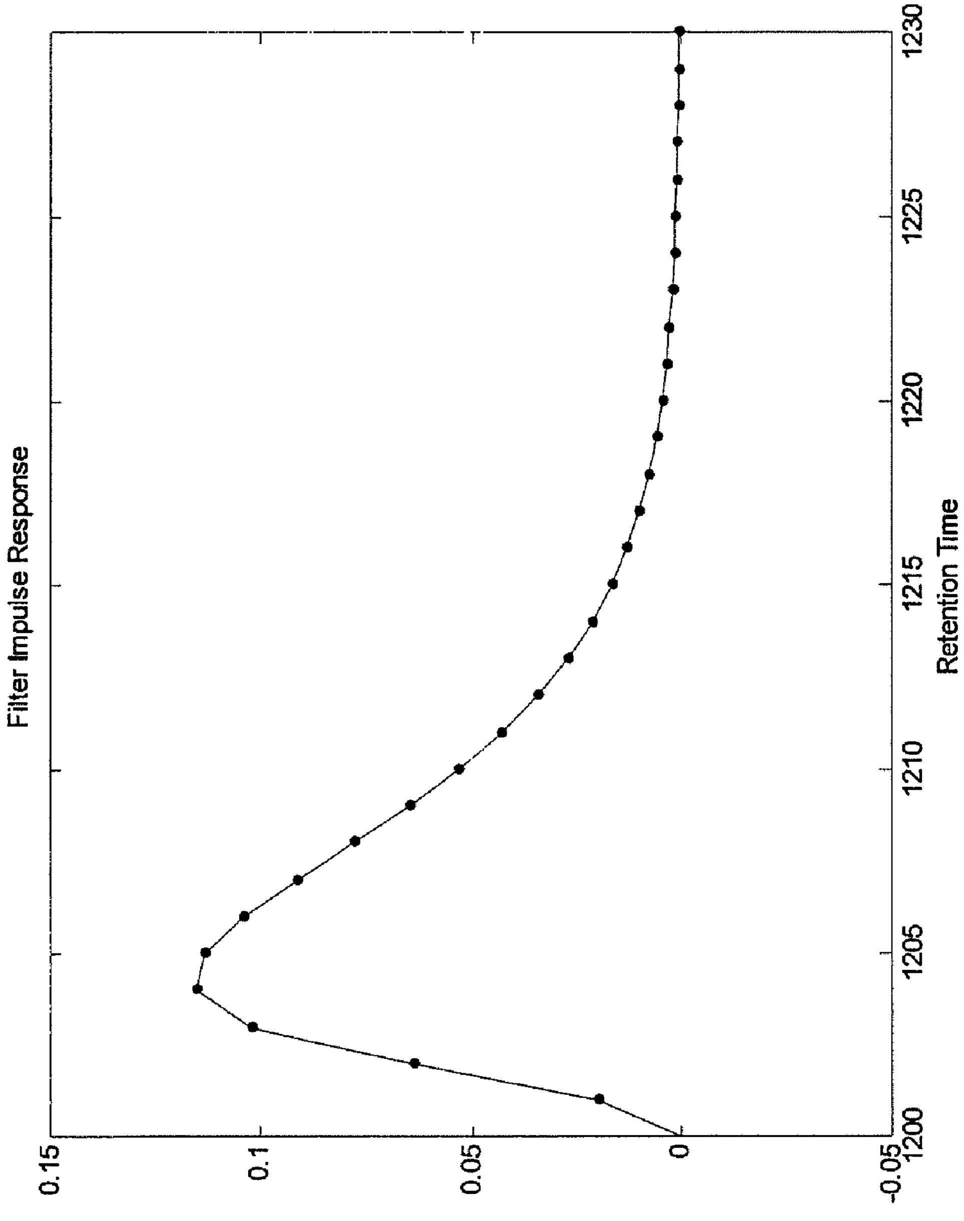
FIG. 6 is a graph representing a plot of an example of a filter impulse response for a cross-spectra filter of the present invention.

The coefficients are limited to the range of −4 to 3255/256 and are represented by 11-bit words. The first bit is the sign bit, the next two bits are the integer, and the last 8 bits represent the fraction. Cross-spectra filter 210 using the default coefficients will effectively consider 9-10 times the number ions on average than are present in a single summed spectrum (the area under its unit impulse response (shown in FIG. 6) is 9).

This effective increase in ions will permit the stick spectra to be calculated with greater precision, improved sensitivity, and accuracy. For example, 72 ions are required to provide 1 ppm mass precision. Without cross-spectra filter 210, at least 72 ions must hit in the summed spectrum of interest. However, with the default cross-spectra filter 210, only 9 ions on average must be present per summed spectrum providing an effective 9- to 10-fold improvement in sensitivity (detection limit). Cross-spectra filter 210 also prevents the stick at particular masses from dropping out due to ion scarcity, and aids in the subsequent identification of chromatographic peaks. The precision may be reduced to the 8 most significant bits allowing 24-bit data to be stored as sufficient for 0.015 ppm mass precision. Cross-spectra filter 210 also introduces constant phase delay of, for example, 7 summed spectra.

As described in the previous section, cross-spectra filter 210 has the following structure $$y(n)=a1*y(n-1)+a2*y(n-2)+b1*x(n)$$

The cross-spectra filter 210 is run for every bin (b) in the mass spectra across the chromatographic axis where n represents the index of the summed spectra. The output of the filter y(n) is then replaced with the double indexed retention filtered output RF(n,b) and the input x(n) is replaced with the double indexed extended summing input ES(n,b) producing $$RF(n,b)=a1*RF(n-1,b)+a2*RF(n-2,b)+b1*ES(n,b)$$

The first two filter outputs at every bin location are handled specially for smooth start-up as shown below.

$$RF(1,b)=ES(1,b)$$

$$RF(2,b)=(a1+a2)*RF(1,b)+b1*ES(2,b)$$

Figure 7:
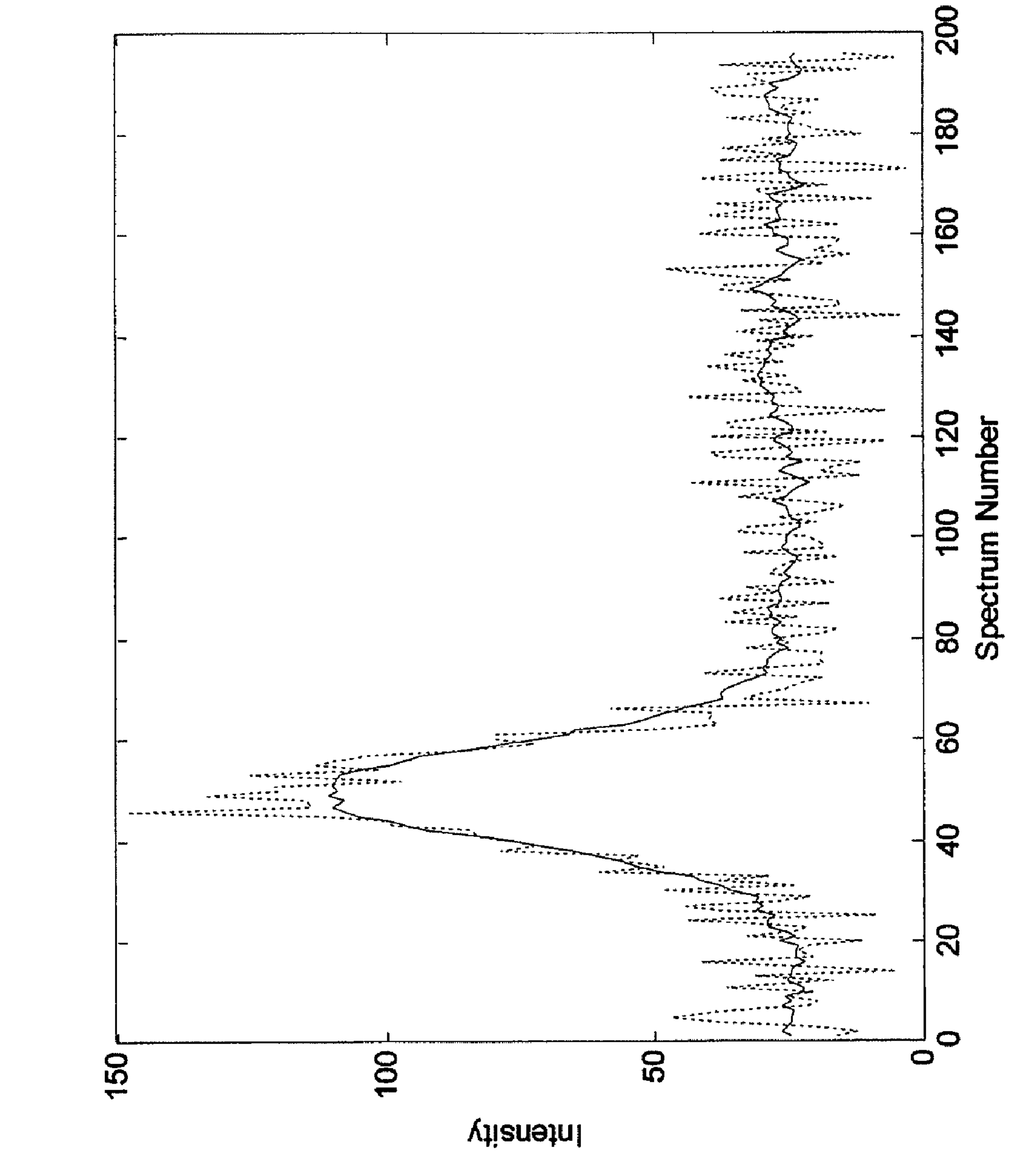
FIG. 7 is a graph representing a plot of the filter performance of an example of a cross-spectra filter of the present invention on a chromatographic peak with a FWHH of 20 summed spectra.

The first filter input, ES(n,b), is in 26-bit format and the other two filter inputs are converted from 13-bit precision floating point notation to 31-bit format as described above. The retention output is a 39-bit result with 8 fractional bits. The result is truncated to a 31-bit integer value and converted back to 13-bit floating point format before being stored as described above. Cross-spectra filter 210 may have imaginary poles meaning that even with an all positive input, the potential exists for a negative output. Since a negative output has no physical interpretation, all negative filter outputs are given a value of zero. FIG. 7 illustrates an example of the cross-spectra filter performance on a chromatographic peak with a FWHH of 20 summed spectra where an input signal is shown with dashed lines and the output is shown in solid lines.

Cross-spectra filter 210 may be reinitialized at the beginning of a run, when the spectrometer mode is changed, or when the collected TOF range is changed. If the retention coefficients are changed to keep pace with an expected increasing chromatographic peak width, the filter does not have to be reinitialized. The cross-spectra filter coefficients may be modified during the course of a run. The change will take place after the current and next summed spectra are completed.

Although cross-spectra filter 210 is described as being an IIR filter, it could also be an FIR filter.

Shaping filters 215 and 220 minimize the effect of skew and excess on the determination of mass accuracy. Skew refers to non-symmetric peak fronting or tailing, and excess refers to symmetric Lorentzian shoulders. The stick spectra calculations assume a Gaussian peak shape and deviations from Gaussian due to skew or excess can degrade mass accuracy and ion concentration accuracy.

To create the shaping filters, the spectrometer is first characterized by extracting a relatively significant peak from the cross-spectra filtered data. The peak is approximately centered in a 25-point field and a Pearson VII equation is fit to the peak. The Pearson VII shown below has five parameters affecting five peak characteristics:

$$y = \frac{a\left[1+\left[\frac{t-c*\phi-b}{c}\right]^2\right]^{-d} * \exp\left[-e*\left[\tan^{-1}\left[\frac{t-c*\phi-b}{c}\right]+\tan^{-1}[\phi]\right]\right]}{[1+\phi^2]^{-d}}$$

$$\phi = \frac{e}{2*d}$$

Where
a: amplitude
b: peak location
c: approximate underlying Gaussian FWHH
d: Lorentzian coefficient
e: fronting (+) or tailing (−) skew.

Figure 8:
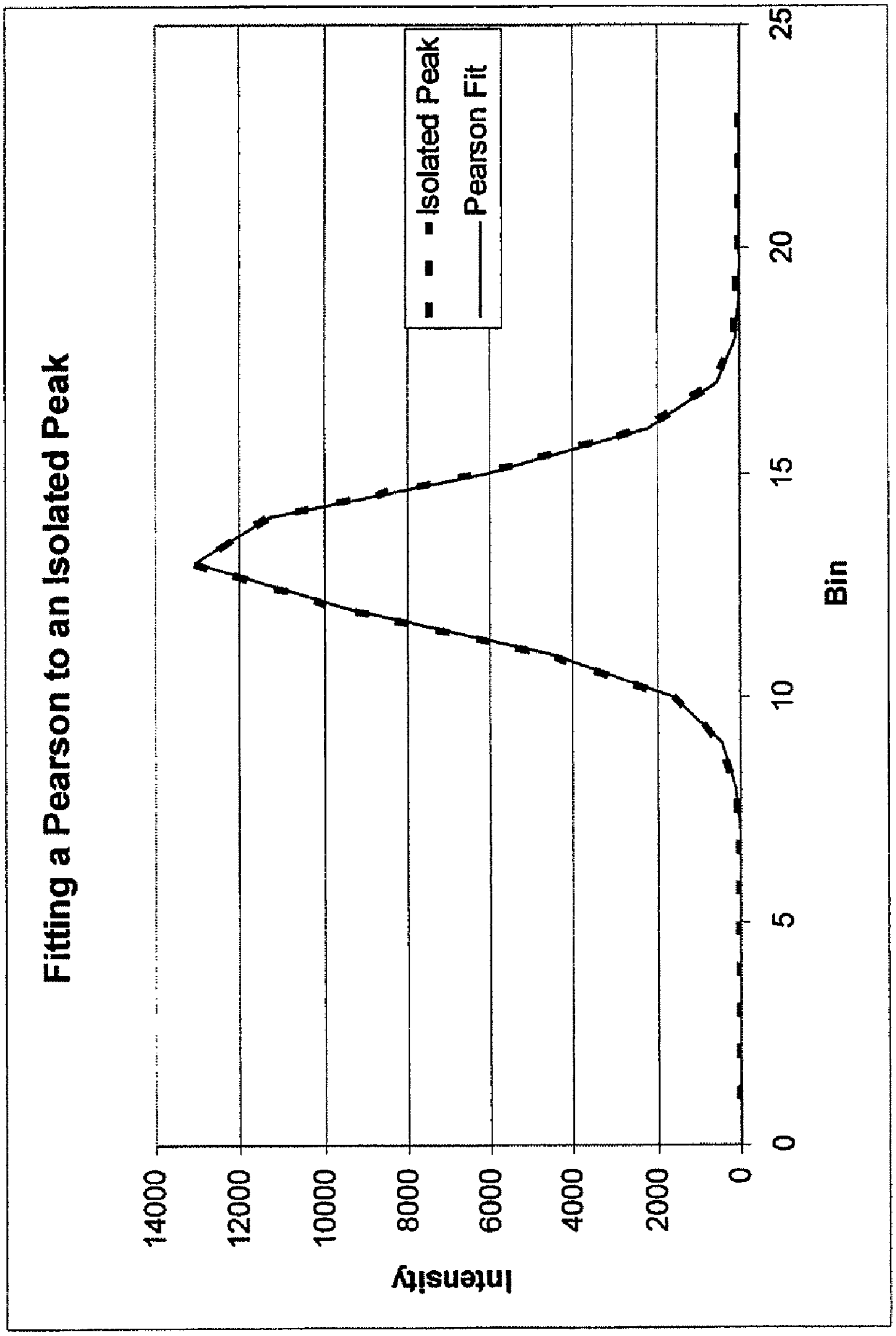
FIG. 8 is a graph representing a plot of an isolated peak taken from a spectrum and a fit of the peak to a Pearson fit.

The five Pearson VII parameters are adjusted using a regression algorithm such as the Levenberg-Marquart non-linear regression algorithm to minimize the sum-squared error between the original data and the Pearson peak. FIG. 8 illustrates a peak taken from an HRT spectrum and shows excellent agreement between the data and the Pearson fit.

Figure 9:
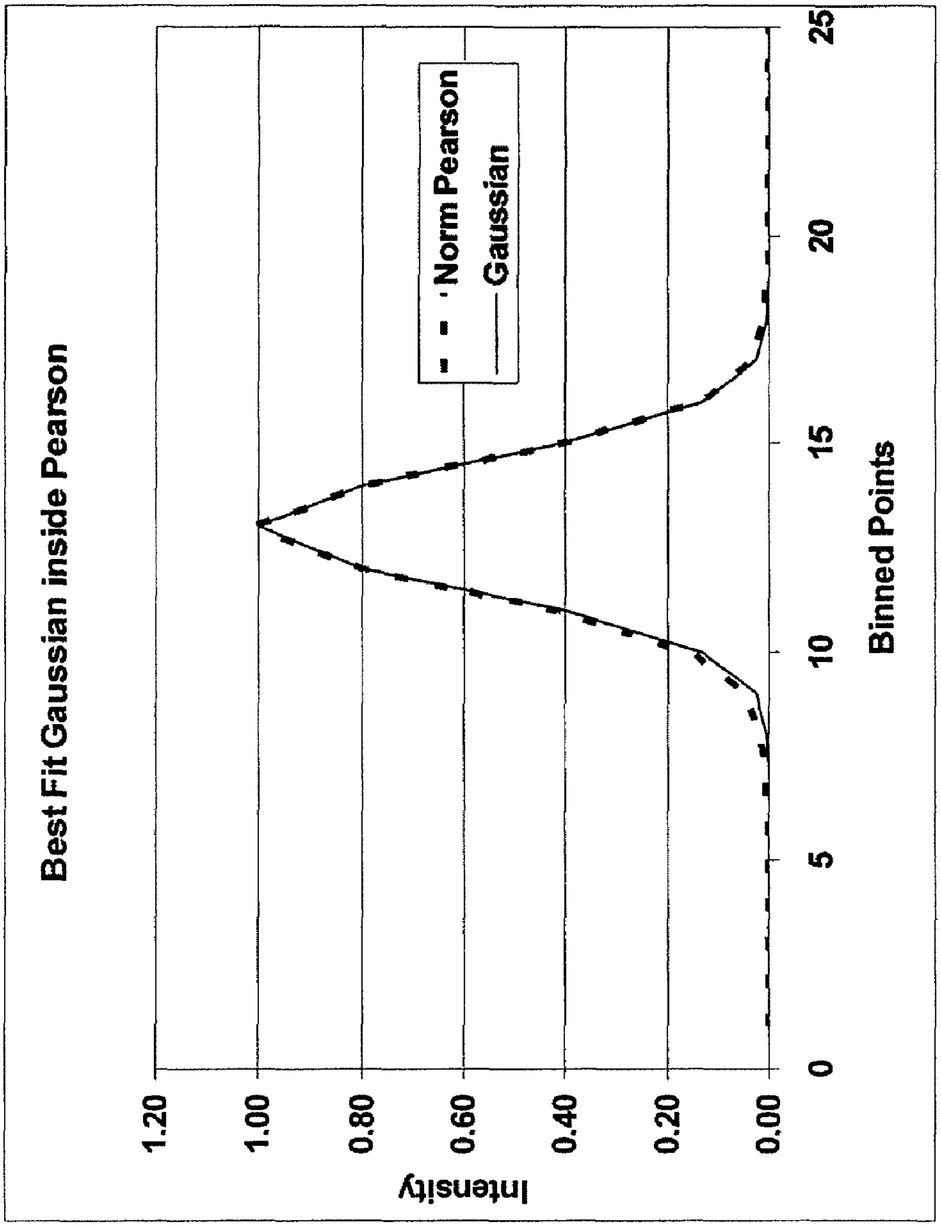
FIG. 9 is a graph representing plots of a normalized Pearson peak and a Gaussian best fit peak.

The Pearson fit is used as a way of providing a smooth estimate of the instrument function and produces well-behaved filter coefficients using the process described below. If the actual peak data was used instead of the Pearson peak in the later processing steps, shaping filters 215 and 220 may over-fit the noise of the extracted peak. Once the Pearson parameters are found, the Pearson is normalized to unit amplitude, and the peak is exactly centered in the middle of a 25-point field at point 13. The points along the Pearson peak are PS(t) where t=1 to 25. A Gaussian peak with the same amplitude and apex location is fit inside the Pearson using a linear regression algorithm that adjusts its FWHH such that the sum of the square of the differences between the points on the Pearson and the Gaussian peaks is minimized. The points along the Gaussian peak are G(t) where t=1 to 25. The results of this regression are displayed in FIG. 9.

As used in this example, shaping filters 215 and 220 are FIR filters. The shaping FIR coefficients are next calculated using linear regression such that the signal created by filtering the Pearson peak with these coefficients will most closely match the Gaussian peak in a least square sense. Shaping filters 215 and 220 have 5 taps, and due to its non-symmetric nature, all 5 taps are unique. The filtering problem can be set up with the following matrix notation.

$$P*a=G$$

Where P represents the Pearson peak, 'a' represents the set of shaping coefficients, and G represents the Gaussian peak. The coefficients are found by linear regression.

P is a rectangular matrix with 21 rows and 5 columns. The number of columns in P is equal to the number of taps in the filter and the number of rows in P is equal to the number of points along the curve minus the number of taps plus 1. Each row of P consists of 5 consecutive points along the Pearson. The first row is PS(1) through PS(5), the second row is PS(2) through PS(6) and so on to row 21 which is PS(21) through PS(25).

$$P = \begin{bmatrix} PS(1) & PS(2) & PS(3) & PS(4) & PS(5) \\ PS(2) & PS(3) & PS(4) & PS(5) & PS(6) \\ \downarrow & \downarrow & \downarrow & \downarrow & \downarrow \\ PS(20) & PS(21) & PS(22) & PS(23) & PS(24) \\ PS(21) & PS(22) & PS(23) & PS(24) & PS(25) \end{bmatrix}$$

'a' is a column vector of length 5 holding the filter coefficients.

$$a = \begin{bmatrix} a1 \\ a2 \\ a3 \\ a4 \\ a5 \end{bmatrix}$$

G is a column vector of length 21 represented by points GS(3) through GS(23).

$$G = \begin{bmatrix} GS(3) \\ GS(4) \\ \downarrow \\ GS(22) \\ GS(23) \end{bmatrix}$$

The matrix equation represents 21 equations with 5 unknowns.

$$a1*PS(1)+a2*PS(2)+a3*PS(3)+a4*PS(4)+a5*PS(5)=GS(3)$$

$$a1*PS(2)+a2*PS(3)+a3*PS(4)+a4*PS(5)+a5*PS(6)=GS(4)$$

$$a1*PS(21)+a2*PS(22)+a3*PS(23)+a4*PS(24)+a5*PS(25)=GS(23)$$

The equations are solved so that the sum of the square of the errors is minimized. The errors are defined as:

$$ER(1)=a1*PS(1)+a2*PS(2)+a3*PS(3)+a4*PS(4)+a5*PS(5)-GS(3)$$

$$ER(2)=a1*PS(2)+a2*PS(3)+a3*PS(4)+a4*PS(5)+a5*PS(6)-GS(4)$$

. . .

$$ER(21)=a1*PS(21)+a2*PS(22)+a3*PS(23)+a4*PS(24)+a5*PS(25)-GS(23)$$

Figure 10:
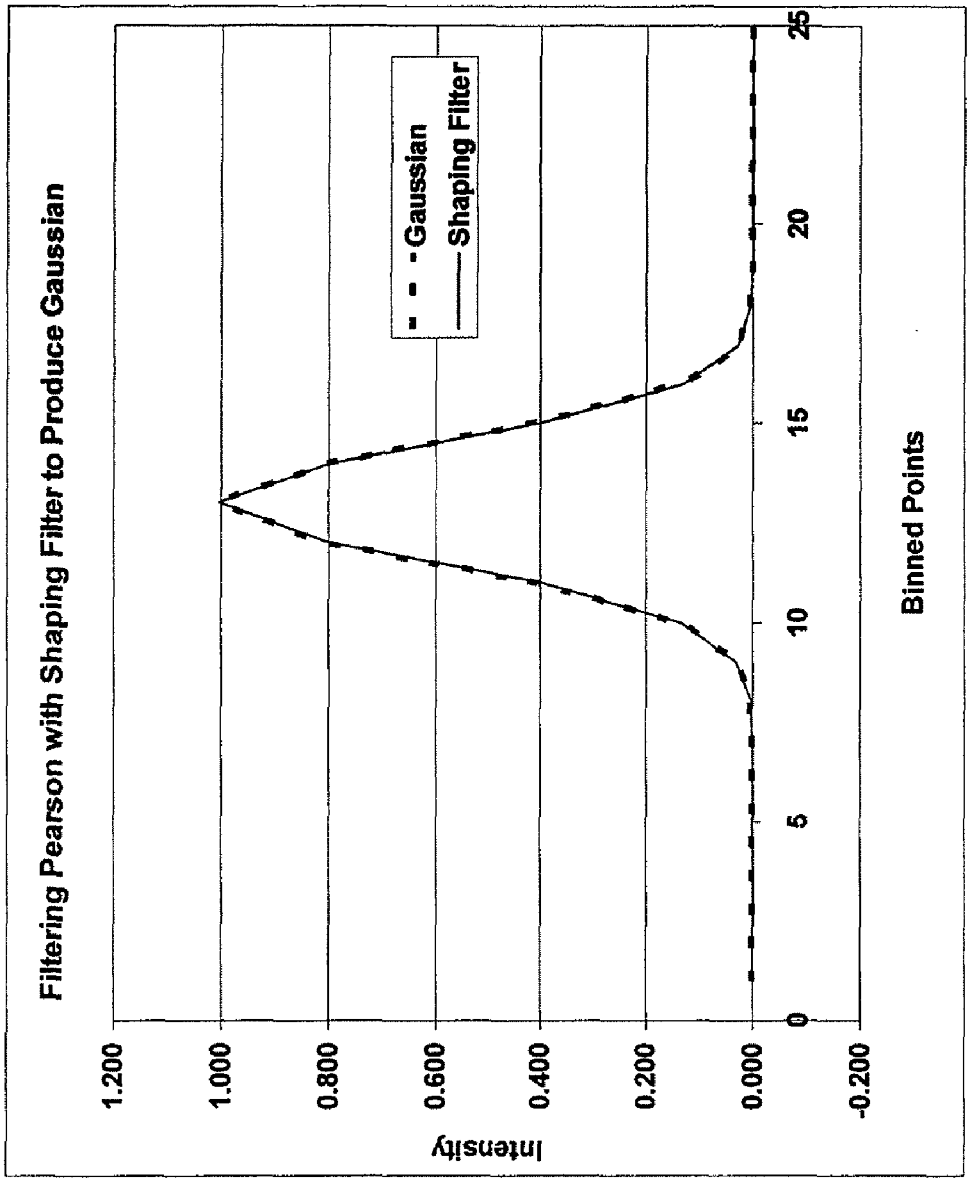
FIG. 10 is a graph representing plots of a Gaussian peak and a Pearson fit peak filtered with an example of a shaping filter of the present invention.
Figure 11:
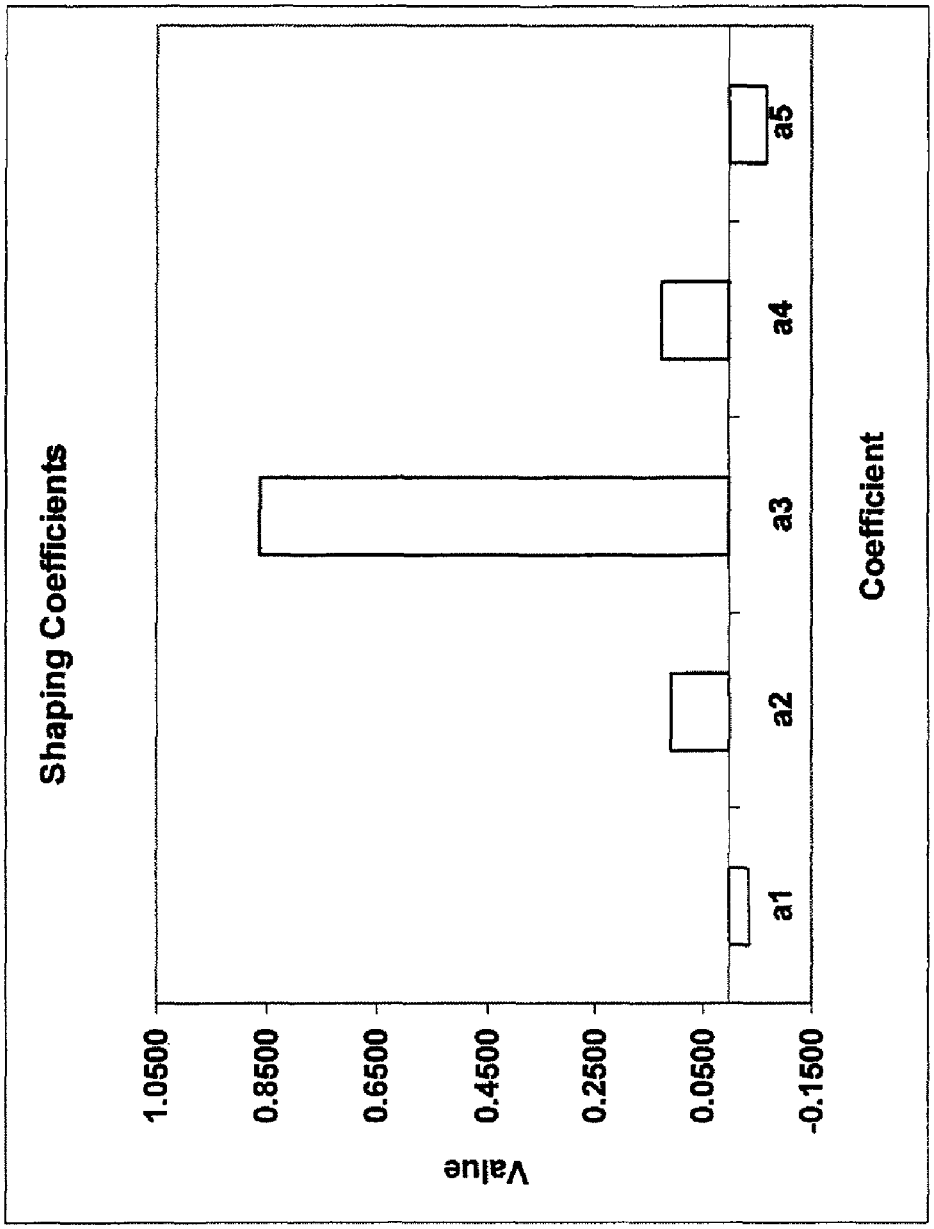
FIG. 11 is a graph representing an example of the coefficients that may be used by the shaping filter.
Figure 12:
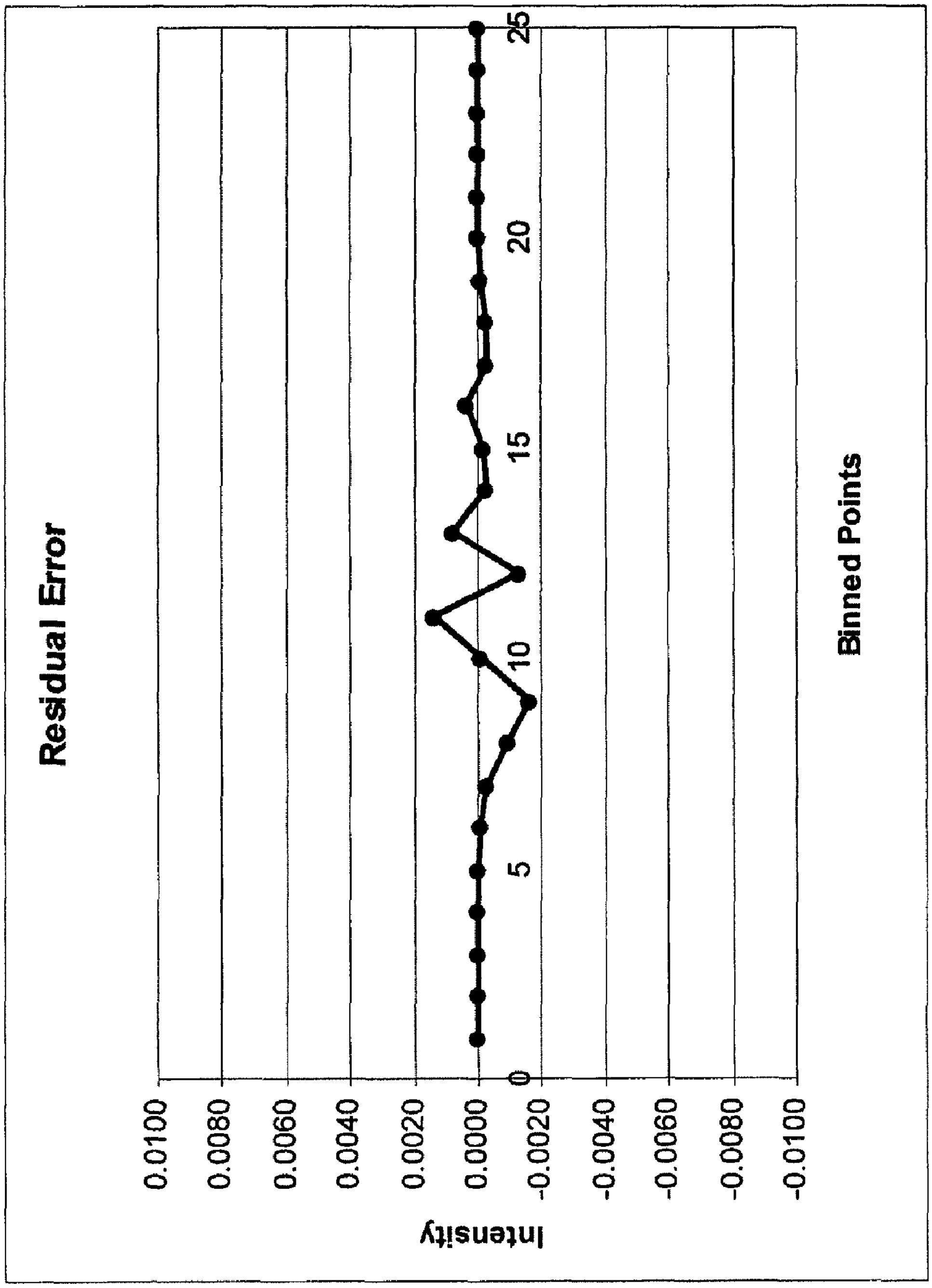
FIG. 12 is a graph representing a plot of residual errors from the shaping filter.

FIG. 10 illustrates that a near perfect Gaussian is produced by filtering the Pearson with the shaping coefficients and FIG. 11 illustrates an example of the shaping coefficients. The residual errors are typically small as illustrated in FIG. 12.

Various portions of the spectra may require different shaping filters so the spectrometer may require peak characterization at several points in the spectra. A set of shaping filter coefficients will accompany the binning breakpoint table.

Shaping filters 215 and 220 may have some negative coefficients producing the potential for a negative output even when all the inputs are positive. Since a negative output has no physical interpretation, all negative filter outputs are set to zero. Shaping filters 215 and 220 have the following structure using the output of cross-spectra filter as its input.

$$SK(i)=a1*RF(i-2)+a2*RF(i-1)+a3*RF(i)+a4*RF(i+1)+a5*RF(i+2)$$

The first two and last two filter outputs are specially treated as shown below.

$$SK(0)=a1*RF(0)+a2*RF(0)+a3*RF(0)+a4*RF(1)+a5*RF(2)$$

$$SK(1)=a1*RF(0)+a2*RF(0)+a3*RF(1)+a4*RF(2)+a5*RF(3)$$

$$SK(\mathrm{end}-1)=a1*RF(\mathrm{end}-3)+a2*RF(\mathrm{end}-2)+a3*RF(\mathrm{end}-1)+a4*RF(\mathrm{end})+a5*RF(\mathrm{end})$$

$$SK(\mathrm{end})=a1*RF(\mathrm{end}-2)+a2*RF(\mathrm{end}-1)+a3*RF(\mathrm{end})+a4*RF(\mathrm{end})+a5*RF(\mathrm{end})$$

The shaping filters receive 31-bit unsigned integer inputs from the cross-spectra filter. The filter coefficients are limited to the range of −4 to $3\frac{255}{256}$ and are represented by 11-bit words. The first bit is the sign bit, the next two bits are the integer, and the last 8 bits represent the fraction. The shaping filter outputs are truncated to a 31-bit unsigned integer and limited to values greater than or equal to zero as described above.

Figure 13:
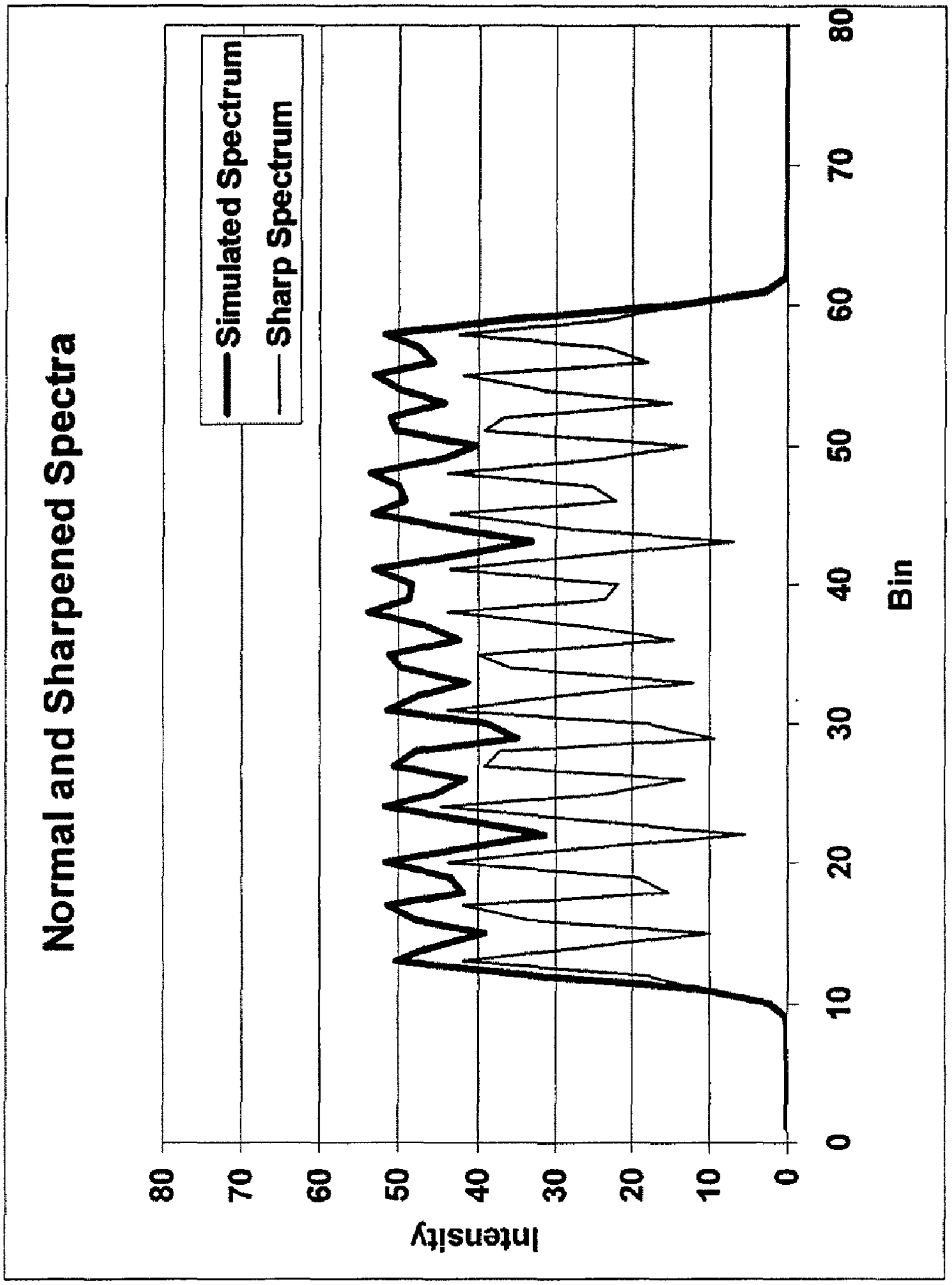
FIG. 13 is a graph representing plots of a simulated spectrum and the simulated spectrum as passed through an example of a sharpening filter of the present invention.
Figure 14:
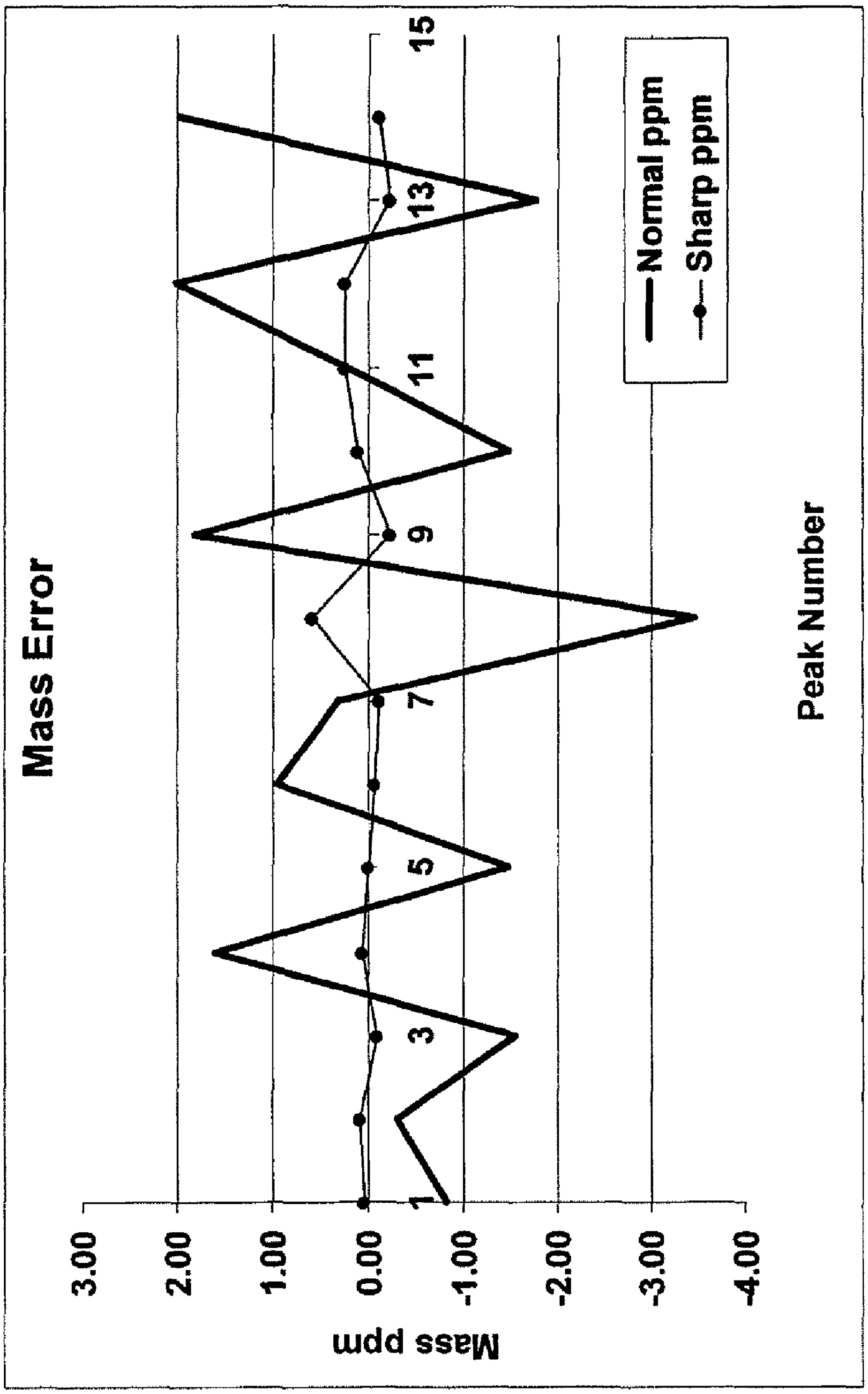
FIG. 14 is a graph representing plots of the mass error in ppm before and after sharpening for the simulated spectrum in FIG. 13.
Figure 15:
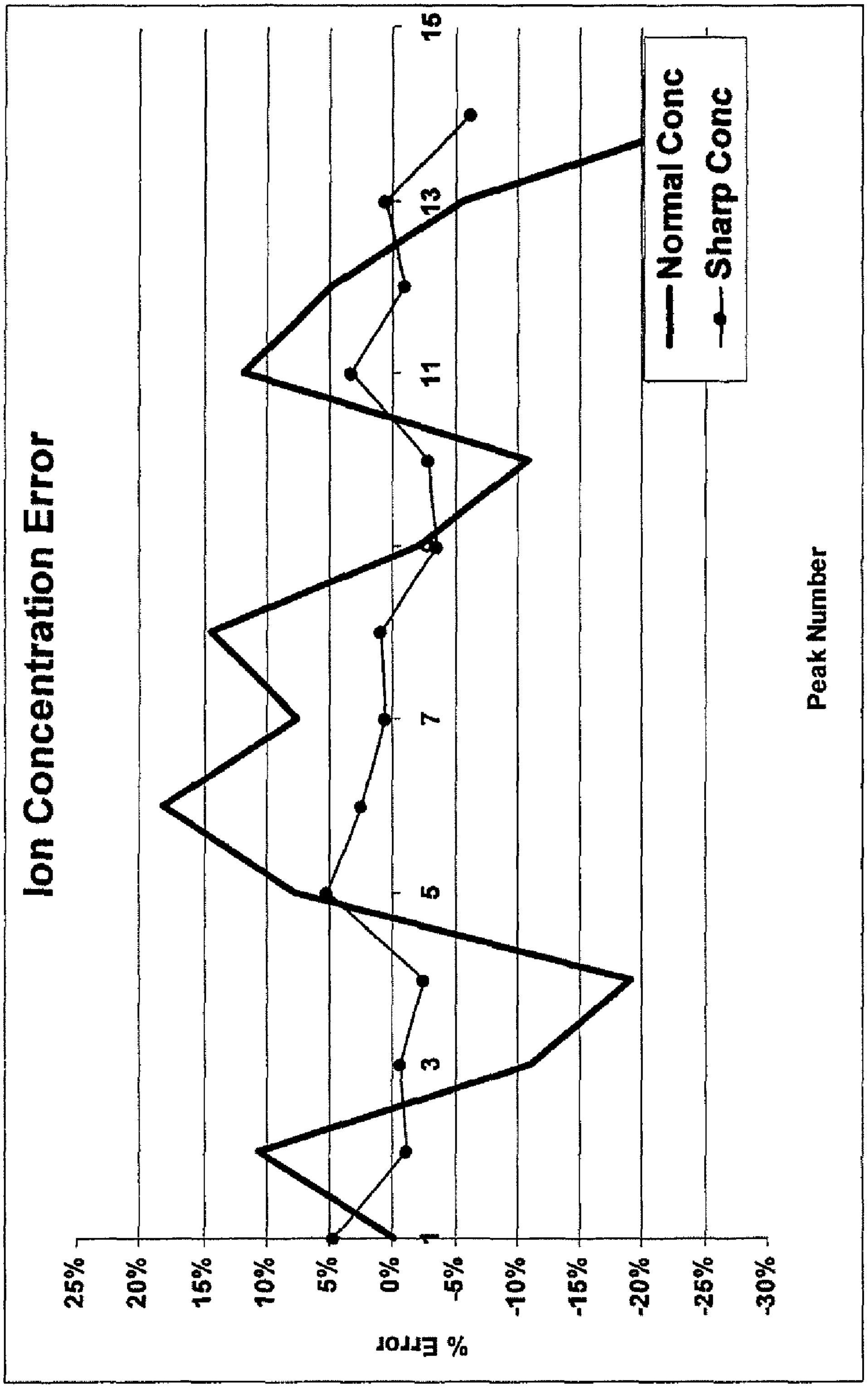
FIG. 15 is a graph representing plots of the concentration error before and after sharpening for the simulated spectrum in FIG. 13.

A sharpening filter 225, 230 is provided in place of peak deconvolution to improve the mass accuracy when there are spectral interferences. To determine the sharpening filter coefficients, first a simulated spectrum is created with a number of equal-height overlapping peaks all with a FWHH of 3.0 bins. In this example, 14 peaks were used. The distance between peaks in bins is set to (3.3+rand) where rand is a random number between −0.5 and 0.5. Next a 5-tap symmetric FIR filter is applied to the spectrum. The coefficient of the sharpening filter's center tap is initially set to one and all the other filter coefficients are set to zero. A regression is performed in which the sharpening coefficients are adjusted to minimize the sum of the squared mass errors and squared concentration errors produced by calculating the stick spectra from the sharpened spectra. The regression is constrained such that the filter is symmetric and the sum of the coefficients is equal to 1.0. This regression consistently produces a sharpening filter that effectively increases the mass resolution by up to 40%. FIG. 13 illustrates the spectra before and after sharpening. FIG. 14 illustrates the mass error in ppm before and after sharpening for the above simulated spectrum. FIG. 15 illustrates the concentration error before and after sharpening for the above simulated spectrum.

Figure 16:
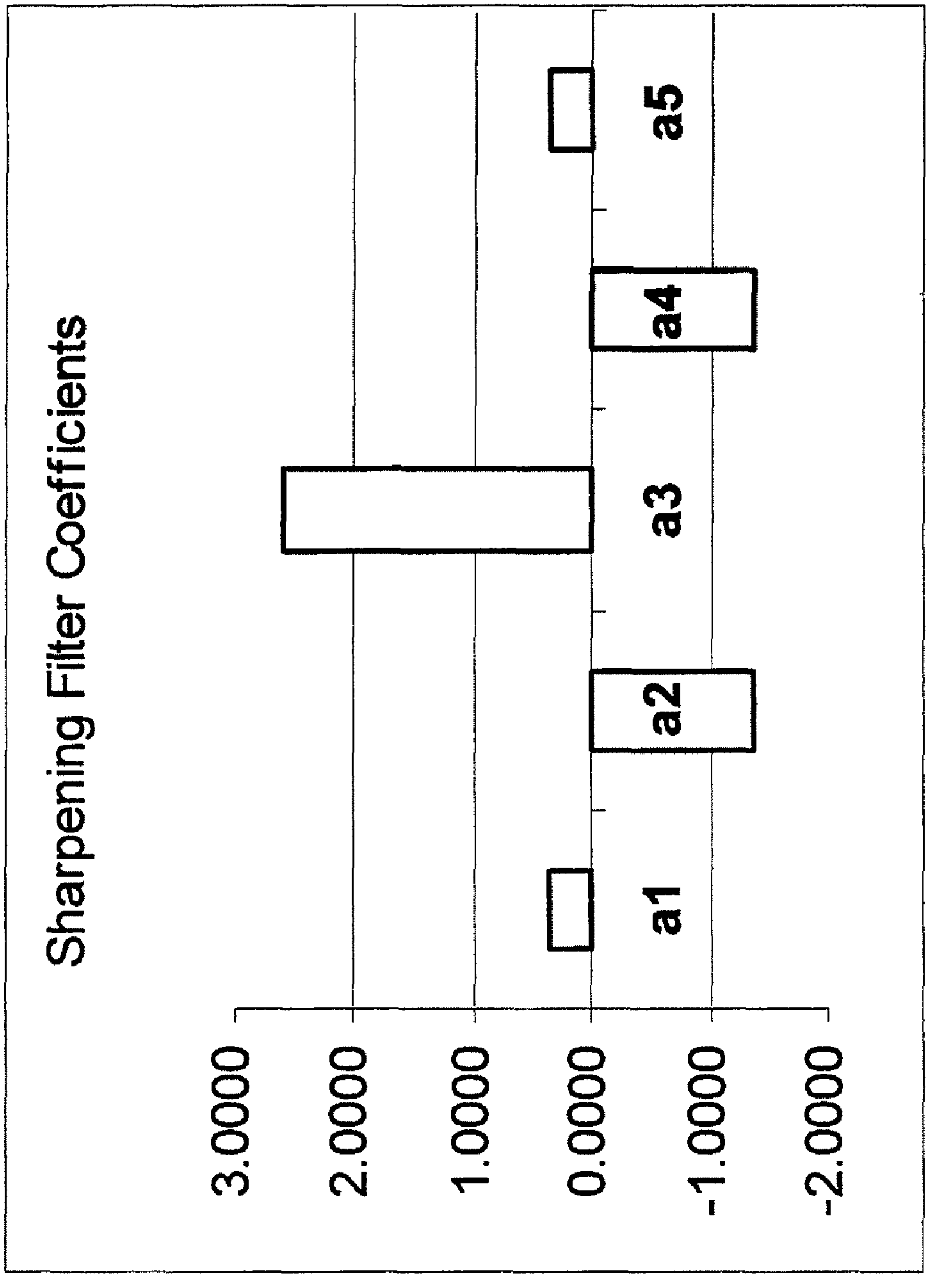
FIG. 16 is a graph representing an example of the coefficients found by regression and used by the sharpening filter.

FIG. 16 provides a visual of the coefficients found by the regression and used to produce the sharpened spectrum. The coefficient values are displayed in the following table

| Coefficients | Sharpener |
|---|---|
| A1 | 0.3650 |
| A2 | −1.3736 |
| A3 | 2.6171 |
| A4 | −1.3736 |
| A5 | 0.3650 |

Figure 17:
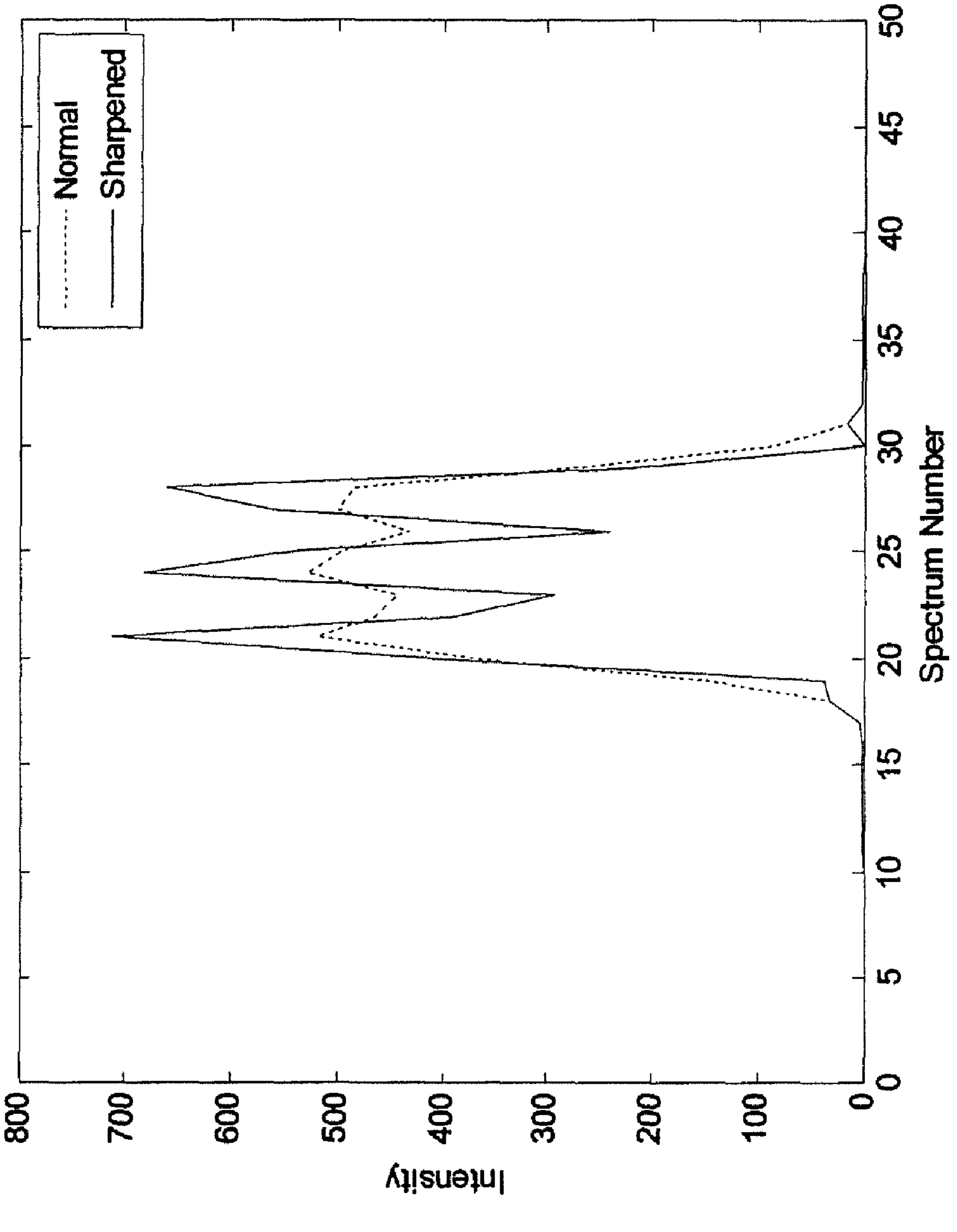
FIG. 17 is a graph representing plots of a spectrum before and after application of the sharpening filter where phantom peaks are present.

Sharpening filters 225 and 230 are applied along the mass axis and have some negative coefficients meaning that even with an all positive input, the potential exists for negative output. Since a negative output has no physical interpretation, all negative filter outputs are given a value of zero. Sharpening filters 225 and 230 use the output of shaping filters 215 and 220, respectively, as their input. If sharpening filters 225 and 230 are used like a typical 5-tap FIR filter, they have the tendency to produce small phantom peaks on either side of a sharpened peak. FIG. 17 shows an example of a sharpened spectrum with phantom peaks.

The problem arises when the contributions of the $1^{st}$ or $5^{th}$ filter taps become significant in magnitude as compared to the $2^{nd}$ through $4^{th}$ taps. Therefore the following process has been added to prevent these phantom peaks from forming. The FIR is separated into the inner and outer taps. The $1^{st}$ or $5^{th}$ taps constitute the outer and the $2^{nd}$ through $4^{th}$ taps constitute the inner taps.

```
Outer(i) = a1 * SK(i − 2) + a5 * SK(i + 2)
Inner(i) = a2 * SK(i − 1) + a3 * SK(i) = a4 * SK(i + 1)

If Outer(i) > Inner(i)/4 then

Sharp(i) = SK(i)
else
Sharp(i) = Outer(i) + Inner(i)
end
```

Figure 18:
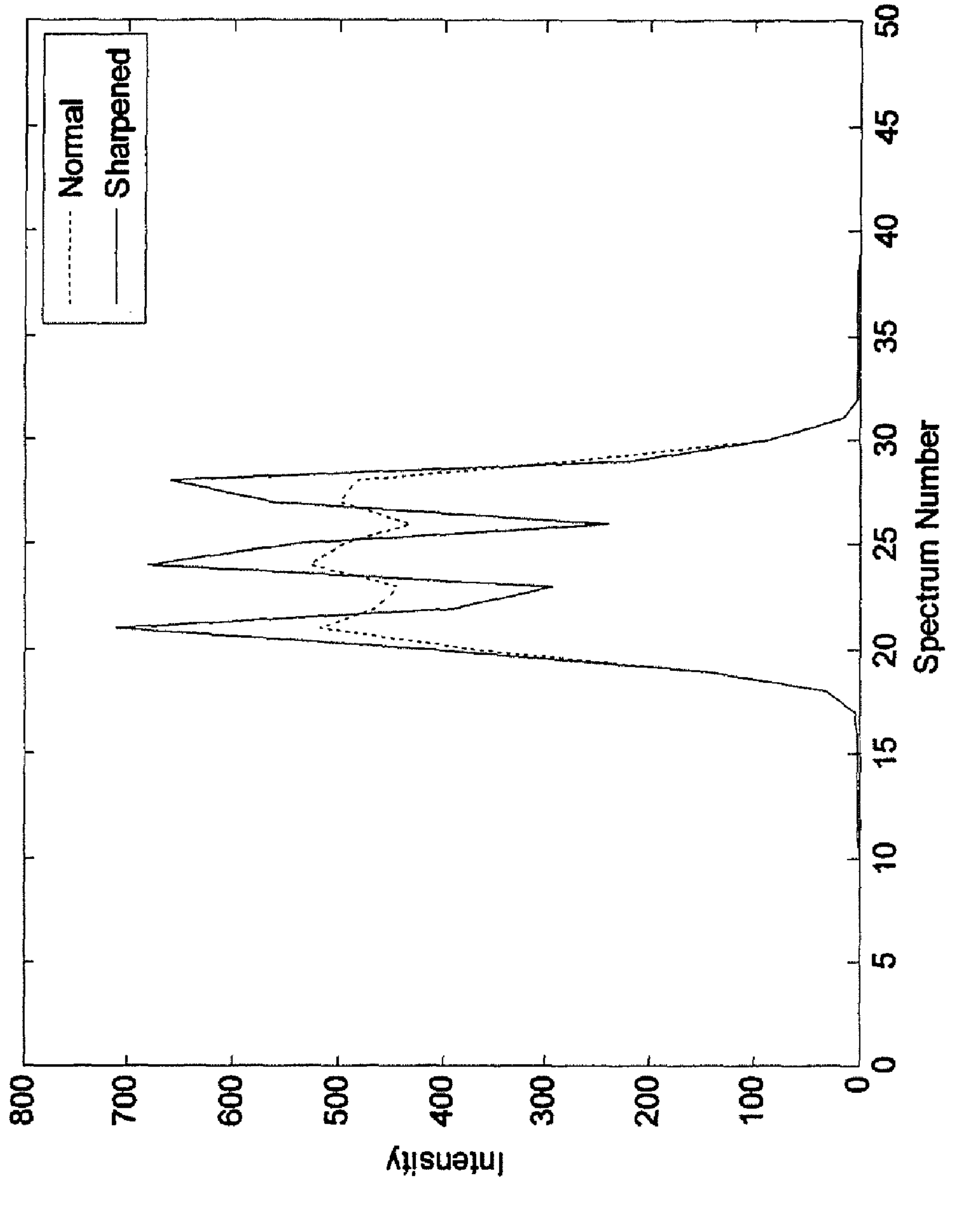
FIG. 18 is a graph representing plots of a spectrum before and after application of the sharpening filter using an additional rule applied by the sharpening filter to address phantom peaks.

FIG. 18 illustrates that the above rule eliminates the undesirable phantom peaks while retaining the sharpening quality of the filter. The first two and last two data points are not sharpened as shown below.

$$\mathrm{Sharp}(0)=SK(0)$$

$$\mathrm{Sharp}(1)=SK(1)$$

$$\mathrm{Sharp}(\mathrm{end}-1)=SK(\mathrm{end}-1)$$

$$\mathrm{Sharp}(\mathrm{end})=SK(\mathrm{end})$$

The sharpening filters receive their inputs as 31-bit unsigned integers from the shaping filters. The sharpening filter output is a 31-bit unsigned integer and limited to values greater than or equal to zero. The sharpening coefficients are limited to the range of −4 to $3\frac{255}{256}$ and are represented by 11-bit words. The first bit is the sign bit, the next two bits are the integer, and the last 8 bits represent the fraction.

Ion statistics filters 235 and 240 are each a 5-tap low pass Gaussian FIR filter whose bandwidth is adjusted based upon the number of ions represented by the intensity of the signal. The mean of a sample ion distribution has a standard deviation of $$\sigma_X = \frac{\sigma_P}{\sqrt{n}}$$

where n is the number of ions and $\sigma_p$ is the standard deviation of an infinite ion population. The statistics filter coefficients are designed to follow a Gaussian profile having a standard deviation equal to the standard deviation of the sample ion distribution's mean. The FWHH of a Gaussian is related to its standard deviation by a constant, $$FWHH=\sigma*2\sqrt{2*\ln(2)}=2.355*\sigma$$

So the $FWHH_{FIR}$ of the Gaussian FIR filter will be related to the $FWHH_P$ of the mass peak by $$FWHH_X = FWHH_{FIR} = \frac{FWHH_P}{\sqrt{n}}$$

The horizontal binning step has insured that all of the mass peaks have the same expected $FWHH_P$ of 3.0 bins, therefore the $FWHH_{FIR}$ can be written as $$FWHH_{FIR} = \frac{3}{\sqrt{n}}$$

Figure 19:
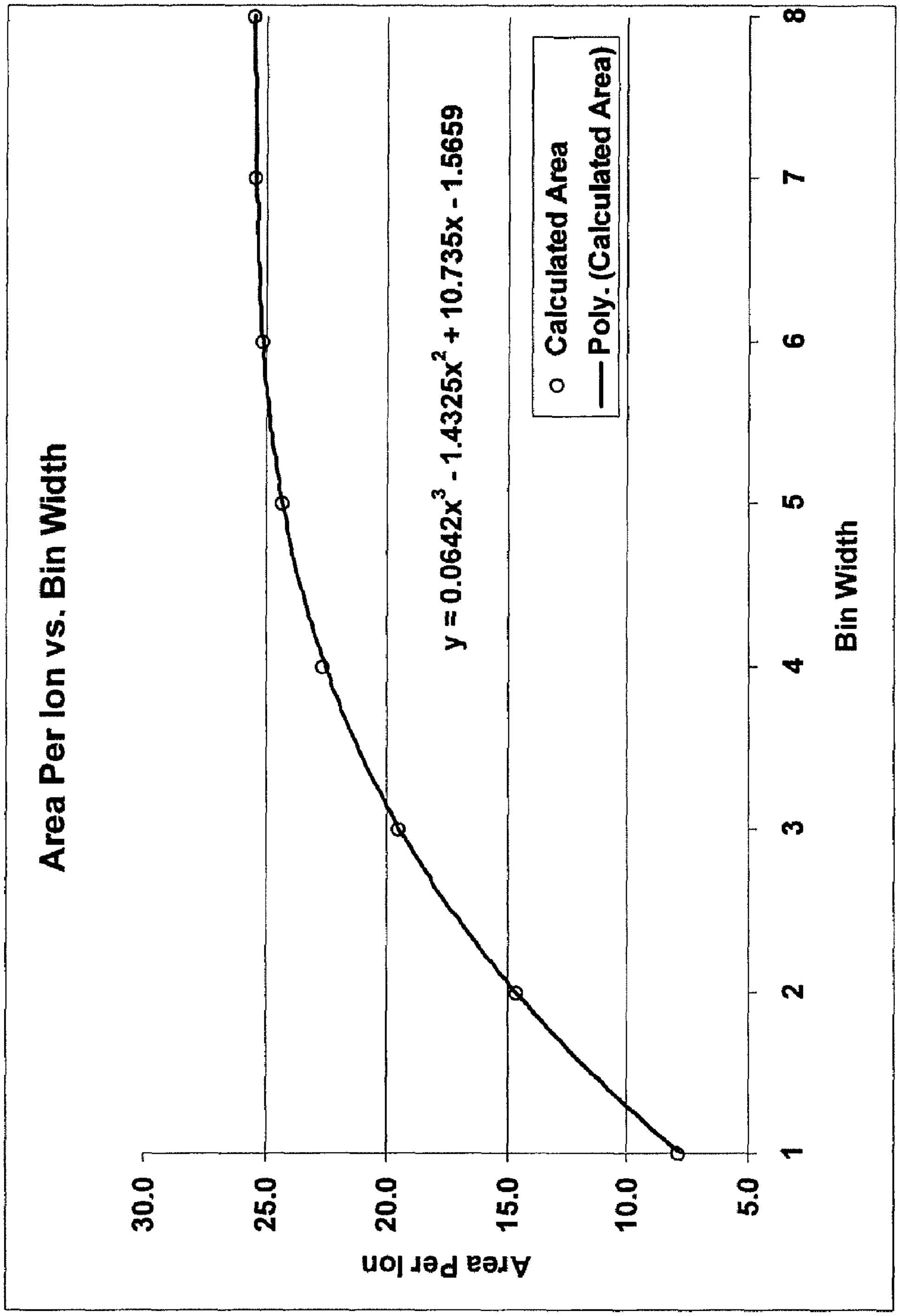
FIG. 19 is a graph representing plots of area per ion vs. bin width and a third order polynomial that is fit to the curve.

Therefore it is desirable to estimate the number of ions represented by the intensity of the signal. A typical ion strike has an intensity of 8 counts and $FWHH_{ion}$ of 3 points (2 ns@(1.5 Gsps). In order to determine how many ions are represented by the signal intensity, the bin width of each bin in the spectrum must be known. For example, for a bin width of 1 point, the ion will be sampled by the ADC close to its peak, so a bin with an intensity of near 8 means 1 ion was present. For a bin width of 2, an intensity of 14 counts represents 1 ion roughly centered in the bin. FIG. 19 illustrates the relationship between the bin width and the area represented by a single ion strike.

Note that above a bin width of about 6.0 the area per ion is relatively unchanged. A $3^{rd}$ order polynomial is fit to the curve with the equation as shown.

$$AreaPerIon=c3*BW^3+c2*BW^2+c1*BW+c0$$

The intensity of a given signal can then be divided by the area per ion based upon the bin width resulting in the number of ions represented by that intensity. To avoid division, the reciprocal of area per ion is used and defined as K.

$$K = \frac{1}{AreaPerIon}$$

A table is created relating bin width to K. The table has entries for the number of bins each time the bin width increases by 10%.

| Bin | K |
|---|---|
| 0 | 63 |
| 70911 | 57 |
| 122057 | 52 |
| 165510 | 47 |
| 204710 | 43 |
| 241228 | 40 |
| 275888 | 37 |
| 309216 | 34 |
| 341552 | 32 |
| 373132 | 30 |
| 404126 | 28 |
| 434659 | 26 |
| 464828 | 25 |
| 494704 | 24 |
| 524345 | 23 |
| 553796 | 22 |
| 583092 | 21 |
| 612263 | 21 |
| 641331 | 20 |
| 670314 | 20 |

The bin number is used as a vector into the table. For example, if bin number 250,000 is being processed, the bin column of the table is scanned until a value greater than 250,000 is found. The K value in the preceding row is then used: bin=241,228, K=40. Once the K value is determined for the bin width at a given bin in the spectrum, the K is multiplied by the intensity of the signal at that bin resulting in a number proportional to the number of ions represented by the bin. The signal inputs to statistics filters 235 and 240 are the outputs of sharpening filters 225 and 230, respectively, so $$Vector=K*Sharp$$

Now the vector can be used to retrieve the FIR coefficients. As described earlier, the FIR is a 5-tap Gaussian filter with a $FWHH_{FIR}$ equal to $$FWHH_{FIR} = \frac{3}{\sqrt{Ions}}$$

A second lookup table is created with vector numbers ranging from 128 to 16256.

| Ions | FWHH Filter | C1 | C2 | C3 | C4 | C5 |
|---|---|---|---|---|---|---|
| 1.00 | 3.00 | 0.094 | 0.242 | 0.328 | 0.242 | 0.094 |
| 1.23 | 2.70 | 0.078 | 0.242 | 0.355 | 0.242 | 0.078 |
| 1.52 | 2.44 | 0.059 | 0.246 | 0.391 | 0.246 | 0.059 |
| 1.87 | 2.20 | 0.043 | 0.242 | 0.430 | 0.242 | 0.043 |
| 2.30 | 1.98 | 0.027 | 0.234 | 0.477 | 0.234 | 0.027 |
| 2.83 | 1.78 | 0.016 | 0.219 | 0.527 | 0.219 | 0.016 |
| 3.48 | 1.61 | 0.008 | 0.199 | 0.586 | 0.199 | 0.008 |
| 4.29 | 1.45 | 0.004 | 0.172 | 0.648 | 0.172 | 0.004 |
| 5.28 | 1.31 | 0.000 | 0.141 | 0.715 | 0.141 | 0.000 |
| 6.50 | 1.18 | 0.000 | 0.105 | 0.785 | 0.105 | 0.000 |
| 8.00 | 1.06 | 0.000 | 0.074 | 0.855 | 0.074 | 0.000 |
| 9.85 | 0.96 | 0.000 | 0.043 | 0.914 | 0.043 | 0.000 |
| 12.13 | 0.86 | 0.000 | 0.023 | 0.953 | 0.023 | 0.000 |
| 14.93 | 0.78 | 0.000 | 0.012 | 0.980 | 0.012 | 0.000 |
| 18.38 | 0.70 | 0.000 | 0.004 | 0.992 | 0.004 | 0.000 |
| 22.63 | 0.63 | 0.000 | 0.000 | 1.000 | 0.000 | 0.000 |

Figure 20:
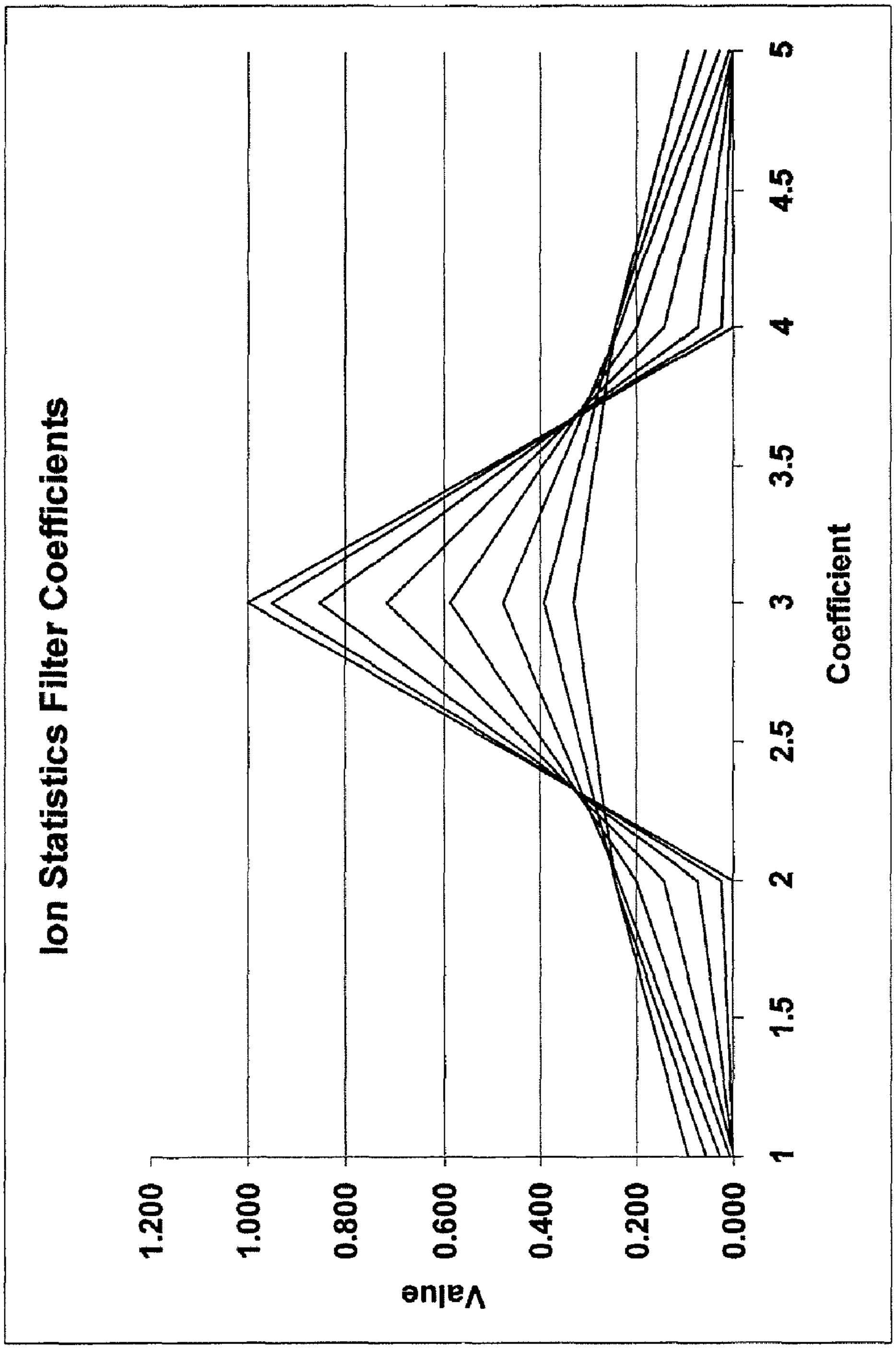
FIG. 20 is a graph representing various plots of potential shapes of FIR coefficients that may be used by an ion statistics filter of the present invention.

The number of ions is used as a vector into the table. For example, consider a signal with 5.1 ions. The Ions column of the table is scanned until a value greater than 5.1 is found. The coefficients from the preceding row (in bold) are then used: Ions=4.29. The coefficients c1 through c5 have been rounded to the nearest 1/256 of a point. Once the coefficients are determined, they can be used to filter the data. FIG. 20 shows a visual of the shapes of the various FIR coefficients.

Figure 21:
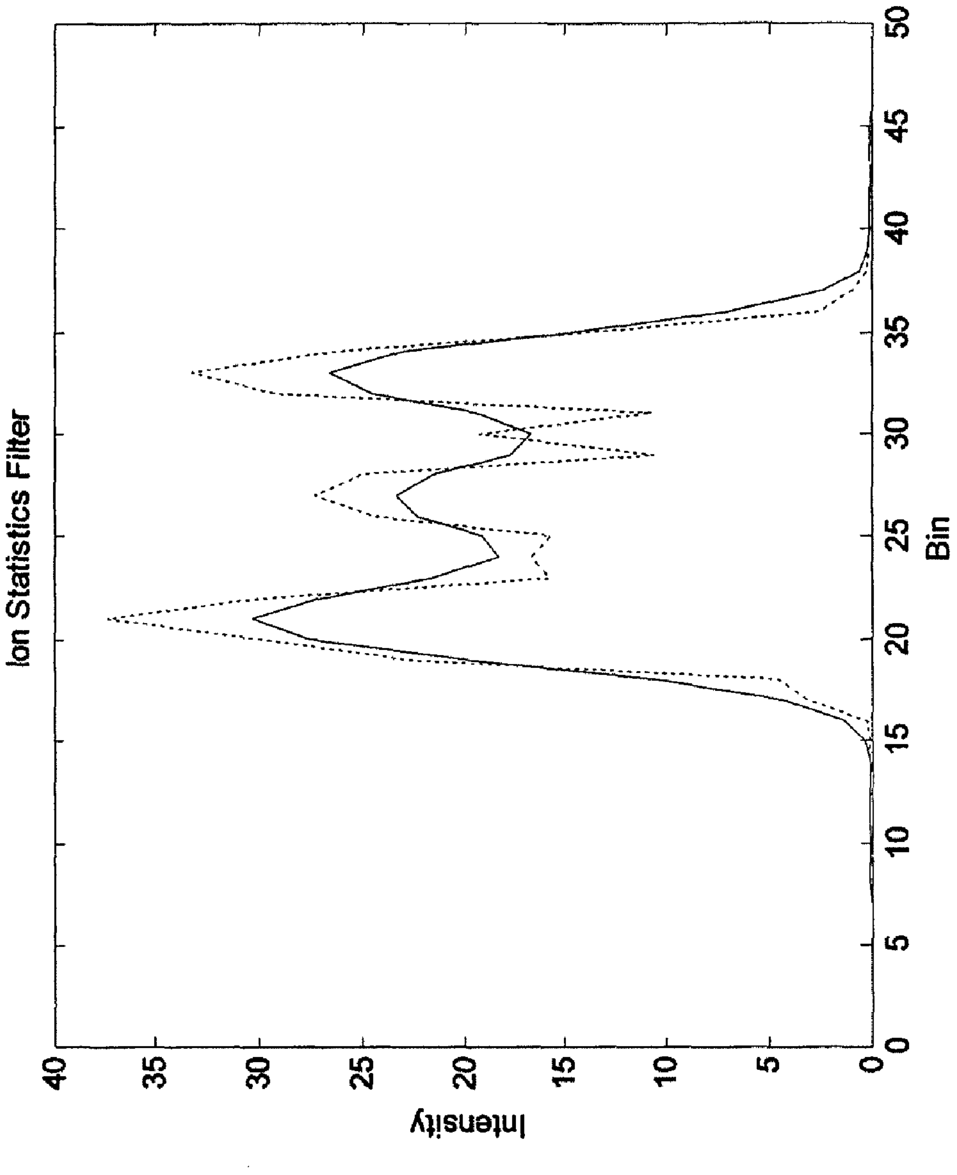
FIG. 21 is a graph representing plots of raw and processed spectra illustrating the role of the ion statistics filter in removing false peaks when the ion concentration is low.

The statistics filters are applied along the mass axis and use the outputs of the sharpening filters as their input. FIG. 21 illustrates the role of the filter in removing false peaks when the ion concentration is low wherein the dashed line represents the input signal and the solid line represents the filtered output signal. Specifically, for low values of n, the mass resolution may be decreased to a minimum of, for example, 70% of nominal resolution 35,000 to prevent the false peaks. For high values of n, the mass resolution may be increased to 140% of nominal resolution 70,000 to help deconvolve overlapping peaks. The statistics filters have a typical structure of a 5-tap FIR.

$$Stat(i)=a1*Sharp(i-2)+a2*Sharp(i-1)+a3*Sharp(i)+a4*Sharp(i+1)+a5*Sharp(i+2)$$

$$Stat(i)=a1*Sharp(i-2)+a2*Sharp(i-1)+a3*Sharp(i)+a4*Sharp(i+1)+a5*Sharp(i+2)$$

The first two and last two data points are not filtered as shown below.

Stat(0)=Sharp(0)

Stat(1)=Sharp(1)

Stat(end−1)=Sharp(end−1)

Stat(end)=Sharp(end)

The inputs to the statistics filters are the 31-bit unsigned outputs from the sharpening filters. The statistics filter outputs are a 31-bit unsigned integer and limited to values greater than or equal to zero. The statistics coefficients are limited to the range of −4 to $3^{255}/_{256}$ and are represented by 11-bit words. The first bit is the sign bit, the next two bits are the integer, and the last 8 bits represent the fraction.

Dynamic range encoded (DRE) circuits 255 and 258 receive the outputs of first and second ion statistics filters 235 and 240 and perform DRE on the respective outputs. DRE is logarithmic compression designed to retain a predetermined number of significant bits in the data. Eight significant bits are retained to provide enough sufficient precision in the center of mass calculation using the 3-point Gaussian method.

The 31-bit unsigned integer from ion statistics FIR filter is the input to DRE and is represented by X for simplification. The transfer equation for dynamic range encoding (L(X)) is $$L(X) = \frac{\text{round}[2^N \log_2(X+1)]}{2^N}$$

The symbol N represents the number of significant bits (N=8). One is added to X so that the DRE value for X of zero will be defined as zero. A direct look-up table for DRE would require $2^{31}$ memory locations. An alternate method described below uses a look-up table with $2^{N+1}$ memory locations.

X+1 is first rounded to an N+1 bit floating point number with Q representing the N+1 bit mantissa, and P representing the base 2 exponent.

$$X+1 \rightarrow 2^P * Q$$

$$L(X) = \frac{\text{round}[2^N \log_2(X+1)]}{2^N} \cong \frac{\text{round}[2^N \log_2(2^P * Q)]}{2^N}$$

Now the logarithm may be separated in two parts and evaluated.

$$L(X) = \frac{\text{round}[2^N \log_2(2^P) + 2^N \log_2(Q)]}{2^N} = \frac{2^N * P + \text{round}[2^N * \log_2(Q)]}{2^N}$$

$$L(X) = P + \frac{\text{round}[2^N * \log_2(Q)]}{2^N}$$

The first part of the expression P is simply the exponent. To calculate the right side of the expression (round[$2^N$*$\log_2$(Q)]/$2^N$), a table is created for all 512 possible values of Q (0 to $2^9-1$). The DRE then becomes $$L(X)=P+\text{table lookup}(Q)$$

The following is an example of the use of the DRE. Assume X is 543,210, X+1=543,211. The 31-bit binary representation of X1 is (spaces at byte boundaries for clarity)

$$X1=0000000\ 00001000\ 01001001\ 11101011_b$$

The exponent P is 11, and the N+1=9 most significant bits are highlighted in bold above: Q=$100001001_b$, or 265 decimal. The table look-up for Q results in $$\frac{\text{round}(2^N \log_2(Q))}{2^N} = \frac{\text{round}(256 * \log_2(265))}{256} = \frac{\text{round}(2060.76)}{256} = \frac{2061}{256} = 8\frac{13}{256}$$

and the value for L(X) is therefore $$L(X) = P + \frac{\text{round}(2^N \log_2(Q))}{2^N} = 11 + 8\frac{13}{256} = 19\frac{13}{256}$$

The L(X) value for the largest integer ($2^{31}-1$) is equal to $31^{0}/_{256}$ and therefore DRE requires 5 bits to represent the integer, and 8 bits to represent the fraction for a total of 13 bits.

Only apexing peaks are identified in the mass spectrum. ‘Bulges’ on the sides of apexes are ignored with the reasoning that if the sharpening filter was unable to resolve a peak grouping into individually defined apexing peaks, no further deconvolution will be performed. For low ion concentrations, the bulges are often due to the statistical scarcity of ions, and not indicative of a true spectral interference. The existence of an apexing peak is determined by evaluating three consecutive points looking for the conditions where DRE(i−1)<DRE(i) and DRE(i+1)≦DRE(i). It is important to note that the first inequality is a ‘less than’ and the second inequality is ‘less than or equal to.’

A peak histogram 250 is used to tally the number of peaks at various heights. The peak histogram has $2^{13}$ bins, one for every DRE value. When a peak is found, the bin corresponding to the center point of the apex is incremented. The histogram is cleared at the beginning of each summed spectra.

Once an entire spectrum has been processed to look for peaks and create the peak histogram, the histogram is accumulated to determine the minimum and maximum qualifying peak heights. A direction bit is used to determine the direction of accumulation.

If the direction bit is set, the histogram is accumulated from the tallest peaks to the shortest peaks (default). The minimum qualifying peak height is set to the $2^{13}-1$. The histogram accumulation continues towards the shortest peak until the accumulated value first exceeds the number of peaks requested. The peak height corresponding to the previous histogram position is then the minimum qualifying peak height.

If the direction bit is cleared, the histogram is accumulated from the shortest peaks to the tallest peaks. The maximum qualifying peak height is set to the 0. The histogram accumulation continues towards the tallest peak until the accumulated value first exceeds the number of peaks requested. The peak height corresponding to the previous histogram position is then the maximum qualifying peak height.

The minimum and maximum qualifying peak heights create the range for the peak finder and peak filter 260 to use to find and filter the peaks. The detected peaks are processed, and if the peak falls within the acceptable range, the peak is added to the peak list and stick spectra for the peak is calculated. If the peak does not qualify, it is discarded.

Stick spectra circuit 270 assumes peak shapes are essentially Gaussian, and uses a three-point Gaussian solution to convert the data to a stick spectrum, which may include the peak height, a peak width, and a location in the spectra for each detected peak. The peak width may be expressed as the resolution, and the peak height may be expressed as the ion concentration or the ion count. The three-point Gaussian method is preferred for this particular example over a centroid calculation because it is less sensitive to the phase relationship between the peak and the sampled points. The peak center location is measured relative to the middle of the three points. For simplicity, the distance between the data points is assumed to be 1. Therefore, the time location of the point left of center is −1, 0 for the central point, and +1 for the point on the right of center.

The three binned points can then be represented as:

$$y1=H*2^{-a(-1-T)^2}=H*2^{-a}(1+T)^2$$

$$y2=H*2^{-a(0-T)^2}=H*2^{-aT^2}$$

$$y3=H*2^{-a(1-T)^2}$$

The DRE value conversions of the three points represent their base-2 logarithms calculated to 8 bits of precision.

$$L_1=\log_2(y1)\ L_2=\log_2(y2)\ L_3=\log_2(y3)$$

Next, the log ratio of each pair of adjoining points is calculated, which is simply the difference between the log compressed points.

$$R_1=\log_2\left[\frac{y2}{y1}\right]=L_2-L_1$$

$$R_2=\log_2\left[\frac{y3}{y2}\right]=L_3-L_2$$

Note that the log ratios can be expressed in terms of ‘a’ and T.

$$R_1=-aT^2+a(1+T)^2=a(2T+1)$$

$$R_2=l-a(1-T)^2+aT^2=a(2T-1)$$

To solve for T, the ratio $R_2/R_1$ is calculated $$\frac{R_2}{R_1}=\frac{a(2T-1)}{a(2T+1)}=\frac{2T-1}{2T+1}$$

Solving for T produces $$T=\frac{R_1+R_2}{2*(R_1-R_2)}$$

Substituting $R_1=L_2-L_1$ and $R_2=L_3-L_2$ produces $$T=\frac{L_2-L_1+L_3-L_2}{2*(L_2-L_1-(L_3-L_2))}=\frac{L_3-L_1}{2*(2L_2-L_3-L_1)}$$

Two intermediate calculations are introduced to simplify the subsequent calculations.

$$G_1=R_1+R_2=L_3-L_1$$

$$G_2=R_1-R_2=2L_2-L_1-L_3$$

The apex calculation can then be simplified to $$T=\frac{G_1}{2G_2}$$

The value of T is expressed as a number of bin widths measured from the center point. To calculate the TOF location of the peak's apex, the TOF location of the center of bin y2 expressed in ns is added to T converted to ns. To convert T to ns, one may multiply by BinWidth in samples and divide by the sampling rate in samples per ns (GHz).

$$Apex_{TOF}=y2_{TOF}+\frac{T*BinWidth}{1.5}$$

To calculate ‘a,’ the first log ratio equation is rearranged to solve for ‘a’ in terms of T, and then T is substituted.

$$a=\frac{R_1}{2T+1}=\frac{R_1}{2*\frac{R_1+R_2}{2*(R_1-R_2)}+1}$$

$$a=\frac{R_1-R_2}{2}=\frac{G_2}{2}$$

The value of ‘a’ is related to the $FWHH_{bin}$ of the peak (measured in bins) by the equation $$a=\frac{4}{FWHH_{bin}^2}$$

Solving for $FWHH_{bin}$ produces $$FWHH_{bin} = \sqrt{\frac{4}{a}} = \sqrt{\frac{8}{G_2}}$$

Next, the FWHH is converted to TOF units (ns) by multiplying by BinWidth in samples and dividing by the sampling rate in samples per ns (GHz).

$$FWHH_{TOF} = \frac{FWHH_{bin} * BinWidth}{1.5}$$

The peak's resolution, $Apex_R$, can now be computed $$Apex_R = \frac{Apex_{TOF}}{2 * FWHH_{TOF}}$$

To complete the stick spectra calculation, the peak's height, $Apex_H$, can be found by rearranging the equation for y2 to solve for H.

$$Apex_H = y2 * 2^{aT^2} = y2 * 2^{\frac{G_1 * T}{4}}$$

It is desirable to convert the apex height to ion concentration. To perform the conversion, the BinWidth is used to look up a K multiplier value.

$$K = \text{lookup(BinWidth)}$$

The K value is expressed as multiples of 1/512 and has a range of 0/512 to 127/512. The ion concentration is then the product of K and the $Apex_H$.

$$\text{Ions} = K * Apex_H$$

The three points DRE values $L_1$, $L_2$, and $L_3$ that stick spectra circuit 270 uses to calculate the stick spectra are unsigned 13-bit values with 5 integer bits and 8 fractional bits. The value $G_1$ has a sign bit, 5 integer bits, and 8 fractional bits. $G_2$ is unsigned with 6 integer bits and 8 fractional bits. The first table for stick spectra is used to calculate the reciprocal of $G_2$. There are 214 table entries for this table and the 14 bits of $G_2$ are used as the lookup vector. The valid range for $G_2$ is 1/256 to 64. The table output is a 16-bit value expressed with 8 integer bits and 8 fractional bits. The G2 reciprocal is then used in the calculation for $T_{Bin}$.

$$T_{Bin} = \text{round}\left[\frac{G_1 * lookup_1(G2)}{2}, 8\right]$$

$T_{Bin}$ is rounded to 8-bit fractional precision yielding a signed number with no integer bits and 8 fractional bits. The valid range of $T_{Bin}$ is −127/256 to 128/256. Next, the $BinWidth_{Point}$ in sampled points is retrieved from the binning table and divided by 1.5 to produce the $BinWidth_{TOF}$. 1/1.5 is 171/256 rounded to the nearest 1/256.

$$BinWidth_{TOF} = \text{round}\left[\frac{171}{256} * BinWidth_{Points}, 8\right]$$

To find the peak's apex in TOF units (ns), first $T_{Bin}$ is translated to ns by multiplying by the BinWidth in ns to produce $T_{TOF}$.

$$T_{TOF} = T_{Bin} * \text{BinWidth}_{TOF}$$

Next, the TOF location of the center point, y2, is added to $T_{TOF}$ to produce the 29-bit TOF location of the Apex with 21 integer bits and 8 fractional bits.

$$\text{Apex}_{TOF} = y2_{TOF} + T_{TOF}$$

The $FWHH_{bin}$ is found with a lookup-table for G2. The output is a 14-bit unsigned number with 6 integer bits and 8 fractional bits.

$$\text{FWHH}_{bin} = \text{lookup}_2(G2)$$

The $FWHH_{TOF}$ is then calculated as the following product rounded to 8 fractional bits. $FWHH_{TOF}$ is a 17-bit value with 9 integer bits and 8 fractional bits.

$$\text{FWHH}_{TOF} = \text{round}[\text{FWHH}_{bin} * \text{BinWidth}_{TOF}, 8]$$

Using the above construction, up to 8192 peaks can be returned every 5.0 ms (1,638,400 peaks per second).

In summary, stick spectra circuit 270 performs a 3-point Gaussian fit on all qualifying peaks. One of the three points is always the peak point. A search of both sides of an apex for the point closest to 50% of the peak point—if the signal starts slowing its descent before 50%, the previous point is taken. This attempts to enforce 50% resolution measurement. A modified stick spectra calculation is used for variable spacing of three points.

The stick spectra are converted to units of TOF (ns), height (counts), and resolution for each peak. Unresolved interferences are detected by low resolution. The stick may have 50 total bits and thus include: the TOF returned with 8-bit precision (0.015 ppm) with 28 bits total; the height returned with 8-bit precision (0.4%) with 13 bits total; and the resolution returned with 8-bit precision (0.4%) with 9 bits total. The ion concentration of the stick may be calculated as:

$$\text{Ions} = (\text{Height} * \text{TOF})/(50 * R)$$

To align the phase gain and offset of the signals from the two channels, test pulse acquisition and control circuit 180 may send a signal to the preamp so as to cause the preamp to inject a test pulse. Such test pulses may be injected at the beginning of each transient.

A switch selects one of two inputs to preamplifier 110: a test pulse or the detector 42 output. At the beginning of every transient, the test pulse input is selected and a test pulse is fired to provide a means to align the two acquisition channels in phase, gain and offset. For a pre-specified time before and after the test pulse, the two channels are summed individually with data from neighboring transients. The resulting test pulse sums will either be returned to the external processor 27 for further processing or processed by the data acquisition system 20 to provide values to align the phase, gain, and offset registers of the two acquisition channels. The registers are updated at the end of a spectra sum. After the test pulse data is acquired, the preamplifier input switch selects the ion detector 42 as the input for transient processing.

The following procedure is designed to independently align the gain, offset, and phase of the two ADC channels. A section of the transient between the push pulse and the first analytical TOF of interest is reserved for ADC channel alignment. Data from both channels is acquired and accumulated during the alignment section of the transient. First, a baseline reading is taken from both channels. Next, test pulse circuit 180 is switched in as the input to preamplifier 110. Once the switch has settled, a test pulse is fired. The amplitude of the test pulse may be approximately 50 mV to 60 mV, more preferably approximately 57 mV±3 mV so that it nearly reaches the full scale of the high gain channel, and it may also have a FWHH of approximately 4 to 8 ns, more preferably 6.0 ns±1.0 ns. Detector 42 is then switched back in as the input to preamplifier 110 and acquisition continues for a short time after the switch settles so that a baseline reading can again be taken. The baselines before and after switching the test pulse circuit into preamplifier 110 are taken for two reasons: first, the test pulse circuit produces an offset which differs from the offset of detector 42; and second, the baseline may have a low frequency component due to drift or the nature of the baseline restoration circuit whose offset tracks the average detector current.

The test pulse data from both channels is accumulated for 1024 transients, for example, to provide good signal averaging. The accumulated data has an implied decimal point at the tenth bit. The data from both channels are then decimated by a factor:

$$\text{Decimation} = \text{int}\left[\frac{FWHH}{3}\right] = 2$$

For example, the first two points are averaged to form the first decimated point, the $3^{rd}$ and $4^{th}$ points are averaged to form the second decimated point, etc.

Several baselines are calculated by averaging 8 points in the area of interest. In the example provided below, the high gain and low gain baselines taken before the test pulse circuit is switched in are called Detector_HG_Baseline__1 and Detector_LG_Baseline__1. The high gain and low gain baselines taken after the test pulse circuit is switched in and settled are called Pulse_HG_Baseline and Pulse_LG_Baseline. The high gain and low gain baselines taken after the test pulse circuit is switched back out and settled are called Detector_HG_Baseline__2 and Detector_LG_Baseline__2.

Next the three points used to perform the 3-point Gaussian calculation are retrieved from each channel. The decimated data of each channel is scanned from just after the time the pulse baseline is taken left to after the test pulse has settled looking for the maximum value. The $(t_0, y_0)$ pair is recorded for the maximum. Next, the point preceding the maximum is recorded as $(t_{-1}, y_{-1})$, and the point following the maximum is recorded as $(t_1, y_1)$. The y values are then adjusted by the magnitude of the pulse baseline of that channel as follows:

$$HG\_y_{-1} = HG\_y_{-1} - \text{Pulse\_}HG\text{\_Baseline}$$

$$HG\_y_0 = HG\_y_0 - \text{Pulse\_}HG\text{\_Baseline}$$

$$HG\_y_1 = HG\_y_1 - \text{Pulse\_}HG\text{\_Baseline}$$

$$LG\_y_{-1} = LG\_y_{-1} - \text{Pulse\_}LG\text{\_Baseline}$$

$$LG\_y_0 = LG\_y_0 - \text{Pulse\_}LG\text{\_Baseline}$$

$$LG\_y_1 = LG\_y_1 - \text{Pulse\_}LG\text{\_Baseline}$$

The 3-point Gaussian is then calculated for each channel. After performing the calculation on each channel, a HG or LG prefix is attached to the calculated variables. For example, the height of the high gain channel is called HG_H, etc.

$$R_1 = \ln\left[\frac{y_0}{y_{-1}}\right],\ R_2 = \ln\left[\frac{y_1}{y_0}\right],\ T = \frac{R_1 + R_2}{2*(R_1 - R_2)},$$

-continued $$a = \frac{R_1 - R_2}{2},\ H = \frac{y_0}{e^{-aT^2}}$$

The gain error is defined as:

$$\text{Gain\_Error} = 1 - \frac{\text{HG\_H}}{8*\text{LG\_H}}$$

If the Gain Error is zero, the gains are considered aligned. If the Gain Error is +2%, the gain of the high gain channel may be increased by 2%, or the gain of the low gain channel may be reduced by 2%. If the Gain Error is −2%, the gain of the high gain channel may be reduced by 2%, or the gain of the low gain channel may be increased by 2%.

Next, the detector baseline offsets may be calculated. First, the low gain baseline is calculated as:

$$\text{LG\_Baseline} = 8*\left[\frac{\text{Detector\_LG\_Baseline\_1} + \text{Detector\_LG\_Baseline\_2}}{2}\right]$$

The high gain baseline is calculated as:

$$\text{HG\_Baseline} = \left[\frac{\text{Detector\_HG\_Baseline\_1} + \text{Detector\_HG\_Baseline\_2}}{2}\right]$$

The offset error is calculated as:

$$\text{Offset\_Error} = HG\text{\_Baseline} - LG\text{\_Baseline}$$

If the Offset Error is zero, the offsets are considered to be aligned. If the Offset Error is +2 counts, the offset of the high gain channel may be reduced by 2 counts. If the Offset Error is −2 counts, the offset of the high gain channel may be increased by 2 counts.

The apex time for each channel may then be calculated $$HG\text{\_Phase} = HG\_t_0 + HG\_T$$

$$LG\text{\_Phase} = LG\_t_0 + LG\_T$$

Subsequently, the Phase Error in pS may be calculated as $$\text{Phase\_Error} = \text{Decimation}*1000*\frac{\text{HG\_Phase} - \text{LG\_Phase}}{1.500\text{ GHz}}$$

If the Phase Error is zero, the phases of the two channels are considered to be aligned. If the Phase Error is +100, the phase of the high gain channel may be decreased by 100 pS, or the phase of the low gain channel may be increased by 100 pS. If the Phase Error is −100, the phase of the high gain channel may be increased by 100 pS, or the phase of the low gain channel may be decreased by 100 pS.

Figure 22:
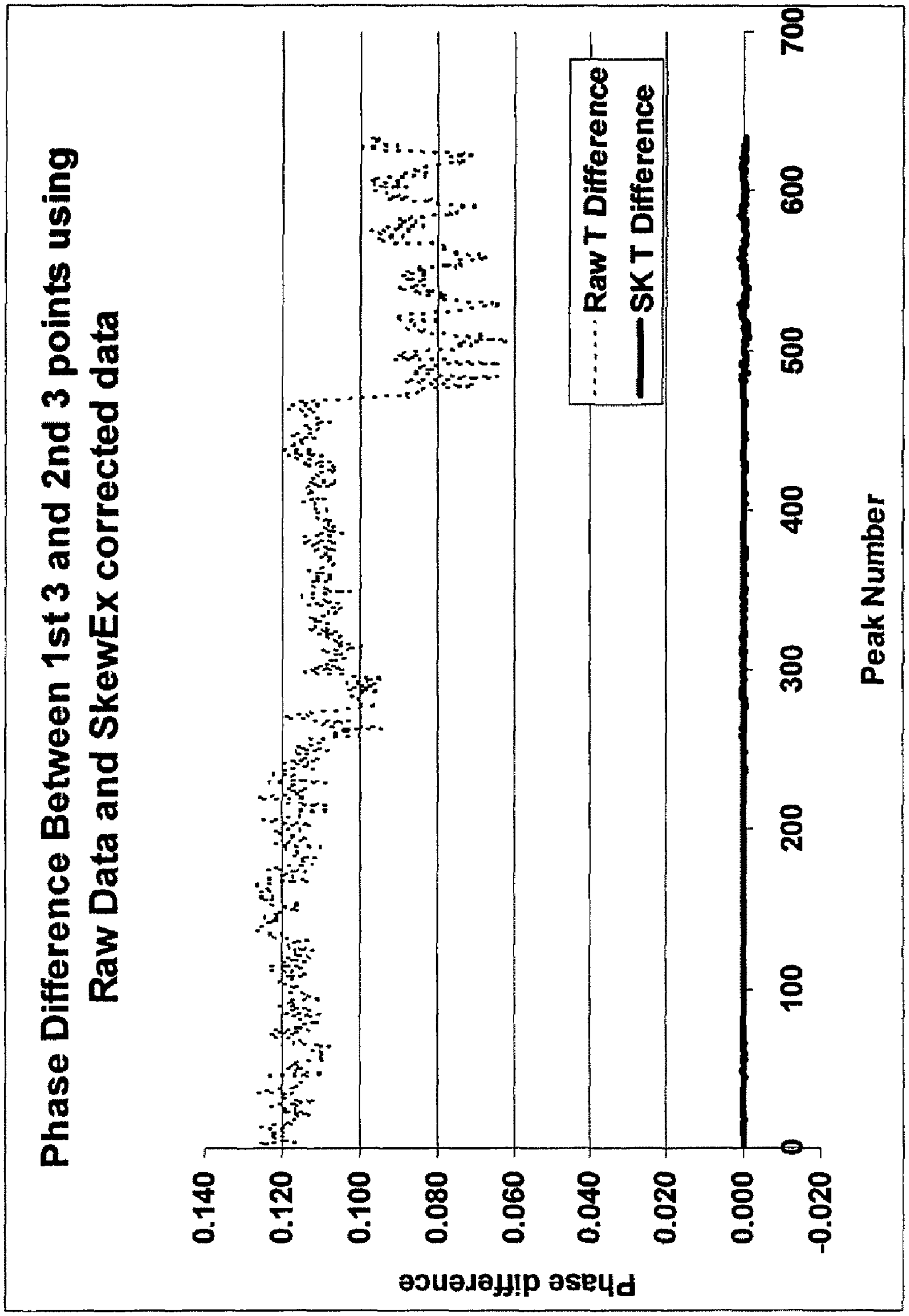
FIG. 22 is a graph representing plots of the phase difference between the first three and second three points produced by a test pulse using raw data and data filtered by the shaping filter.
Figure 23:
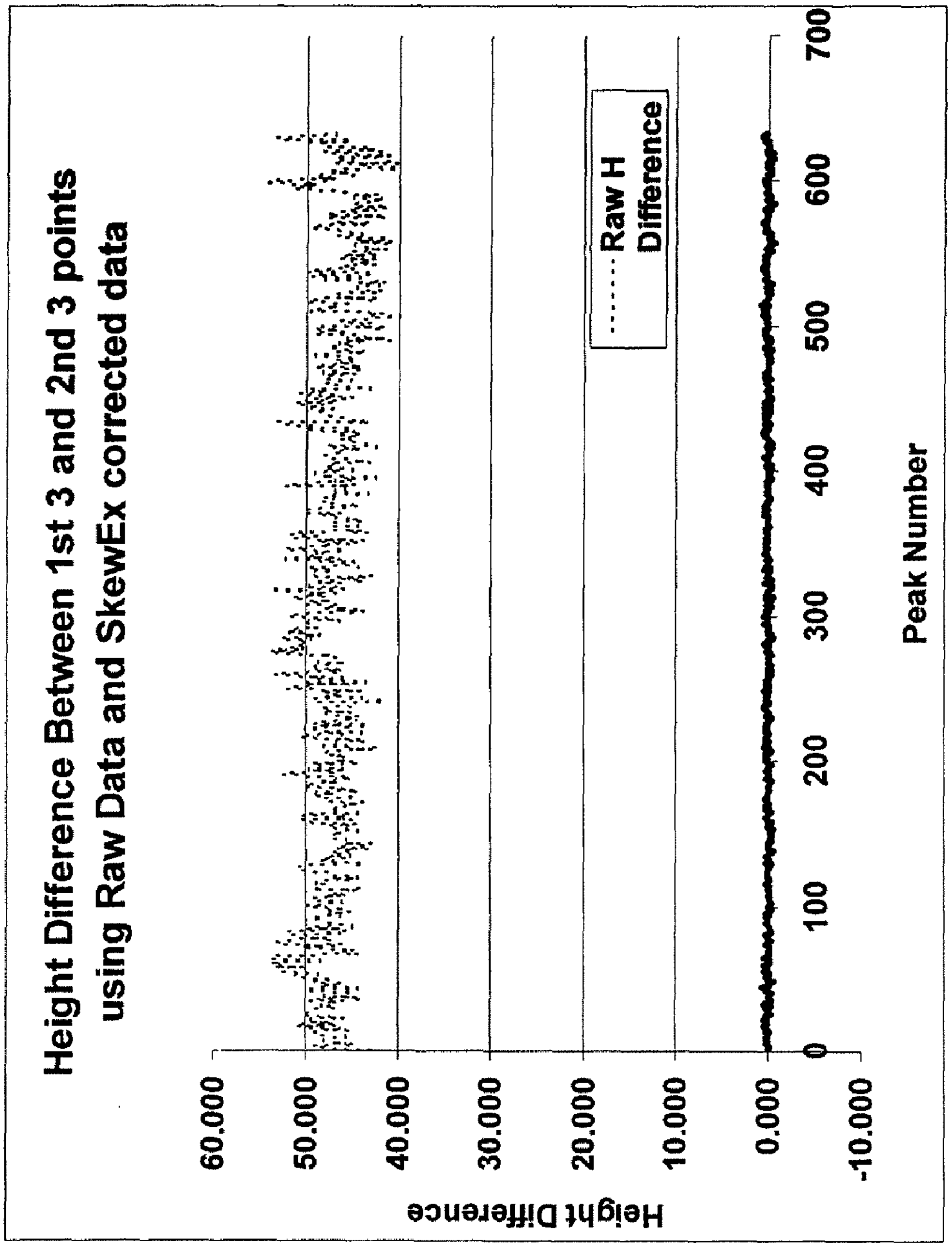
FIG. 23 is a graph representing plots of the height difference between the first three and second three points produced by a test pulse using raw data and data filtered by the shaping filter.
Figure 24:
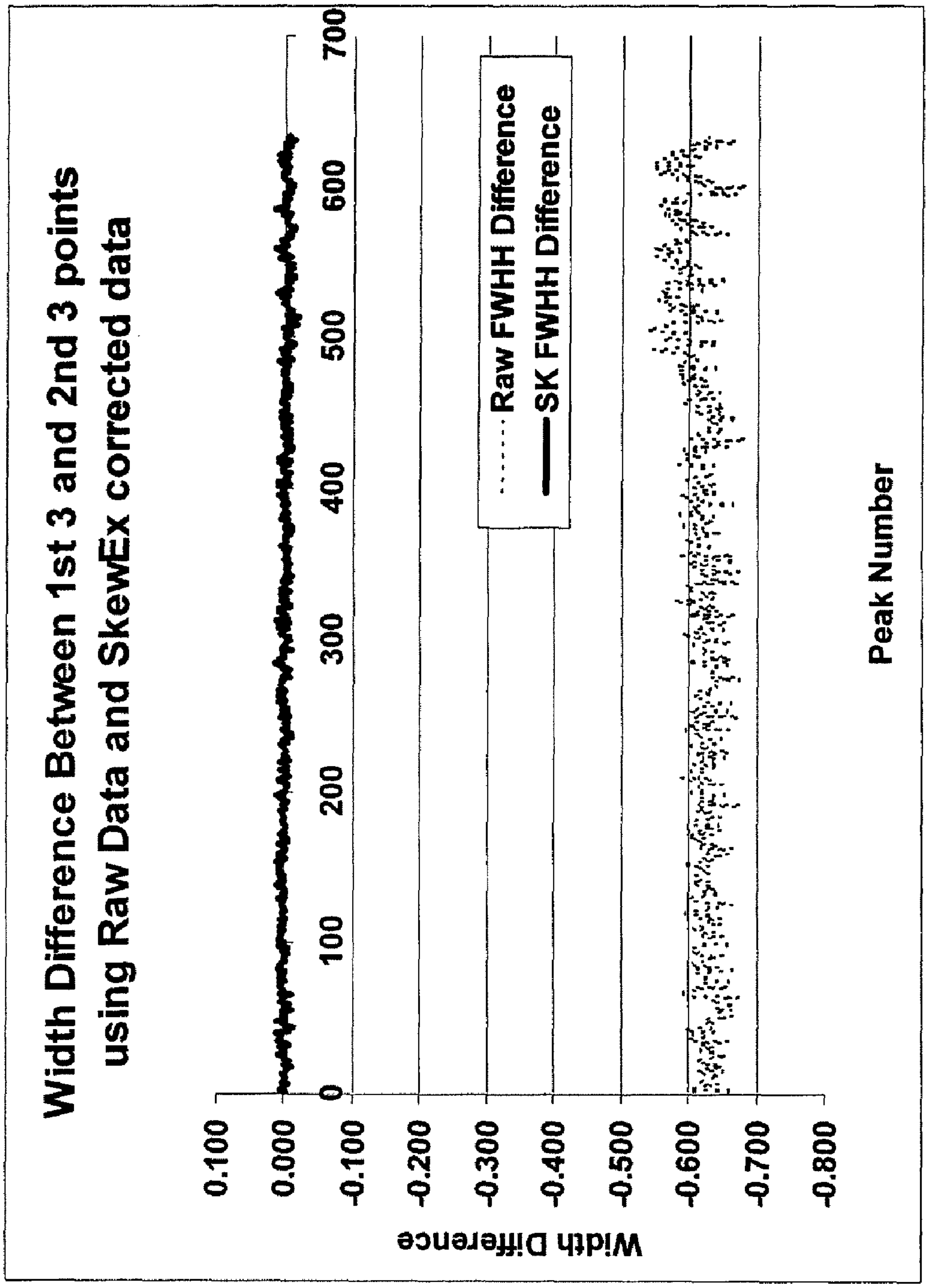
FIG. 24 is a graph representing plots of the width difference between the first three and second three points produced by a test pulse using raw data and data filtered by the shaping filter.
Figure 25:
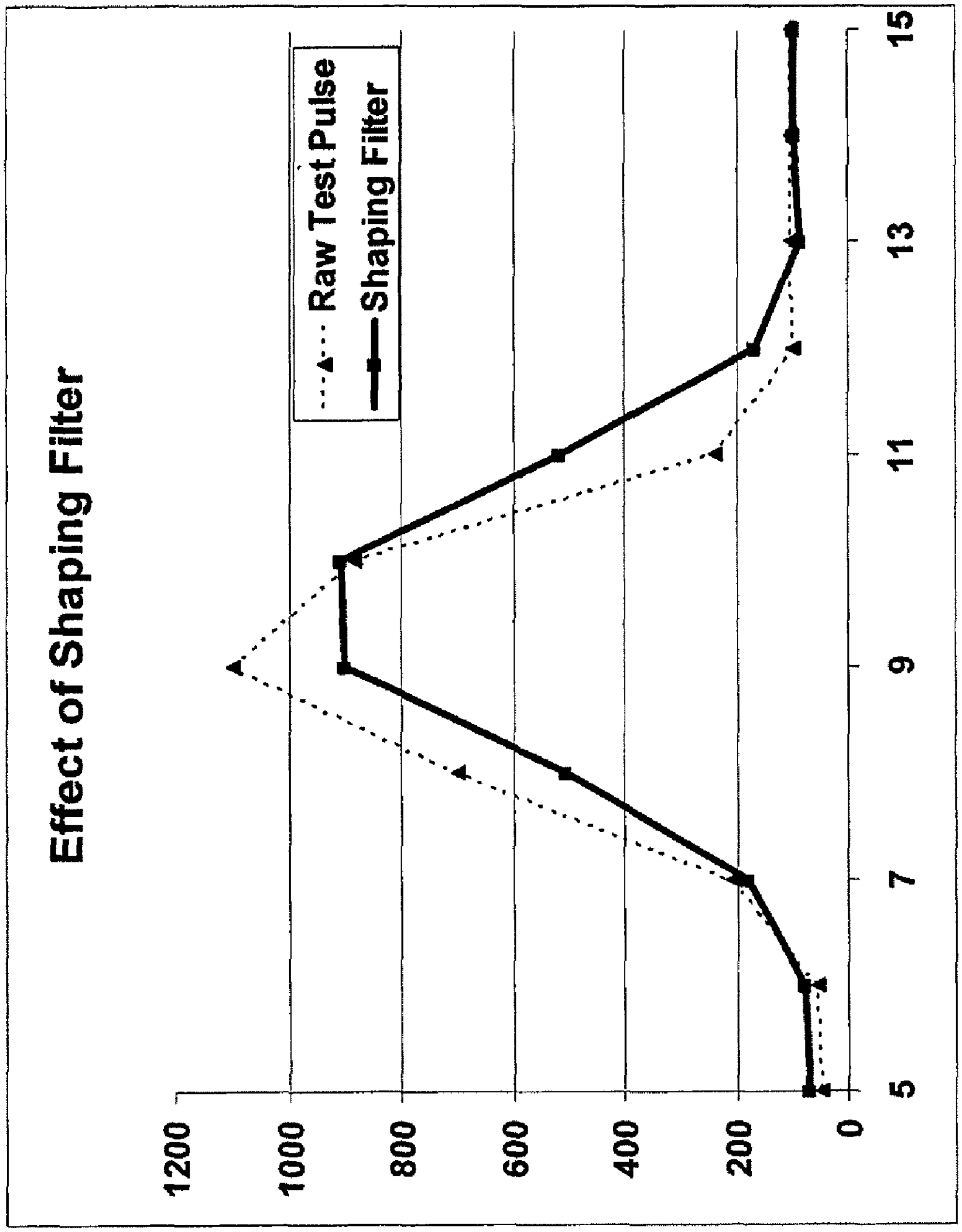
FIG. 25 is a graph representing plots of a peak produced by a test pulse using raw data and data filtered by the shaping filter.

Shaping filters 215 and 220 may be applied to the data from the test pulse to make accuracy insensitive to peak position. Without using shaping filters 215 and 220, the precision of the test pulse stick spectra may be very dependent upon the phase relationship between the test pulse and the three decimated points as illustrated in FIGS. 22-24. FIG. 22 shows the phase difference with and without shape filtering, FIG. 23 shows the height (gain) difference with and without shape filtering, and FIG. 24 shows the width (offset) difference with and without shape filtering. Shaping filters 215 and 220 reshape the pulse to Gaussian as shown in FIG. 25.

The final output of the data acquisition system 20 is stick spectra for the various mass peaks detected. An individual stick represents a single mass peak and consists of three components: apex location, ion concentration, and resolution. In order to solve for these three stick components, three data points on the peak are required. Sampled data points acquired for a mass peak have uncertainty due to circuit noise, acquisition noise, statistical ion scattering, and timing jitter. In addition, the mass peak may be experiencing spectral interference from chemical noise or a neighboring analytical peak. Intuitively, the three points nearest the apex of the peak should be used for the best signal to noise ratio, however the question arises as to optimal spacing between these samples relative to the FWHH of the mass peak to minimize the mass error due to the noise and spectral interference. This inter-sample spacing is described by the sampling ratio which is the ratio of the FWHH of a mass peak to the spacing between samples. A simulation was run to determine a good choice for the sampling ratio.

Figure 26:
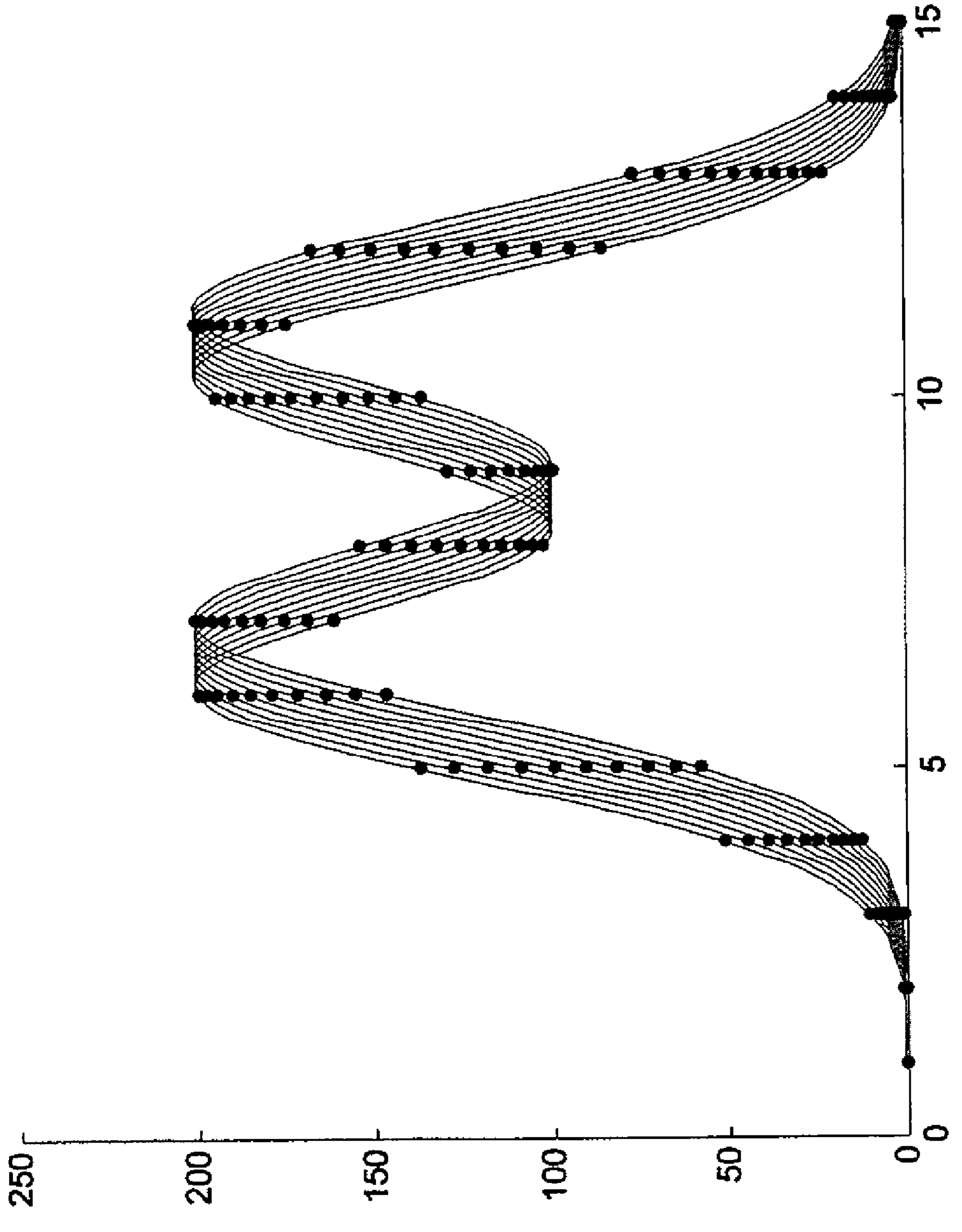
FIG. 26 is a graph representing plots of two Gaussian peaks used in a MatLab simulation.

In a first simulation, two Gaussian peaks of equal height (200 counts) are placed next to each other to create a 50% valley between them. The 50% valley is a common criterion used when discussing the resolving power of a spectrometer. As shown in FIG. 26, the two peaks are kept the same distance apart, but the pair is swept in time an amount equal to the width of the sampling interval so that the results are not biased to a certain peak position.

Next, Gaussian distributed white noise is added in magnitudes varying from 1 to 10 counts rms (7 to 70 counts peak to peak) to simulate circuit noise and jitter. The composite signal is sampled at various sampling ratios sweeping the range from 1.5 to 4.0 (a pre-determined range of interest).

The stick components of both peaks are then calculated for all the above permutations and the calculated apex positions are compared to the actual apex position. The standard deviation of the apex errors for each noise level and sampling ratio is expressed as a ppm mass error for convenience. This test is repeated 100 times and the results combined to produce more reliable statistics.

Figure 27:
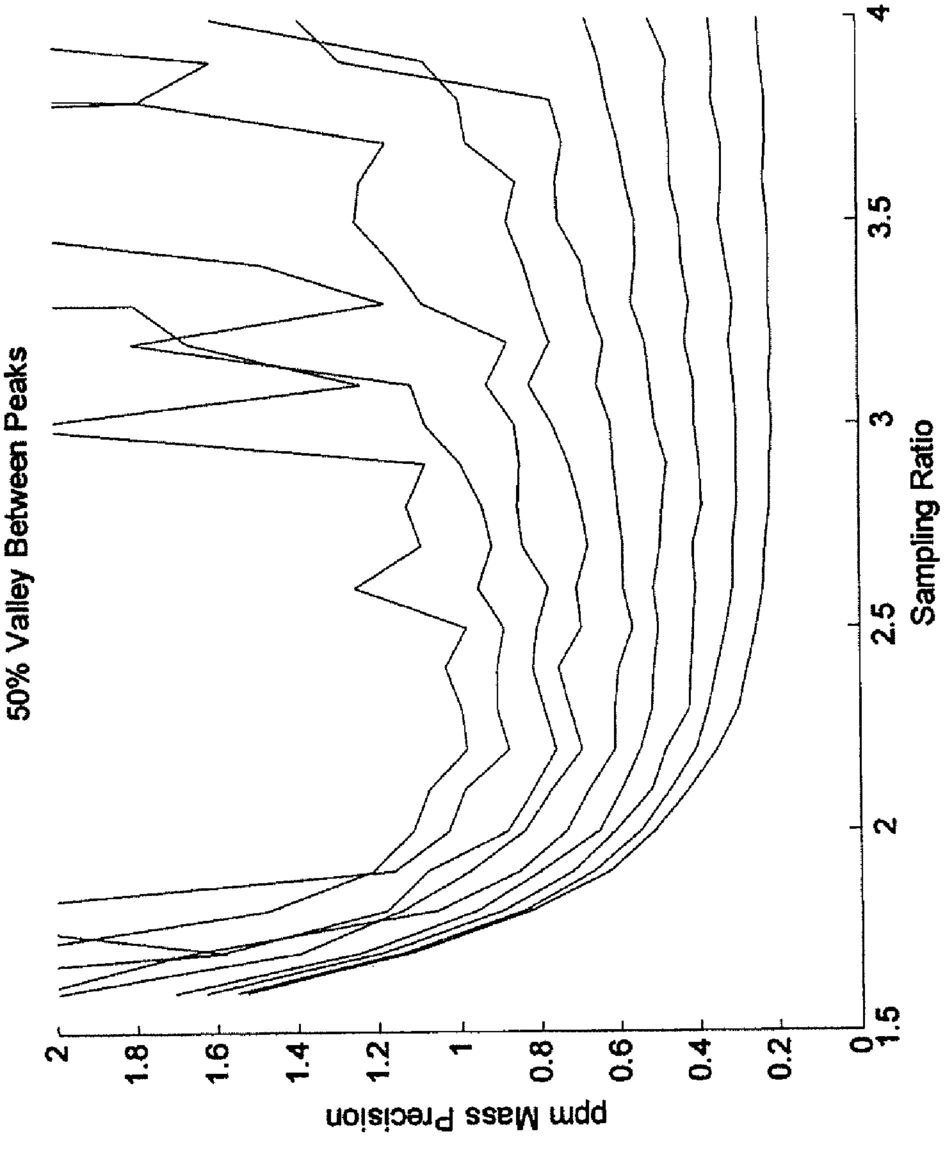
FIG. 27 is a graph representing plots that illustrate the STD of the mass error in ppm vs. the sampling ratio for various noise levels and a 50% valley spectral interference.

FIG. 27 illustrates the STD of the mass error in ppm vs. the sampling ratio for various noise levels and a 50% valley spectral interference. The noise was increased until the system was unable to achieve 1.0 ppm mass precision.

Figure 28:
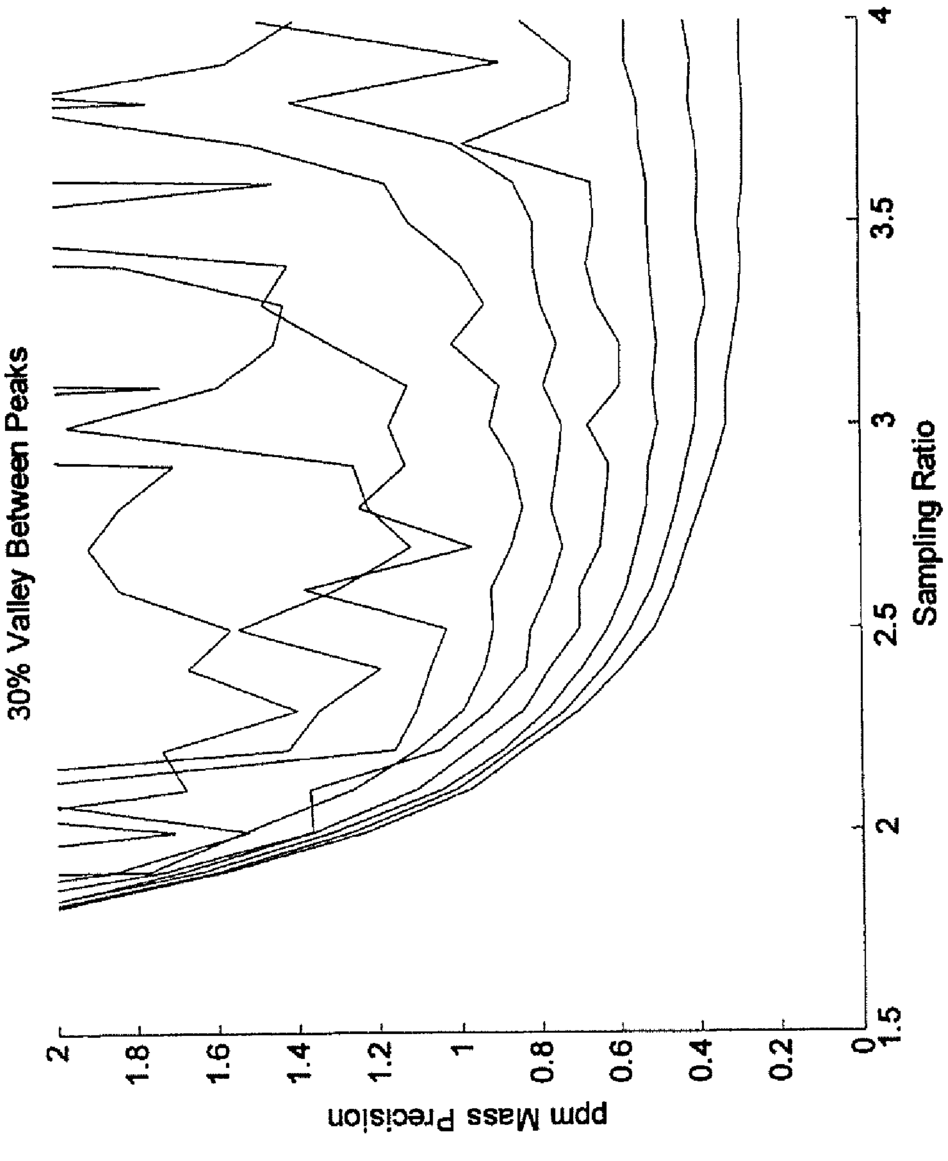
FIG. 28 is a graph representing plots that illustrate the STD of the mass error in ppm vs. the sampling ratio for various noise levels and a 30% valley spectral interference.

From FIG. 27, it can be seen that for medium to poor SNR, a sampling ratio of about 2.5 is optimal. As the SNR improves, a higher sampling ratio will slightly improve results. In FIG. 28, the interference was made more severe with only a 30% valley between peaks. In this case, the optimal sampling ratio is shifted to the right.

Figure 29:
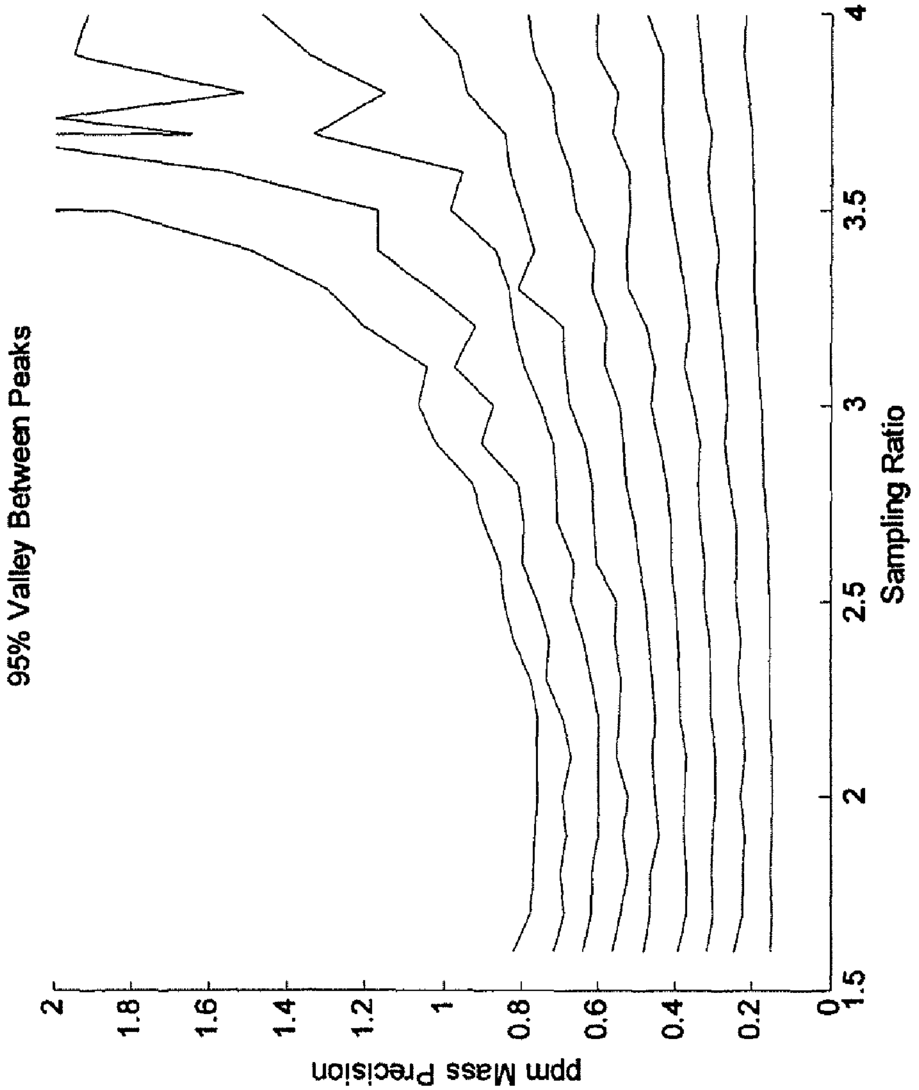
FIG. 29 is a graph representing plots that illustrate the STD of the mass error in ppm vs. the sampling ratio for various noise levels and a 95% valley spectral interference.

Finally, FIG. 29 illustrates the performance with a 95% valley between the two peaks for virtually no interference. Under these conditions, a sampling ratio of about 2.0 is optimum, but not much is given up sampling all the way to 3.0.

A sampling ratio of 3.0 was selected to improve the ability to resolve interferences. In the horizontal accumulation process (discussed above), the mass spectrum is resampled (down-sampled) at this optimum spacing and the resulting resampled points are called bins. The 3.0 sampling ratio insures that the three points selected to determine the mass peak are typically all at or above 50% of the peak height. This feature has greater significance if the peaks have Lorentzian features or spectral interferences that distort the peak shape more severely in the tails vs. near the top of the peak.

As described above, the ion detector produces a Gaussian pulse with a 2.0 ns FWHH in response to a single ion strike. To match these capabilities of the ion detector, the ability to sample this narrowest signal at the selected sampling ratio dictates a minimum sampling interval of 2.0 ns/3.0=667 ps, or a sampling rate of 1.5 GHz.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A data acquisition system for detecting ions of interest in a spectrometer, the system comprising:

an ion detector for detecting ions and generating ion detection signals indicative of detected ions striking said ion detector;

an initial processing module for receiving and processing the ion detection signals and for supplying processed signals;

a spectra processing module for receiving the processed signals and generating spectra; and a shaping filter for removing skew and shoulders from the processed signals, wherein said shaping filter is an FIR filter, and wherein said shaping filter has FIR coefficients calculated using linear regression such that a signal created by filtering a Pearson peak with these coefficients will most closely match a Gaussian peak in a least square sense.

2. A data acquisition system for detecting ions of interest in a spectrometer, the system comprising:

an ion detector for detecting ions and generating ion detection signals indicative of detected ions striking said ion detector;

an initial processing module for receiving and processing the ion detection signals and for supplying processed signals;

a spectra processing module for receiving the processed signals and generating spectra; and a shaping filter for removing skew and shoulders from the processed signals, wherein said shaping filter has five unique taps.

3. The data acquisition system of claim 1, wherein said shaping filter is part of said spectra processing module, and wherein said spectra processing module supplies the generated spectra to an external processor for post-processing.

4. The data acquisition system of claim 1, wherein said spectra processing module further comprises a sharpening filter for sharpening the peaks of the signals output from said shaping filter to effectively deconvolve and separate overlapping peaks.

5. A data acquisition system for detecting ions of interest in a spectrometer, the system comprising:

an ion detector for detecting ions and generating ion detection signals indicative of detected ions striking said ion detector;

an initial processing module for receiving and processing the ion detection signals and for supplying processed signals;

a spectra processing module for receiving the processed signals and generating spectra; and a shaping filter for removing skew and shoulders from the processed signals, wherein said spectra processing module further comprises a cross-spectra filter for filtering data in each spectra as a function of data in at least one prior spectra, wherein said shaping filter is coupled to an output of said cross-spectra filter.

6. The data acquisition system of claim 5, wherein said spectra processing module further comprises:

a sharpening filter for sharpening the peaks of the signals output from said shaping filter to effectively deconvolve and separate overlapping peaks;

an ion statistics filter for filtering the processed signals output from said sharpening filter on a per sample basis using coefficients that vary as a function of the intensity of the sample of the processed signal; and a peak histogram filtering circuit for establishing a threshold peak intensity level based upon a peak histogram, a selected spectra reporting rate, and a transmission capacity of a transmission line through which spectra are supplied to the external processor, and for supplying only spectra peaks to the external processor that meet the threshold peak intensity level.

7. The data acquisition system of claim 5 and further comprising a second shaping filter coupled to a second output of said cross-spectra filter.

8. A mass spectrometer system comprising:

an ion source;

a mass spectrometer for receiving ions from said source; and the data acquisition system of claim 5.

9. The mass spectrometer system of claim 8, wherein said mass spectrometer is a time-of-flight mass spectrometer.

* * * * *